(12) United States Patent
Zhang et al.

(10) Patent No.: US 12,271,403 B1
(45) Date of Patent: Apr. 8, 2025

(54) SYSTEM AND METHOD SUPPORTING INTELLIGENT GEOSPATIAL ANALYSES AND MACHINE LEARNING PREDICTIONS

(71) Applicant: Goldman Sachs & Co. LLC, New York, NY (US)

(72) Inventors: Xiaomeng Zhang, New York, NY (US); Zhuofan Li, New York, NY (US); Michael A. Ungari, Old Greenwich, CT (US)

(73) Assignee: Goldman Sachs & Co. LLC, New York, NY (US)

( * ) Notice: Subject to any disclaimer, the term of this patent is extended or adjusted under 35 U.S.C. 154(b) by 0 days.

(21) Appl. No.: 17/809,799

(22) Filed: Jun. 29, 2022

(51) Int. Cl.
    *G06F 16/29* (2019.01)
    *G06F 16/248* (2019.01)
(52) U.S. Cl.
    CPC ............ *G06F 16/29* (2019.01); *G06F 16/248* (2019.01)
(58) Field of Classification Search
    CPC ................................ G06F 16/29; G06F 16/248
    See application file for complete search history.

(56) References Cited

U.S. PATENT DOCUMENTS

| | | | | |
|---|---|---|---|---|
| 9,953,445 B2* | 4/2018 | Cervelli | ............... | G09B 29/106 707/999.003 |
| 10,102,597 B1* | 10/2018 | Castonguay | .......... | G06F 3/0484 707/737 |
| 10,248,663 B1* | 4/2019 | Keisler | .................... | G06F 16/29 707/624 |
| 10,444,941 B2* | 10/2019 | Cervelli | ................... | G06T 11/60 707/737 |
| 10,496,678 B1* | 12/2019 | Tang | ....................... | G06F 16/29 707/737 |
| 10,896,234 B2* | 1/2021 | Takahashi | ........... | G06F 16/5866 707/737 |
| 11,562,007 B1* | 1/2023 | Tang | .................... | G06F 16/2465 707/737 |
| 2013/0044137 A1* | 2/2013 | Forsblom | .............. | G06F 16/248 345/441 |
| 2014/0297589 A1* | 10/2014 | Chen | ...................... | G06F 16/275 707/624 |
| 2017/0052747 A1* | 2/2017 | Cervelli | ................ | G06T 11/001 707/737 |
| 2017/0221239 A1* | 8/2017 | Lintz | ....................... | G06T 11/60 707/737 |
| 2018/0136005 A1* | 5/2018 | Forutanpour | ...... | G01C 21/3476 707/624 |

(Continued)

*Primary Examiner* — Yuk Ting Choi

(57) ABSTRACT

A method includes obtaining data from multiple data sources using multiple data pipelines and receiving input from a user defining a geospatial search, where an interactive map allows the user to define a specified geographical area within the interactive map. The method also includes retrieving a portion of the data related to the specified geographical area and to properties within or associated with the specified geographical area. The method further includes analyzing the retrieved portion of the data using one or more machine learning models configured to generate analysis results associated with one or more properties. In addition, the method includes generating a user interface that graphically provides at least a portion of the analysis results to the user. The user interface allows the user to update the geospatial search and provides updated analysis results to the user.

20 Claims, 32 Drawing Sheets

(56) References Cited

U.S. PATENT DOCUMENTS

| | | | |
|---|---|---|---|
| 2019/0073380 A1* | 3/2019 | Thomas | G06Q 50/163 |
| | | | 707/999.003 |
| 2022/0075515 A1* | 3/2022 | Floren | G06F 3/04847 |
| | | | 707/737 |
| 2022/0381582 A1* | 12/2022 | Scheuerman | G01C 21/36 |
| | | | 707/737 |

* cited by examiner

| SEL... | MAP # | COMP S... | OWNER | PROPERTY | VERTICAL | SIZE | AGE | RENT | RENT UNIT | LABEL |
|---|---|---|---|---|---|---|---|---|---|---|
| ☐ | ◉1 | | OWNER #1 | PROPERTY #1 | SENIOR HOUSING | 123 | 2015 | $2,220 | PER UNIT | LABEL |
| ☐ | ◉2 | | OWNER #1 | PROPERTY #2 | SENIOR HOUSING | 234 | 2020 | $1,900 | PER UNIT | LABEL |
| ☐ | ◉3 | | OWNER #1 | PROPERTY #3 | SENIOR HOUSING | 345 | 2019 | $2,220 | PER UNIT | LABEL |
| ☐ | ◉4 | | OWNER #2 | PROPERTY #4 | SENIOR HOUSING | 123 | 2022 | $2,220 | PER UNIT | LABEL |
| ☐ | ◉5 | | OWNER #2 | PROPERTY #5 | SENIOR HOUSING | 234 | 2015 | $2,220 | PER UNIT | LABEL |
| ☐ | ◉6 | | OWNER #2 | PROPERTY #6 | SENIOR HOUSING | 345 | 2023 | $1,900 | PER UNIT | LABEL |
| ☐ | ◉7 | | OWNER #2 | PROPERTY #7 | SENIOR HOUSING | 123 | 2019 | $1,900 | PER UNIT | LABEL |
| ☐ | ◉8 | | OWNER #3 | PROPERTY #8 | SENIOR HOUSING | 234 | 2020 | $2,220 | PER UNIT | LABEL |
| ☐ | ◉9 | | OWNER #3 | PROPERTY #9 | SENIOR HOUSING | 345 | 2017 | $2,220 | PER UNIT | LABEL |
| ☐ | ◉10 | | OWNER #3 | PROPERTY #10 | SENIOR HOUSING | 123 | 2018 | $1,900 | PER UNIT | LABEL |

COLUMNS ▼ FILTERS

SEARCH
☑ MAP #
☑ COMP SET
☑ OWNER
☑ PROPERTY
☑ VERTICAL
☑ SIZE
☑ AGE
☑ RENT
☑ RENT UNIT
☑ LABEL

SYSTEM AND METHOD SUPPORTING INTELLIGENT GEOSPATIAL ANALYSES AND MACHINE LEARNING PREDICTIONS

TECHNICAL FIELD

This disclosure is generally directed to computing and database systems. More specifically, this disclosure is directed to a system and method supporting intelligent geospatial analyses and machine learning predictions, which can used for real estate or other use cases.

BACKGROUND

The amount of data that is available for analysis or use continues to grow at an extremely fast pace. The sheer amount of data that is available can be overwhelming, which often makes it difficult to (i) determine which data is the best data for analysis or use in a particular use case, (ii) obtain the desired data, and (iii) analyze or otherwise use the obtained data in order to perform one or more functions. In many cases, it may be difficult if not impossible for human personnel to review all available data and select which data signals might be relevant to a particular analysis or other use.

SUMMARY

This disclosure relates to a system and method supporting intelligent geospatial analyses and machine learning predictions.

In a first embodiment, a method includes obtaining data from multiple data sources using multiple data pipelines. The data obtained from the data sources includes structured and unstructured data, and the data pipelines are configured to pre-process and format the obtained data for storage in a data storage. The method also includes receiving input from a user defining a geospatial search, where at least some of the input is associated with an interactive map configured to allow the user to define a specified geographical area within the interactive map. The input from the user includes one of a manual definition of the specified geographical area within the interactive map and a user query for any geographical areas that satisfy one or more search criteria and that are presented within the interactive map. The method further includes retrieving a portion of the data from the data storage. The retrieved portion of the data is related to the specified geographical area and to properties within or associated with the specified geographical area, and part of the retrieved portion of the data represents data unrelated to properties. The method also includes analyzing the retrieved portion of the data using multiple machine learning models, where the machine learning models are configured to generate analysis results associated with one or more of the properties. Different machine learning models are trained to weight data from different types of data sources differently. In addition, the method includes generating a user interface that graphically provides at least a portion of the analysis results to the user. The user interface is configured to allow the user to update the geospatial search by revising the specified geographical area and associating one or more specific properties with the specified geographical area. The user interface is configured to provide updated analysis results to the user, where the updated analysis results are based on the updated geospatial search. The data sources from which the data is obtained are expandable by adding one or more additional data pipelines, and analyses performed using the data from the data sources are expandable by adding one or more additional machine learning models.

In a second embodiment, an apparatus includes at least one processor supporting a machine learning-based architecture. The at least one processor is configured to obtain data from multiple data sources using multiple data pipelines. The data from the data sources includes structured and unstructured data, and the data pipelines are configured to pre-process and format the obtained data for storage in a data storage. The at least one processor is also configured to receive input from a user defining a geospatial search, where at least some of the input is associated with an interactive map configured to allow the user to define a specified geographical area within the interactive map. The at least one processor is further configured to retrieve a portion of the data from the data storage. The retrieved portion of the data is related to the specified geographical area and to properties within or associated with the specified geographical area, and part of the retrieved portion of the data represents data unrelated to properties. The at least one processor is also configured to analyze the retrieved portion of the data using one or more machine learning models, where the one or more machine learning models are configured to generate analysis results associated with one or more of the properties. In addition, the at least one processor is configured to generate a user interface that graphically provides at least a portion of the analysis results to the user. The user interface is configured to allow the user to update the geospatial search by revising the specified geographical area and associating one or more specific properties with the specified geographical area. The user interface is configured to provide updated analysis results to the user, where the updated analysis results are based on the updated geospatial search.

In a third embodiment, a non-transitory computer readable medium contains instructions that support a machine learning-based architecture and that when executed cause at least one processor to obtain data from multiple data sources using multiple data pipelines. The data from the data sources includes structured and unstructured data, and the data pipelines are configured to pre-process and format the obtained data for storage in a data storage. The medium also contains instructions that when executed cause the at least one processor to receive input from a user defining a geospatial search, where at least some of the input is associated with an interactive map configured to allow the user to define a specified geographical area within the interactive map. The medium further contains instructions that when executed cause the at least one processor to retrieve a portion of the data from the data storage. The retrieved portion of the data is related to the specified geographical area and to properties within or associated with the specified geographical area, and part of the retrieved portion of the data represents data unrelated to properties. The medium also contains instructions that when executed cause the at least one processor to analyze the retrieved portion of the data using one or more machine learning models, where the one or more machine learning models are configured to generate analysis results associated with one or more of the properties. In addition, the medium contains instructions that when executed cause the at least one processor to generate a user interface that graphically provides at least a portion of the analysis results to the user. The user interface is configured to allow the user to update the geospatial search by revising the specified geographical area and associating one or more specific properties with the specified geographical area. The user interface is configured to provide updated analysis results to the user, where the updated analysis results are based on the updated geospatial search.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
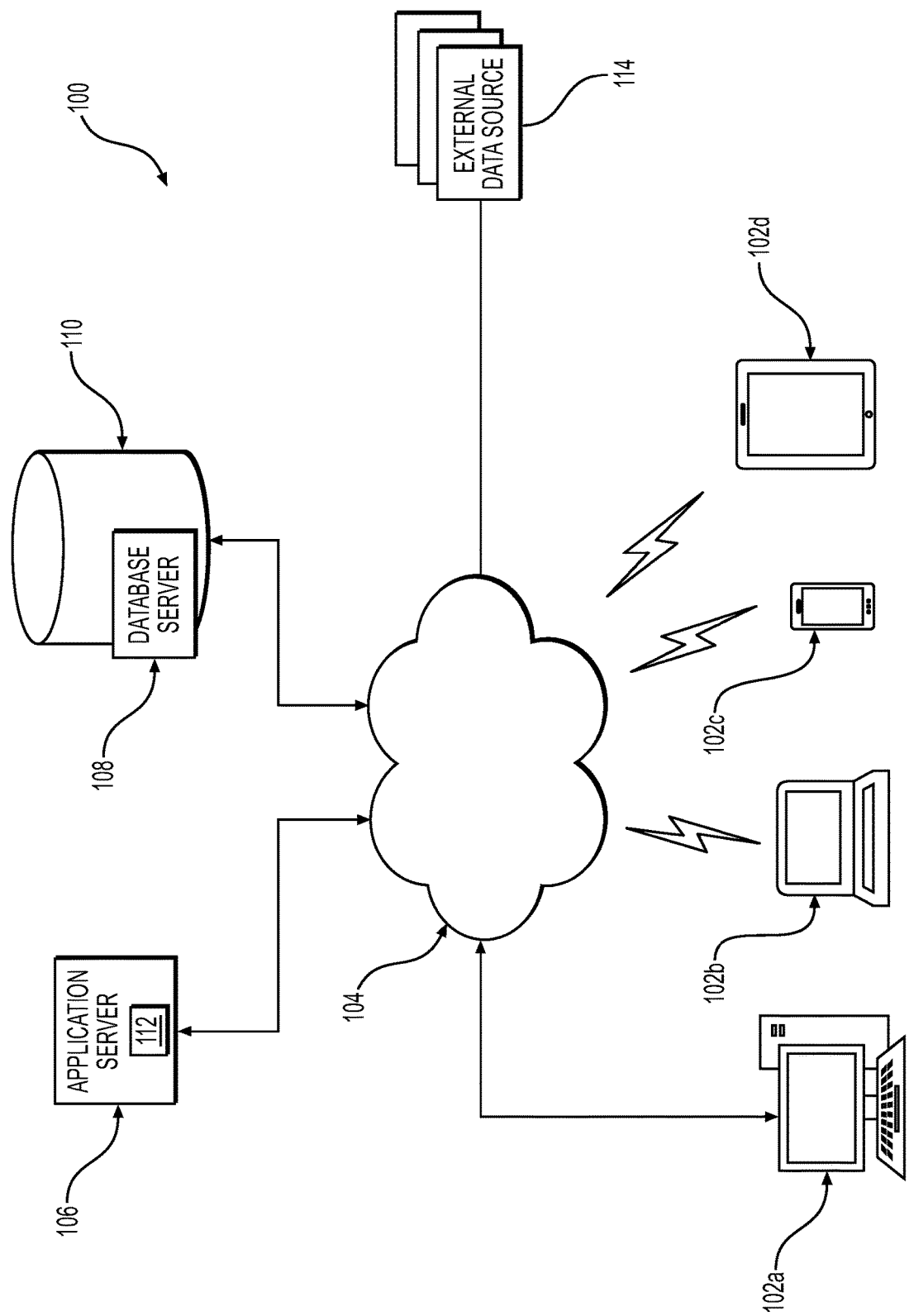
FIG. 1 illustrates an example system supporting intelligent geospatial analyses and machine learning predictions for real estate according to this disclosure.

FIGS. 1 through 13, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

As noted above, the amount of data that is available for analysis or use continues to grow at an extremely fast pace. The sheer amount of data that is available can be overwhelming, which often makes it difficult to (i) determine which data is the best data for analysis or use in a particular use case, (ii) obtain the desired data, and (iii) analyze or otherwise use the obtained data in order to perform one or more functions. In many cases, it may be difficult if not impossible for human personnel to review all available data and select which data signals might be relevant to a particular analysis or other use.

One particular example of these types of issues involves real estate, such as when a wide variety of information may be available and may make attempting to analyze the real estate market for a particular area difficult. In some instances, human intuition may be the driving factor in analyzing a specific segment of the real estate market, which clearly introduces human biases and inaccuracies. Moreover, human personnel may often have no idea that certain available data can be useful in performing a specific analysis, such as when that available data is lost in a much larger collection of data.

This disclosure provides techniques supporting intelligent geospatial analyses and machine learning predictions for real estate. As described in more detail below, these techniques support various technological approaches for collecting various types of real estate information and other information and for performing various types of analyses of the information (including analyses based on machine learning). For example, a user interface may be provided that is interactive and that supports fine-grained geospatial queries, which can be used to precisely identify a relevant real estate market or portion thereof to be analyzed. Also, rich predictive analytics and visualizations can be used to detect data sourcing signals within a larger collection of data for use during analyses, which can enable the most useful or informational data signals to be identified and used during the analyses. In addition, systematized data collection and access can be supported to enable data to be obtained from a variety of sources (including one or more non-real estate-related data sources), and analytics can be optimized to process the data.

Various applications can also be layered on top of these technologies in order to support desired functionality. For example, the data collection and analysis functionalities may be used to select and use data sourcing signals in order to identify real estate markets or real estate transactions that appear most promising. As another example, analytics can be used to optimize workflows for performing real estate transaction analyses and for tracking and analyzing comparable real estate transactions ("comps") that are similar to potential real estate transactions. As still other examples, analytics can be used to support functions such as identifying buy and sell timing signals for real estate assets, identifying asset allocations, and performing portfolio balancing. As yet other examples, analytics can be used to identify and analyze utility usages for real estate properties, which can be used to identify anomalous utility usages and help identify or initiate remedial actions to reduce energy consumption. In addition, analytics can be used to construct and analyze social graphs in order to capture relationships with targeted individuals or other contacts, such as in order to increase or optimize lease-up times and retentions.

In this way, machine learning and other technologies can be leveraged to support simpler, faster, and more accurate identifications and analyses of real estate markets and real estate transactions. Machine learning and other technologies described below can be used to more quickly and easily identify a real estate market or a portion thereof, identify and select data for use, and use the selected data to analyze the real estate market or the portion thereof, analyze a potential transaction involving the real estate market or the portion thereof, or make predictions regarding the real estate market or the portion thereof. This can be accomplished with much less effort on the part of users, which can reduce the number(s) and type(s) of user interactions that are needed here. This can also be accomplished even when users may be unaware that particular data is available and relevant to a requested analysis or analyses. In addition, this can be accomplished with much less or no human biases involved.

FIG. 1 illustrates an example system 100 supporting intelligent geospatial analyses and machine learning predictions for real estate according to this disclosure. As shown in FIG. 1, the system 100 includes multiple user devices 102a-102d, at least one network 104, at least one application server 106, and at least one database server 108 associated with at least one database 110. Note, however, that other combinations and arrangements of components may also be used here.

In this example, each user device 102a-102d is coupled to or communicates over the network(s) 104. Communications between each user device 102a-102d and at least one network 104 may occur in any suitable manner, such as via a wired or wireless connection. Each user device 102a-102d represents any suitable device or system used by at least one user to provide information to the application server 106 or database server 108 or to receive information from the application server 106 or database server 108. Any suitable number(s) and type(s) of user devices 102a-102d may be used in the system 100. In this particular example, the user device 102a represents a desktop computer, the user device 102b represents a laptop computer, the user device 102c represents a smartphone, and the user device 102d represents a tablet computer. However, any other or additional types of user devices may be used in the system 100. Each user device 102a-102d includes any suitable structure configured to transmit and/or receive information.

The at least one network 104 facilitates communication between various components of the system 100. For example, the network(s) 104 may communicate Internet Protocol (IP) packets, frame relay frames, Asynchronous Transfer Mode (ATM) cells, or other suitable information between network addresses. The network(s) 104 may include one or more local area networks (LANs), metropolitan area networks (MANs), wide area networks (WANs), all or a portion of a global network such as the Internet, or any other communication system or systems at one or more locations. The network(s) 104 may also operate according to any appropriate communication protocol or protocols.

The application server 106 is coupled to the at least one network 104 and is coupled to or otherwise communicates with the database server 108. The application server 106 supports various functions related to intelligent geospatial analyses and machine learning predictions for real estate. For example, the application server 106 may execute one or more applications 112, which can be used to obtain real estate information and other information for storage in the database 110. The one or more applications 112 may also use one or more trained machine learning models, predictive analytics, or other logic to analyze at least some of the obtained information retrieved from the database 110. The one or more applications 112 may further present one or more graphical user interfaces to users of the user devices 102a-102d, such as one or more graphical user interfaces that allow a user to define a real estate market or a portion thereof at a desired granularity, initiate one or more analyses of information related to the real estate market or the portion thereof, and display results of the one or more analyses. The application server 106 can interact with the database server 108 in order to store information in and retrieve information from the database 110 as needed or desired. Additional details regarding example functionalities of the application server 106 are provided below.

The database server 108 operates to store and facilitate retrieval of various information used, generated, or collected by the application server 106 and the user devices 102a-102d in the database 110. For example, the database server 108 may store various types of real estate-related information and non-real estate-related information in relational database tables or other data structures in the database 110. Note, however, that the database server 108 may be used within the application server 106 to store information in other embodiments, in which case the application server 106 may store the information itself.

Some embodiments of the system 100 allow for information to be harvested or otherwise obtained from one or more external data sources 114 and pulled into the system 100, such as for storage in the database 110 and use by the application server 106. Each external data source 114 represents any suitable source of real estate-related information or non-real estate-related information that is useful for performing one or more analyses or other functions of the system 100. At least some of this information may be stored in the database 110 and used by the application server 106 to perform one or more real estate-related analyses or other functions. Depending on the circumstances, the one or more external data sources 114 may be coupled directly to the network(s) 104 or coupled indirectly to the network(s) 104 via one or more other networks.

In some embodiments, the functionalities of the application server 106, the database server 108, and the database 110 may be provided in a cloud computing environment, such as by using the AMAZON WEB SERVICES (AWS) platform, GOOGLE CLOUD platform, or MICROSOFT AZURE platform. In these types of embodiments, the described functionalities of the application server 106, the database server 108, and the database 110 may be implemented using a native cloud architecture, such as one supporting a web-based interface or other suitable interface. Among other things, this type of approach drives scalability and cost efficiencies while ensuring increased or maximum uptime. This type of approach can allow the user devices 102a-102d of one or multiple organizations (such as one or more companies) to access and use the functionalities described in this patent document. However, different organizations may have access to different data, different machine learning models, or other differing resources or functionalities in the system 100. In some cases, this architecture uses an architecture stack that supports the use of internal tools or datasets (meaning tools or datasets of the organization accessing and using the described functionalities) and third-party tools or datasets (meaning tools or datasets provided by one or more parties who are not using the described functionalities). Datasets used in the system 100 can have well-defined models and controls in order to enable effective importation and use of the datasets, and the architecture may gather structured and unstructured data from one or more internal or third-party systems, thereby standardizing and joining the data source(s) with the cloud-native data store. Using a modern cloud-based and industry-standard technology stack can enable the smooth deployment and improved scalability of the described infrastructure. This can make the described infrastructure more resilient, achieve improved performance, and decrease the time between new feature releases while accelerating research and development efforts.

Among other possible use cases, a native cloud-based architecture or other architecture designed in accordance with this disclosure can be used to leverage real estate market data, as well as alternative and portfolio data, with advanced data analytics in order to make investing processes more scientific and reduce uncertainty. In these types of architectures, the described functionalities can be used to obtain various technical benefits or advantages depending on the implementation. For example, these approaches can be used to drive intelligence in real estate investing processes or other real estate processes by providing users and teams with information that can only be accessed through the application of data science and advanced analytics. Real estate businesses are often limited in their use of quantitative sciences in investing decisions and, as a result, can miss out on potential insights and opportunities derived from the use of advanced analytics. Based on the described functionalities, the approaches in this disclosure can meaningfully increase sophistication for functions such as selecting markets and analyzing transactions. Also, these functionalities can help to drive efficiencies in real estate teams' sourcing, transaction analysis, and post-close management processes, such as by having all external and internal data needed in one place and available at their fingertips. Historically, real estate businesses leverage data in a very manual and one-off type of approach, where many hours of business teams' time are spent on gathering data for sourcing, transaction analysis, and market ranking exercises. With the described approaches, the time needed for transaction underwriting and other functions can be shortened significantly.

The value or benefits of data science and advanced analytics driven by the described approaches can be highly useful or desirable. For example, deal sourcing can be driven by deeply understanding the drivers of market performance in order to identify high-quality assets early in their life-cycles to increase or maximize investment returns. This can also position institutional or corporate investors to initiate outbound sourcing efforts in order to drive proactive partnerships with operating partners. Moreover, with respect to transaction analysis during diligence and execution phases of transactions, this can help optimize deal tactics by providing precision and clarity to underlying market fundamentals. This can also offer improvements by extracting insights from non-traditional datasets and identifying unique opportunities (as compared to approaches that rely solely on traditional data). Further, with respect to asset and portfolio management, market data can be combined with portfolio data in order to optimize costs and drive revenue opportunities. Data-informed decisions on market timings and asset allocations can further enhance portfolio performance. In addition, being an investor with differentiated data-driven research capabilities can allow inventors to achieve preferred positions in fundraising.

Example reasons why the technologies described in this patent disclosure are useful for real estate analyses is that real estate is highly location-driven, and data sources can vary drastically across different regions and sub-regions. Thus, the described approaches can be used to integrate disparate types of data from various data sources, such as U.S. census data (which is often free government data available through census files, which may be distributed via FTP), market-level and property-level data, and data related to e-commerce transactions within given areas. Specific features of the architectures that are designed for use with real estate-related functionalities described below can include support for geospatial searching, such as by providing an interactive map for selecting areas or properties via general searches or searches based on addresses; radii/driving distances/walking distances/other distances from addresses or other locations; or municipal, state, or other boundaries. This can also include support for market explorer tools, such as by providing table views and other views of markets and properties with analytics and predictions (possibly along with search, filter, and favorite functions). This can further include support for market view tools, such as by providing webpages or other interfaces that can be configured based on real estate verticals to show analytics modules or functions that deal teams may want or need to see (and where market analytics and macro contexts can be combined into one view). In addition, this can further include support for user homepages, which may provide a place for market watch lists, news, and research that allow users to quickly dive back into their daily workflows.

Although FIG. 1 illustrates one example of a system 100 supporting intelligent geospatial analyses and machine learning predictions for real estate, various changes may be made to FIG. 1. For example, the system 100 may include any number of user devices 102a-102d, networks 104, application servers 106, database servers 108, databases 110, applications 112, and external data sources 114. Also, these components may be located in any suitable locations and might be distributed over a large area. In addition, while FIG. 1 illustrates one example operational environment in which intelligent geospatial analyses and machine learning predictions for real estate may be used, this functionality may be used in any other suitable system.

Figure 2:
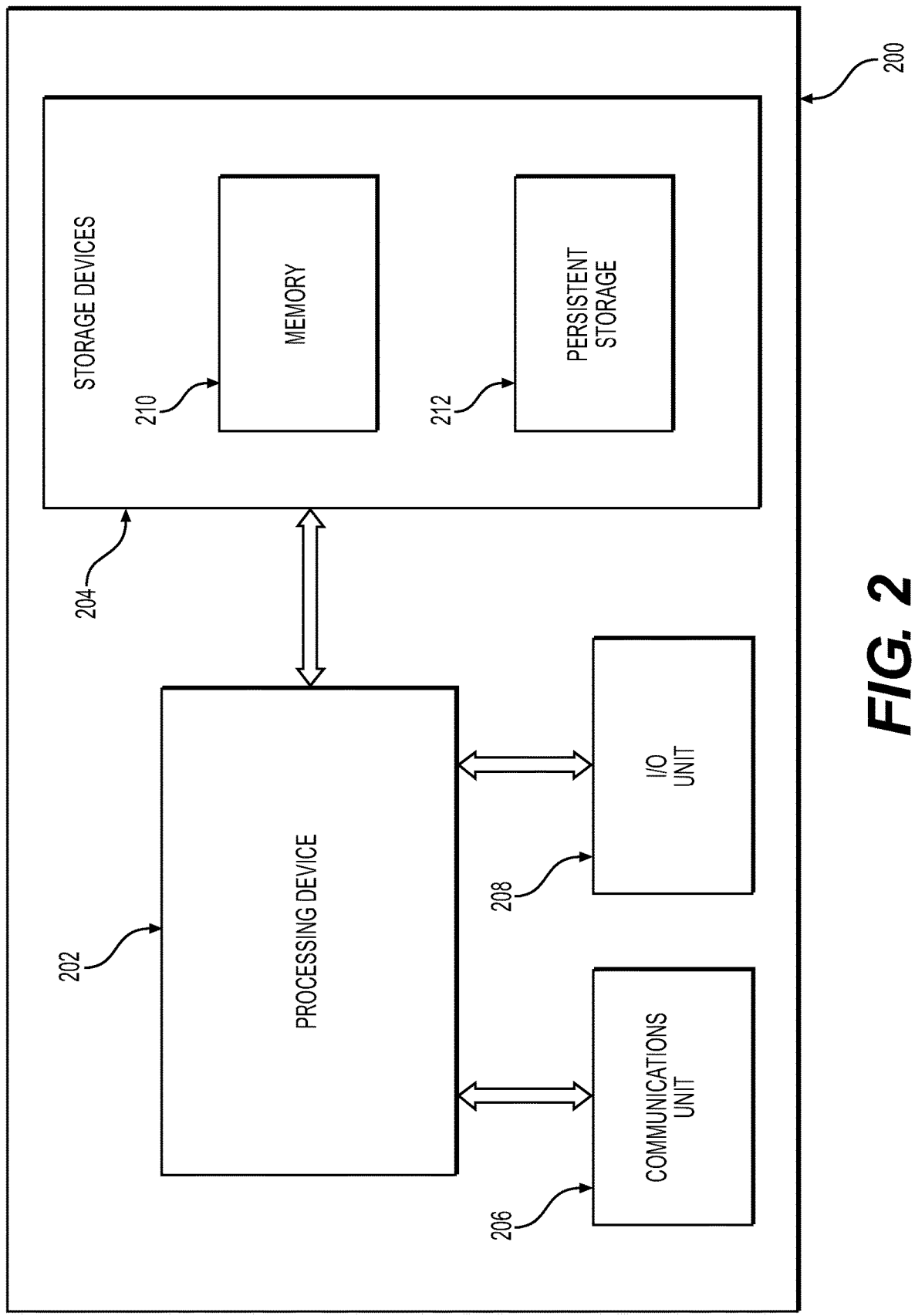
FIG. 2 illustrates an example device supporting intelligent geospatial analyses and machine learning predictions for real estate according to this disclosure.

FIG. 2 illustrates an example device 200 supporting intelligent geospatial analyses and machine learning predictions for real estate according to this disclosure. One or more instances of the device 200 may, for example, be used to at least partially implement the functionality of the application server 106 of FIG. 1. However, the functionality of the application server 106 may be implemented in any other suitable manner. In some embodiments, the device 200 shown in FIG. 2 may form at least part of a user device 102a-102d, application server 106, or database server 108 in FIG. 1. However, each of these components may be implemented in any other suitable manner.

As shown in FIG. 2, the device 200 denotes a computing device or system that includes at least one processing device 202, at least one storage device 204, at least one communications unit 206, and at least one input/output (I/O) unit 208. The processing device 202 may execute instructions that can be loaded into a memory 210. The processing device 202 includes any suitable number(s) and type(s) of processors or other processing devices in any suitable arrangement. Example types of processing devices 202 include one or more microprocessors, microcontrollers, digital signal processors (DSPs), application specific integrated circuits (ASICs), field programmable gate arrays (FPGAs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. For example, the communications unit 206 can include a network interface card or a wireless transceiver facilitating communications over a wired or wireless network. The communications unit 206 may support communications through any suitable physical or wireless communication link(s). As a particular example, the communications unit 206 may support communication over the network(s) 104 of FIG. 1.

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device. Note, however, that the I/O unit 208 may be omitted if the device 200 does not require local I/O, such as when the device 200 represents a server or other device that can be accessed remotely.

In some embodiments, the instructions executed by the processing device 202 include instructions that implement the functionality of the application server 106. Thus, for example, the instructions executed by the processing device 202 may cause the device 200 to perform various functions related to intelligent geospatial analyses and machine learning predictions for real estate. As particular examples, the instructions may cause the device 200 to obtain real estate information and other information for storage in the database 110. The instructions may also cause the device 200 to use one or more trained machine learning models, predictive analytics, or other logic to analyze at least some of the obtained information retrieved from the database 110. The instructions may further cause the device 200 to present one or more graphical user interfaces to users of the user devices 102a-102d. For instance, one or more graphical user interfaces may allow a user to define a real estate market or a portion thereof at a desired granularity, initiate one or more analyses of information related to the real estate market or the portion thereof, and display results of the one or more analyses.

Although FIG. 2 illustrates one example of a device 200 supporting intelligent geospatial analyses and machine learning predictions for real estate, various changes may be made to FIG. 2. For example, computing and communication devices and systems come in a wide variety of configurations, and FIG. 2 does not limit this disclosure to any particular computing or communication device or system.

Figure 3A:
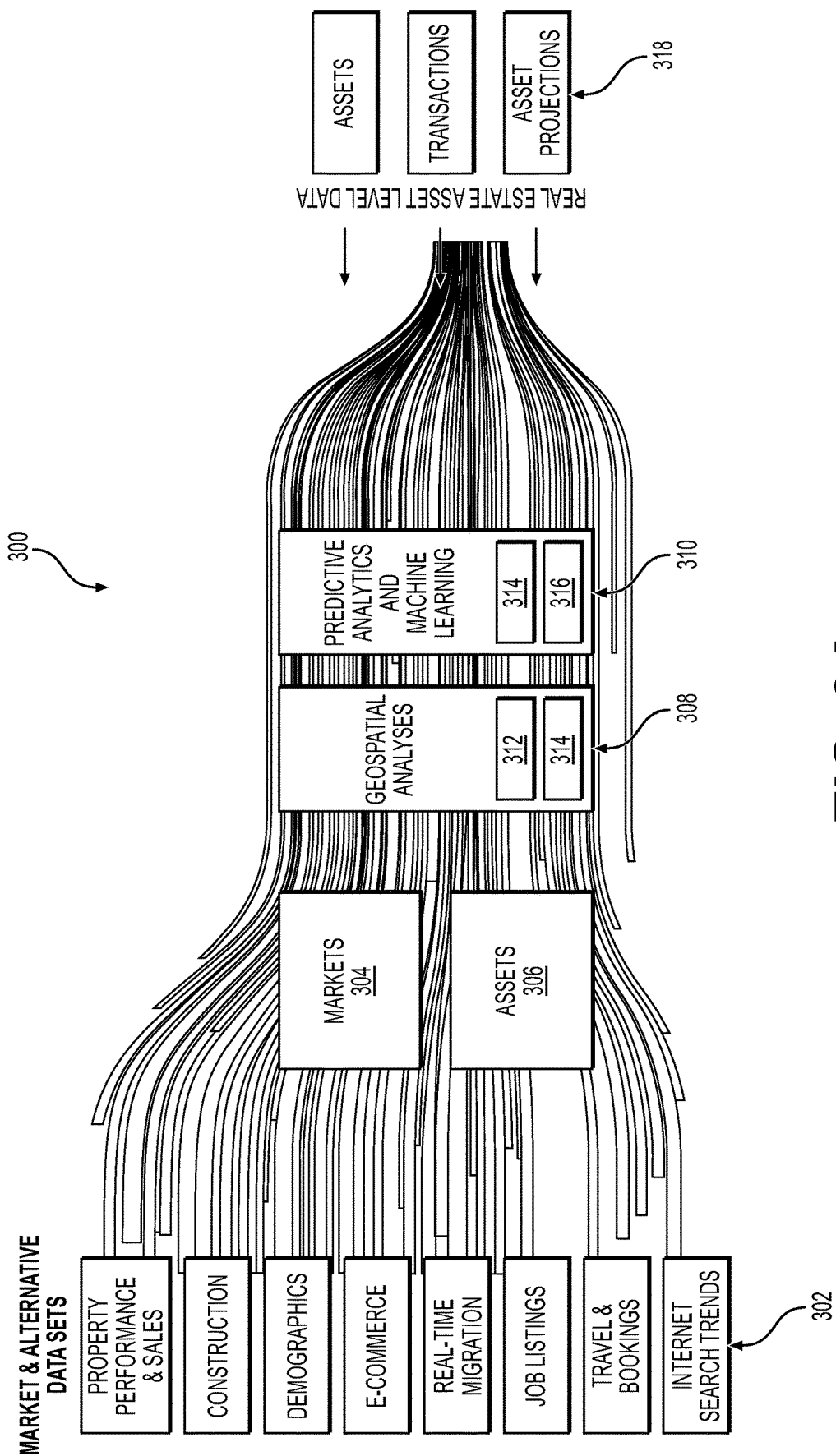
FIGS. 3A and 3B illustrate an example functional architecture for intelligent geospatial analyses and machine learning predictions for real estate according to this disclosure.
Figure 3B:
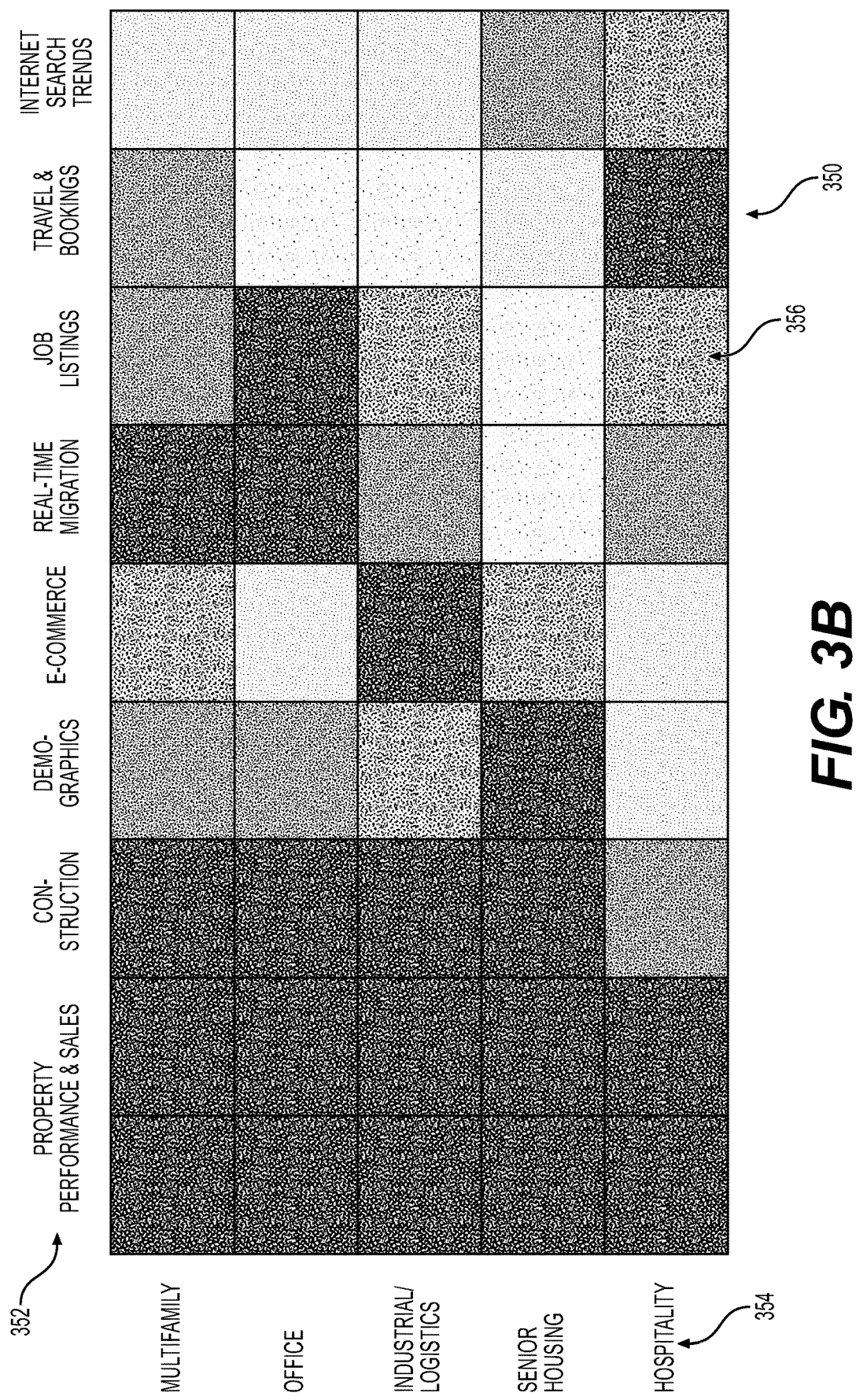

FIGS. 3A and 3B illustrate an example functional architecture 300 for intelligent geospatial analyses and machine learning predictions for real estate according to this disclosure. For ease of explanation, the functional architecture 300 of FIGS. 3A and 3B may be implemented using or provided by one or more applications 112 executed by the application server 106 of FIG. 1, where the application server 106 may be implemented using one or more devices 200 of FIG. 2. However, the functional architecture 300 may be implemented using or provided by any other suitable device(s) and in any other suitable system(s).

As shown in FIG. 3A, the functional architecture 300 is used to obtain data from a number of different data sources 302. These data sources 302 may represent internal and third-party data sources that can provide real estate-related information (such as traditional data sources) and non-real estate-related information (such as non-traditional data sources). For example, one or more of the data sources 302 may represent one or more external data sources 114 described above. Note that non-real estate-related information may refer to information that is not specifically related to real estate but that may have some usefulness in evaluating real estate assets or real estate transactions or in making predictions regarding real estate assets or transactions.

In this particular example, the data sources 302 include one or more sources of property performance and sales data, which may include data related to sales/leases/rentals of real estate properties and other information about income generation or other performance information of real estate properties. The data sources 302 also include one or more sources of construction data, which may include data related to the construction of certain types of facilities on real estate properties. Example types of facilities may include homes, apartments/multi-family housing units, office spaces, industrial/logistical spaces (such as warehouses), senior living facilities, hospitality facilities (such as hotels or restaurants), or other structures. The data sources 302 further include one or more sources of demographic data, which may include data related to the characteristics of people within one or more given areas. One example source of demographic data may be the U.S. Census Bureau or other governmental agency. Example types of demographic data that may be useful during real estate analyses could include the number of people within different age brackets in given areas or employment statistics for people within given areas.

The data sources 302 also include one or more sources of e-commerce spending data, which may include data related to how much money people in given areas spend through e-commerce websites, such as people's spending patterns at AMAZON.COM. The data sources 302 further include one or more sources of real-time migration data, which may include data related to where people are moving to and from within a given country or other specified area(s). In some cases, real-time migration data may include data obtained from a company's interactions with its customers, such as telephone or web-based interactions where it is possible to derive the customers' locations.

The data sources 302 also include one or more sources of job listing data, which may include data related to job openings in one or more given areas, such as the numbers and types of jobs available and salaries or salary ranges of the available jobs. The data sources 302 further include one or more sources of travel and bookings data, which may include data related to locations where people are traveling to (for personal or business reasons), where people are staying during their travels, and when people are traveling. In addition, the data sources 302 include one or more sources of Internet search trends, which may include data related to historical, recent, or trending searches made using Internet search tools like GOOGLE, YAHOO, or BING.

The functional architecture 300 can harvest or otherwise obtain data from these data sources 302 in any suitable manner. The data that is obtained from each data source 302 may be structured or unstructured, and the functional architecture 300 can pre-process data as needed or desired in order to standardize the data and pull the data into a data store of the functional architecture 300 (such as in the database 110). In some embodiments, the functional architecture 300 can create data records for incoming data from each data source 302, correct any obvious errors or exclude erroneous data in the incoming data, format the data, and store the data in a standardized or other desired format. As a particular example, different data pipelines 303 may be used in the functional architecture 300, where each pipeline 303 can obtain data from at least one specified data source 302 or type of data source 302 and can process the data as needed or desired in order to prepare the data for storage and use by other functions or components of the functional architecture 300.

The manner of obtaining data from each data source 302 and the manner of pre-processing the data from each data source 302 can vary widely depending on the data and the data source 302. In general, data can be available from a wide variety of vendors, governmental entities, and other organizations. Also, data can often be obtained in various ways, such as through downloading of data files, harvesting of website data, or transfer through an online storage system (such as the AMAZON S3 system). Since numerous data sets using various formats and delivery mechanisms can be available and obtained in the architecture 300, data pipelines 303 or other mechanisms can be used to obtain, pre-process, and format the data as needed or desired. The pre-processed data can be stored in a data warehouse or other suitable storage location(s) for subsequent use.

In this example, the data from the data sources 302 may be generally viewed as being related to different real estate markets 304 and different real estate assets 306. The different real estate markets 304 generally represent different geographical areas associated with real estate properties, such as different cities, counties, metropolitan statistical areas (MSAs), states or provinces, or countries. The different real estate assets 306 generally represent different physical assets, such as land associated with real estate properties or homes, businesses, or other facilities built or positioned on the land. Note that this division is for illustration only and is simply meant to illustrate some of the types of data that might be obtained and used by the functional architecture 300.

As shown in FIG. 3A, the data that is obtained from the data sources 302 can be used with various geospatial analyses 308 and various predictive analytics and machine learning analyses 310. The geospatial analyses 308 can support or be based on input obtained through one or more graphical user interfaces 312, where (among other things) the one or more graphical user interfaces 312 allow users to specifically define real estate markets or portions thereof to be analyzed. For example, a user may identify a specific city, county, MSA, state/province, or other region; a radius, driving distance, walking distance, or other distance from a specified address or other specified location; or a user-defined boundary. Real estate properties within the defined real estate market or the defined portion thereof, or real estate properties outside of the defined real estate market or the defined portion thereof (but useful in analyzing real estate properties within the defined real estate market or the defined portion thereof), can be identified. In some cases, these real estate properties may be identified based on one or more criteria provided by the user. Information associated with the real estate properties within the defined real estate market, the defined portion thereof, or a larger area including the real estate market or the portion thereof can be extracted from the data warehouse or other storage location(s). Any suitable technique can be used to retrieve relevant data from the data warehouse or other storage location(s), such as PYTHON-based queries or other queries sent to the database server 108. The retrieved data can be passed to one or more of the predictive analytics and machine learning analyses 310 for subsequent processing.

The predictive analytics and machine learning analyses 310 are generally used to analyze data, including data identified via the geospatial analyses 308, in order to provide specified analysis results to users. The types of analyses that are performed here can vary widely based on the specific application or applications for the functional architecture 300. Some example types of analyses may include (i) identifying prior real estate transactions that are similar or comparable to a proposed real estate transaction in order to analyze the proposed real estate transaction, (ii) identifying real estate markets or portions thereof that appear to have a supply and demand imbalance or other desirable or undesirable characteristic(s) in order to identify potential investment opportunities, and (iii) identifying potential target real estate properties that might satisfy one or more criteria related to potential development projects. Other types of analyses may include analyzing proposed real estate transactions in detail in order to provide detailed analyses of the pros and cons of the proposed real estate transactions. Example details of potential analyses are provided below, although it should be noted that these potential analyses are for illustration and explanation only and do not limit the scope of this disclosure. Results of the predictive analytics and machine learning analyses 310 may be presented to users via one or more graphical user interfaces 314, which may or may not be the same graphical user interfaces 312 used by the geospatial analyses 308.

In some embodiments, various machine learning models 316 may be used to support or perform the geospatial analyses 308 or the predictive analytics and machine learning analyses 310. Each machine learning model 316 generally represents any suitable logical structure configured to support machine learning. Example types of machine learning models 316 that may be used here include deep neural networks (DNNs), convolution neural networks (CNNs), other neural networks, or other forms of machine learning models. In general, this disclosure is not limited to any specific type of machine learning model or any specific number of machine learning models.

Each machine learning model 316 may represent any suitable machine learning model that has been trained to perform a specified analysis routine or other data processing routine or function. For example, one or more machine learning models 316 can be trained to identify a potential real estate market or a portion thereof or to identify one or more real estate properties within an identified real estate market or a portion thereof. In some cases, one or more machine learning models 316 may be trained to identify specific types of real estate properties within a given area, where the given area is defined by a user or defined in any other suitable manner. As a particular example, at least one machine learning model 316 may be trained to process data (such as prior real estate transactions, construction permits, and e-commerce spending patterns) in order to identify likely areas where warehouses or other industrial/logistical spaces may be needed in the future. As another particular example, at least one machine learning model 316 may be trained to process data (such as prior real estate transactions, construction permits, demographics, migration patterns, and Internet search trends) in order to identify likely areas where senior living spaces may be needed in the future.

As still another particular example, at least one machine learning model 316 may be trained to process data (such as prior real estate transactions, construction permits, and land prices) in order to identify areas where developers are likely to develop residential or commercial properties.

In each of these use cases, at least one machine learning model 316 can be trained by providing the machine learning model(s) 316 with training data. The training data typically includes input data representing examples of the types of data to be processed by the machine learning model(s) 316 and known results (referred to as "ground truths") that should be produced by the machine learning model(s) 316 using the input data. The input data is provided to the machine learning model(s) 316, and the results produced by the machine learning model(s) 316 are compared to the ground truths. A loss function can be used to calculate losses or differences between the ground truths and the results produced by the machine learning model(s) 316, and weights or other parameters of the machine learning model(s) 316 can be adjusted in order to reduce the calculated losses. Ideally, over time, the machine learning model(s) 316 can be trained to produce results that are more similar to or that match the ground truths, at least to within a desired threshold level of accuracy.

Here, the specific input data and ground truths used to train the machine learning models(s) 316 can vary depending on the application or applications of the machine learning model(s) 316. For example, known real estate transactions, construction permits, and e-commerce spending patterns (input data) can be used along with known locations where warehouses or other industrial/logistical spaces were built (ground truths) to train at least one machine learning model 316 to estimate where industrial/logistical spaces may be needed in the future. Known real estate transactions, construction permits, demographics, migration patterns, and Internet search trends (input data) can be used along with known locations where senior living spaces were built (ground truths) to train at least one machine learning model 316 to estimate where senior living spaces may be needed in the future. Known real estate transactions, construction permits, and land prices (input data) can be used along with known locations of property developments (ground truths) to train at least one machine learning model 316 to estimate where property developments may occur in the future.

In the example shown in FIG. 3A, one or more sources 318 of real estate asset-level data may also be provided to the predictive analytics and machine learning analyses 310. Here, the sources 318 may include one or more data sources related to specific assets, one or more data sources related to specific transactions, and one or more data sources related to specific asset predictions. The one or more sources 318 related to specific assets may include internal or proprietary information related to specific assets, such as specific real estate properties or specific collections of real estate properties. The one or more sources 318 related to specific transactions may include internal or proprietary information related to specific transactions each involving one or more real estate assets, such as features or characteristics of specific transactions. The one or more sources 318 related to specific asset predictions may include internal or proprietary information related to projections or future predictions each involving one or more real estate assets, such as a projection of future growth or investment potential of one or more real estate assets.

One aspect of the operations performed during the geospatial analyses 308 or the predictive analytics and machine learning analyses 310 may involve the weighting of data differently depending on the types of real estate or real estate transactions being analyzed and the types of data being used. FIG. 3B illustrates an example weight matrix 350, which represents one possible implementation of these different weightings. As shown in FIG. 3B, labels 352 identify the different types of information available from the data sources 302, and labels 354 identify the different types of real estate or the different types of real estate transactions that can be analyzed. The weight matrix 350 includes various entries 356, each of which is associated with one of the labels 352 (one type of information) and one of the labels 354 (one type of real estate or one type of real estate transaction). Each entry 356 identifies or represents the weight that the associated type of information is given for analysis involving the associated type of real estate or the associated type of real estate transaction. Different entries 356 can identify or represent different weights, which allows different information to be weighted differently for the different types of real estate or the different types of real estate transactions.

In this particular example, for instance, the weight matrix 350 indicates that property performance and sales data is generally weighted more heavily for all of the various types of real estate or real estate transactions. Also, construction data is generally weighted more heavily for all of the various types of real estate or real estate transactions, but it is weighted somewhat less for hospitality-related real estate or real estate transactions. In contrast, travel and bookings data is generally weighted more heavily for hospitality-related real estate or real estate transactions, somewhat less for apartment/multi-family-related real estate or real estate transactions, even less for senior living facility-related real estate or real estate transactions, and least for office and industrial/logistics-related real estate or real estate transactions. However, note that these specific weights are for illustration only and can vary based on the circumstances.

The weights defined by the weight matrix 350 can be established for use by one or more of the geospatial analyses 308 or one or more of the predictive analytics and machine learning analyses 310 and (if needed) subsequently modified in any suitable manner. In some cases, these weights may be set manually, such as based on inputs from human personnel. In other cases, these weights may be set automatically, such as via machine learning. In those other cases, different machine learning models 316 may actually set the weights differently (even for the same types of information and real estate or real estate transactions) depending on the training of the machine learning models 316. Automated weighting may be particularly useful when at least one machine learning model 316 recognizes, while being trained, to use a correlation between a specific type of information and a specific type of real estate or real estate transaction that was previously-unknown to human personnel. For instance, while travel and bookings information might be known to human personnel to be related to hospitality-related real estate or real estate transactions, the human personnel might not have determined that travel and bookings information can also be used in conjunction with identifying or analyzing senior living facility-related real estate or real estate transactions. One or more machine learning models 316 may learn about that correlation during training and subsequently use that correlation during one or more analyses.

One example approach for designing and implementing at least part of the functionality of the architecture 300 is now described. Note that this specific approach is provided for illustration and explanation only and does not limit the scope of this disclosure to this specific approach. Any other suitable approach may be used for designing and implementing at least part of the functionality of the architecture 300.

In one example approach, discussions with human personnel, such as those on real estate deal teams, can be performed in order to understand their strategies at a high level, such as to identify what those personnel consider to be "good" real estate transactions, what their business plans are, and what their investment horizons are. This can be done for one or multiple types of "verticals," meaning one or multiple types of real estate. As noted above, real estate transactions are often highly location-driven, and this can also be done for one or multiple locations or regions. Once the strategies are understood, an analysis can occur in order to identify the driving factors of real estate markets or real estate transactions and to identify areas of uncertainty that (if clarified) could change people's views of a real estate market or a real estate transaction. Once those areas of uncertainty are identified, one or more data sources 302 may be identified, where the one or more data sources 302 could (at least potentially) provide information that might be useful in addressing one or more of those areas of uncertainty. At least one data pipeline 303 or other mechanism for obtaining data from the one or more data sources 302 can be defined or otherwise established, which allows for data from the one or more data sources 302 to be pulled into the data warehouse or other data storage. In addition, at least one machine learning model 316 or other logic can be designed and placed into operation for use in processing data, including at least some of the data from the one or more data sources 302. This process (or one or more portions of this process) can be iterated or repeated over time, which may allow for continuous, periodic, or other improvements to the data that is obtained and the analyses that are performed using the architecture 300.

Overall, the architecture 300 here can be used to perform a number of different functions in order to support any desired higher-level applications. For example, a graphical user interface 312 may present an interactive map that supports geospatial queries, meaning the graphical user interface 312 can be used by a user to define a geographical area (at a desired level of granularity) so that relevant data obtained from the data sources 302 related to that geographical area can be retrieved and analyzed. This may allow, for instance, specific demographic, market, or other data to be obtained and used to perform transaction analyses and track comparable transactions within the geographical area. The transaction analyses that are performed can evolve over time in order to help optimize the tactics that are used by personnel, which can be enabled through clearer understandings of underlying (and often ever-changing) market fundamentals. The transaction analyses can also take into account data from non-traditional data sources 302 that are not normally used for real estate analyses.

As other examples, information related to various real estate markets or submarkets can be obtained and analyzed in order to understand drivers or other key characteristics affecting market performance. This knowledge can then be used to identify real estate markets or submarkets that have high potentials for successful investments. This may allow, for instance, potential markets or submarkets to be ranked based on their key characteristics. This may also allow identification of the data that is more useful in terms of estimating which real estate properties or real estate markets or submarkets are most promising. These types of functions may be used to help identify high-quality assets earlier in their lifecycles, which can help to increase or maximize investment returns.

As still other examples, market or other third-party data can be combined with internal or proprietary data (such as data associated with real estate properties owned by an organization using the architecture 300) in order to generate predictions that are useful for optimizing costs or driving other revenue opportunities. For instance, analyses can be performed in order to estimate marketing timing signals (such as by identifying when it may be ideal or preferred to buy or sell real estate properties), estimate asset allocations (such as by identifying ideal or preferred divisions of assets in an investment portfolio), or perform portfolio balancing (such as by buying or selling assets in an investment portfolio to reach an ideal or preferred asset allocation). Analyses can also be performed based on energy usages or other utility usages of real estate properties in order to identify anomalous utility usages (such as excessive energy consumption). This knowledge can be used to identify or initiate remedial actions to reduce energy consumption or other anomalous utility usages by one or more real estate properties, which may be useful in applications such as environmental, social, and governance (ESG) analytics. In addition, analyses can be performed to identify relationships between personnel or organizations, which may be useful in terms of identifying whether relationships with targeted individuals or other contacts may be available. These types of relationships can often be leveraged in order to increase or optimize lease-up times and retentions or perform other functions.

It should be noted here that the predictive analytics and machine learning analyses 310 may support any suitable analytics or other analyses involving real estate-related data and non-real estate-related data. In some cases, the analyses may be relatively straightforward and involve processing specified data, such as specified data associated with a geographical area defined by a user using a graphical user interface 312. In other cases, derivative analytics may be used in which specified data, such as specified data associated with a geographical area defined using a graphical user interface 312, is processed to identify specific features or other additional information and then that additional information is processed (possibly along with the original specified data). In still other cases, predictive analytics may be used in which specified data (which may include the original specified data or the derived data) is processed and used to make predictions about future characteristics of real estate properties or real estate markets/submarkets.

It should also be noted that the functions shown in or described with respect to FIGS. 3A and 3B can be implemented in one or more application servers 106 or other device(s) in any suitable manner. For example, in some embodiments, at least some of the functions shown in or described with respect to FIGS. 3A and 3B can be implemented or supported using one or more software applications or other software instructions that are executed by the processing device(s) 202 of the application server(s) 106 or other device(s). In other embodiments, at least some of the functions shown in or described with respect to FIGS. 3A and 3B can be implemented or supported using dedicated hardware components. In general, the functions shown in or described with respect to FIGS. 3A and 3B can be performed using any suitable hardware or any suitable combination of hardware and software/firmware instructions.

Although FIGS. 3A and 3B illustrate one example of a functional architecture 300 for intelligent geospatial analyses and machine learning predictions for real estate, various changes may be made to FIGS. 3A and 3B. For example, the numbers and types of data sources 302 that are used can easily vary based on the implementation, and the numbers and types of data sources 302 that are currently used can expand or contract based on changing analysis requirements or other factors. Also, the functional architecture 300 can be used to perform any desired geospatial analyses, predictive analytics, and machine learning analyses, and the numbers and types of analyses that are currently used can expand or contract based on changing analysis requirements or other factors. While certain examples of these analyses are described above and below, these analyses are for illustration and explanation only.

Figure 4:
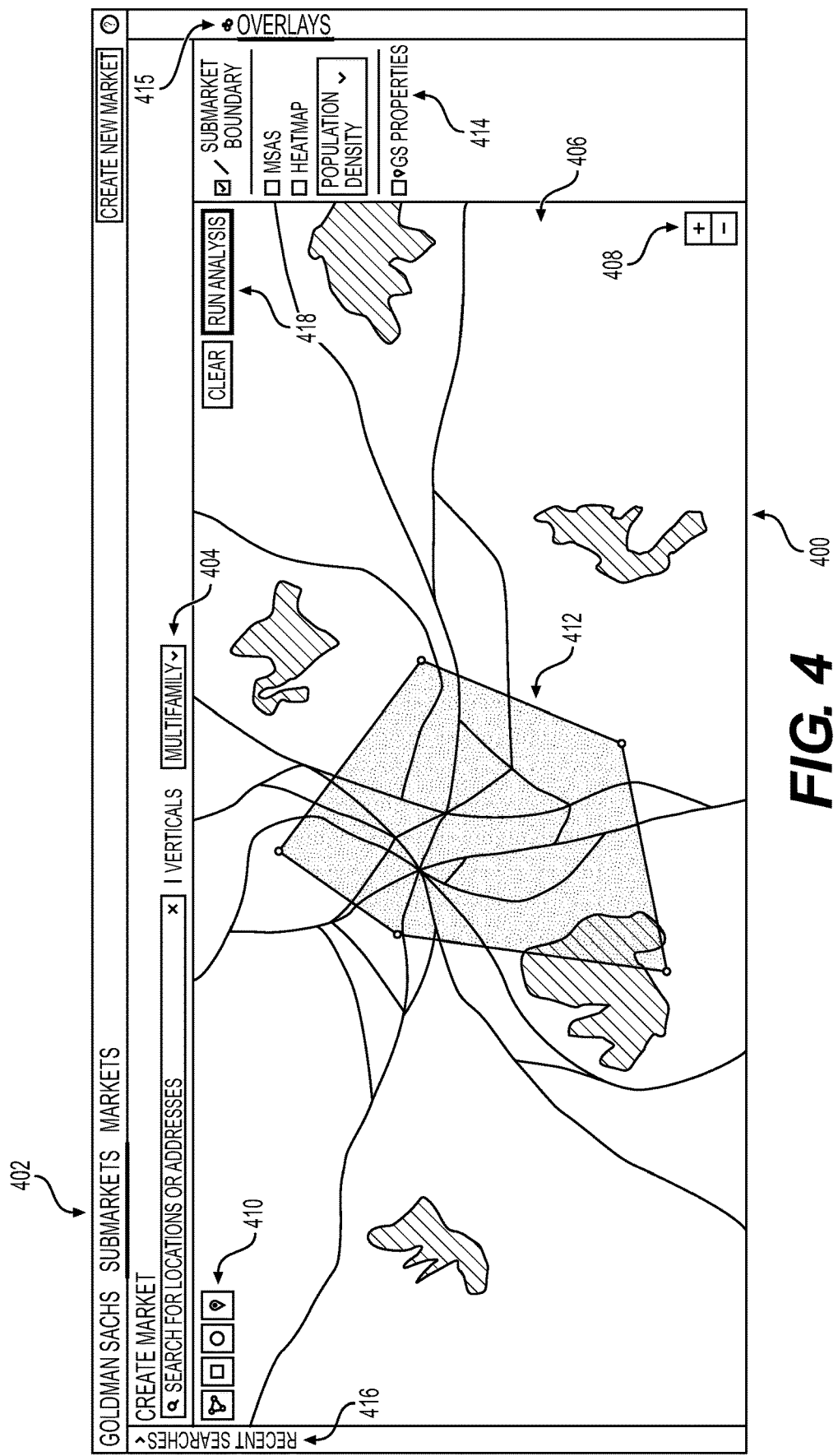
FIGS. 4 and 5 illustrate an example user interface for defining a real estate market or portion thereof for analysis according to this disclosure.
Figure 5:
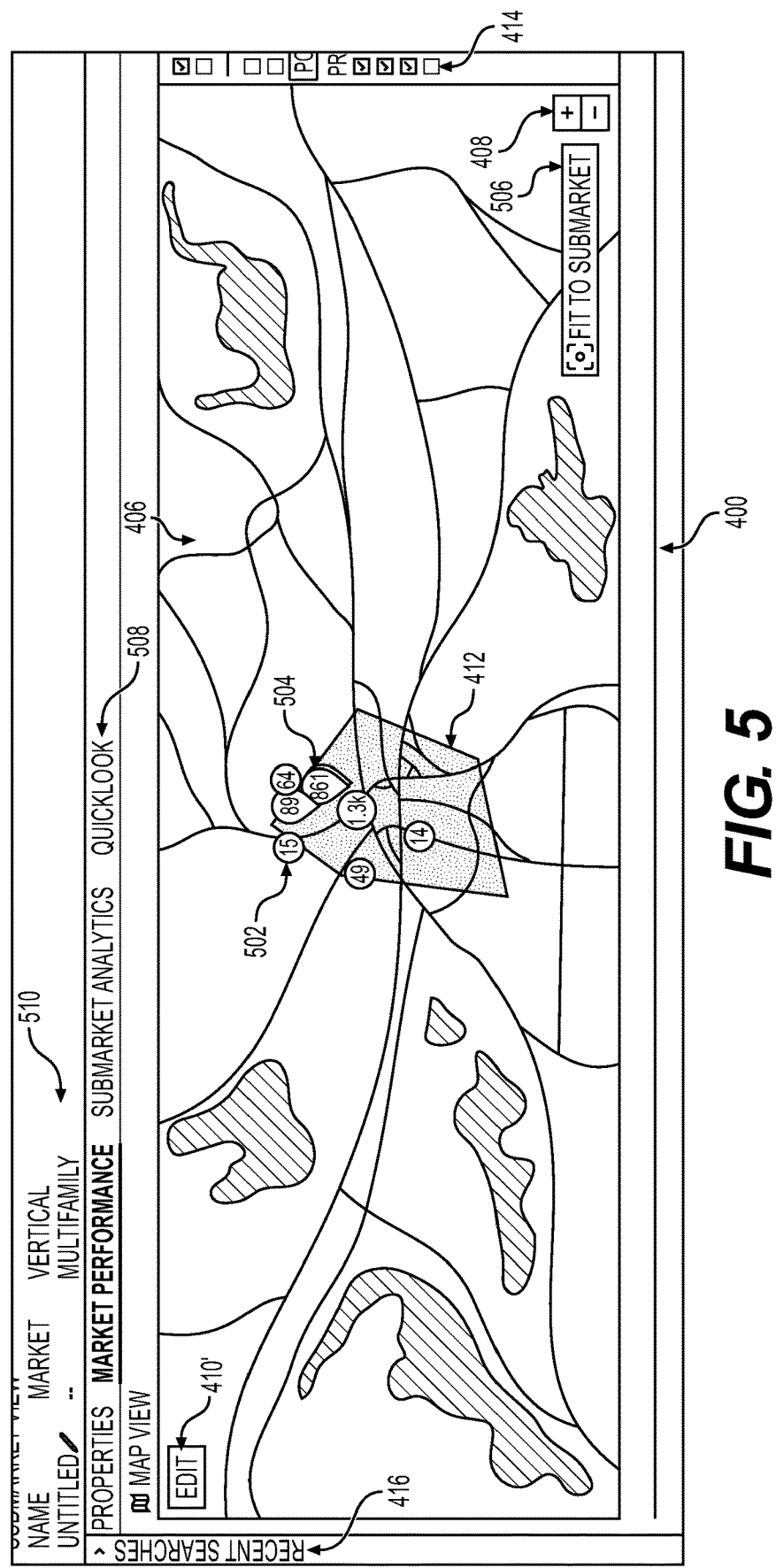

FIGS. 4 and 5 illustrate an example user interface 400 for defining a real estate market or portion thereof for analysis according to this disclosure. The user interface 400 may, for instance, represent a specific implementation of a graphical user interface 312 within the functional architecture 300. For ease of explanation, the user interface 400 of FIGS. 4 and 5 may be used or provided by one or more applications 112 executed by the application server 106 of FIG. 1, where the application server 106 may be implemented using one or more devices 200 of FIG. 2. For example, the user interface 400 may be used as part of the geospatial analyses 308 to define a geographical area so that information related to that geographical area can be retrieved and analyzed. However, the user interface 400 may be implemented using or provided by any other suitable device(s) and in any other suitable system(s).

As shown in FIG. 4, the user interface 400 includes controls 402 that allow a user to indicate whether a market or submarket is being defined. A market typically represents a larger geographical area, and a submarket typically represents a smaller geographical area within a market. A single market may include multiple submarkets and, depending on the size of the market, could include numerous submarkets. The user interface 400 also includes controls 404 that allow the user to begin the process of defining a market or submarket. In this example, the controls 404 include a text box that allows the user to enter a specific property address or location (such as a city, county, MSA, state/province, or zip/postal code) and a drop-down menu that allows the user to select a specific type of real estate within the market or submarket being defined, which is often referred to as a "vertical." In some cases, the drop-down menu may include the types of real estate identified by the labels 354 discussed above.

The user interface 400 further includes an interactive map 406 that can display geographical content and that can be modified based on user input. In some cases, the interactive map 406 may be blank or set to display a default geographical area upon startup. Once the user enters data into the text box of the controls 404 to begin defining a market or submarket, the interactive map 406 can be updated to display a geographical area that contains the market or submarket being defined by the user. For example, the user may enter a city, county, MSA, state/province, or zip/postal code into the text box, and the interactive map 406 can be updated to display a geographical area that includes the city, county, MSA, state/province, or zip/postal code.

Controls 408 can be used by the user to zoom in or zoom out within the interactive map 406. Also, controls 410 can be used by the user to precisely identify the market or submarket within the interactive map 406. For example, a first control (represented using a triangle with circles at its vertices) may be selected by the user, in which case the user can define the market or submarket within the interactive map 406 by creating and modifying a polygon within the interactive map 406, such as by creating and moving the vertices of the polygon within the interactive map 406. A second control (represented using a square) may be selected by the user, in which case the user can define the market or submarket within the interactive map 406 by creating and modifying a square or other rectangle within the interactive map 406, such as by creating, moving, and resizing the rectangle within the interactive map 406. A third control (represented using a circle) may be selected by the user, in which case the user can define the market or submarket within the interactive map 406 by creating and modifying a circle within the interactive map 406, such as by creating, moving, and resizing the circle within the interactive map 406. A fourth control (represented using a location icon) may be selected by the user, in which case the user can define the market or submarket within the interactive map 406 by placing a location marker within the interactive map 406 and optionally defining an area around or including the location marker within the interactive map 406, such as by defining a polygon, rectangle, or circle centered on or including the location marker. In this specific example, the user has used the first control 410 and identified a market or submarket 412, which is defined here using a polygon, within the interactive map 406.

Controls 414 in the user interface 400 may allow the user to indicate what additional content (if any) is displayed within or overlaid over the interactive map 406. For example, a "submarket boundary" checkbox may be used to selectively display or hide a boundary of any submarket that was previously defined and that falls at least partially within the geographical area currently shown in the interactive map 406. An "MSAs" checkbox may be used to selectively display or hide a boundary of any MSA that falls at least partially within the geographical area currently shown in the interactive map 406. A "heatmap" checkbox may be used to selectively display or hide specified information within the interactive map 406, where the specified information can be selected using a drop-down menu. The drop-down menu may include any suitable types of information that might be displayed within the interactive map 406, such as population density, population growth, or demographic data. One or more "properties" checkboxes may be used to selectively display or hide certain real estate properties within the interactive map 406, such as real estate properties owned by one or more specified entities or real estate properties matching the vertical (like warehouses, senior living facilities, hotels, or restaurants) selected using the associated control 404. In some cases, the controls 414 may be selectively presented and hidden, such as by clicking on an "overlays" control 415 to the right of the controls 414. Also, in some instances, prior searches made by a user can be saved and then accessed via a control 416.

In addition, controls 418 in the user interface 400 may allow the user to clear the current settings related to the interactive map 406 (such as by resetting the interactive map 406 to its initial state) or to initiate one or more analyses based on the current market or submarket 412 defined in the interactive map 406. In some cases, the one or more analyses may initially involve identifying any real estate properties within the current market or submarket 412 defined in the interactive map 406 (and possibly within the geographical area currently shown in the interactive map 406) that satisfy the user's search criteria, such as any real estate properties of the type defined using the drop-down menu of the controls 404. This may result in updating the user interface 400 as shown in FIG. 5, where the current market or submarket 412 is now associated with one or more property count indicators 502. Each property count indicator 502 contains a numerical value identifying a number of real estate properties within or associated with the defined market or submarket 412 that satisfy the user's search criteria. Each property count indicator 502 may be positioned roughly where the identified property or properties are located within the geographical area currently shown in the interactive map 406. In this example, the user has also selected one or more of the "properties" checkboxes, and any matching property can be identified in the interactive map 406 using a property marker 504. This may, for instance, allow the user to identify positions of the real estate properties that satisfy the user's search criteria in relation to one or more other properties.

In the example of FIG. 5, the controls 410 are shown as being collapsed or otherwise combined into a single "edit" control 410', which may be selected to reveal the controls 410 again. Also, a control 506 may be selected to cause the interactive map 406 to zoom in or zoom out in order to fit the defined market or submarket 412 within the interactive map 406. For example, selecting this control 506 may cause the user interface 400 to center the defined market or submarket 412 within the interactive map 406 and display the entire defined market or submarket 412 within the interactive map 406.

Controls 508 may be used to present additional information within the user interface 400 or to present additional information within another user interface. For example, a "properties" option in the controls 508 may allow the user to view a listing of the identified properties within or associated with the defined market or submarket 412 that satisfy the user's search criteria. A "market performance" option in the controls 508 may allow the user to view performance information about the identified properties within or associated with the defined market or submarket 412, such as rents or other income generated by the identified properties or occupancy or vacancy information associated with the identified properties. A "submarket analytics" option in the controls 508 may allow the user to view other results from one or more initial analyses of the identified properties within or associated with the defined market or submarket 412. A "quick look" option in the controls 508 may allow the user to view an initial comparison of the identified properties within or associated with the defined market or submarket 412 against one or more benchmarks or other comparisons. An information section 510 here presents information about the defined market or submarket 412 and may give the user an option to rename the market or submarket 412 (and optionally to save the search).

As can be seen here, the user interface 400 provides a mechanism for users to define and refine geospatial searches associated with real estate properties. The geospatial searches can be performed at any desired level of granularity, and initial feedback from the geospatial searches may allow users to modify or update their searches as needed or desired to broaden or narrow the scopes of their searches to achieve desired coverage. Once a market or submarket 412 is defined, the architecture 300 can retrieve data associated with that market or submarket 412 for subsequent analysis by the predictive analytics and machine learning analyses 310.

Although FIGS. 4 and 5 illustrate one example of a user interface 400 for defining a real estate market or portion thereof for analysis, various changes may be made to FIGS. 4 and 5. For example, the content, layout, and arrangement of the user interface 400 are for illustration only and can easily vary as needed or desired. Also, the specific input/output mechanisms (such as text boxes, checkboxes, and drop-down menus) are for illustration only and can easily vary as needed or desired. In general, user interfaces and their associated input/output mechanisms can be highly customizable, and the user interface 400 may be implemented in a number of other configurations.

FIGS. 6A through 12 illustrate example user interfaces 600-1200 for presenting analysis results associated with a real estate market or portion thereof according to this disclosure. The user interfaces 600-1200 may, for instance, represent specific implementations of graphical user interface 314 within the functional architecture 300. For ease of explanation, the user interfaces 600-1200 of FIGS. 6A through 12 may be used or provided by one or more applications 112 executed by the application server 106 of FIG. 1, where the application server 106 may be implemented using one or more devices 200 of FIG. 2. For example, the user interfaces 600-1200 may be used as part of the predictive analytics and machine learning analyses 310 to present the results of specific types of analyses. However, the user interfaces 600-1200 may be implemented using or provided by any other suitable device(s) and in any other suitable system(s).

Figure 6A:
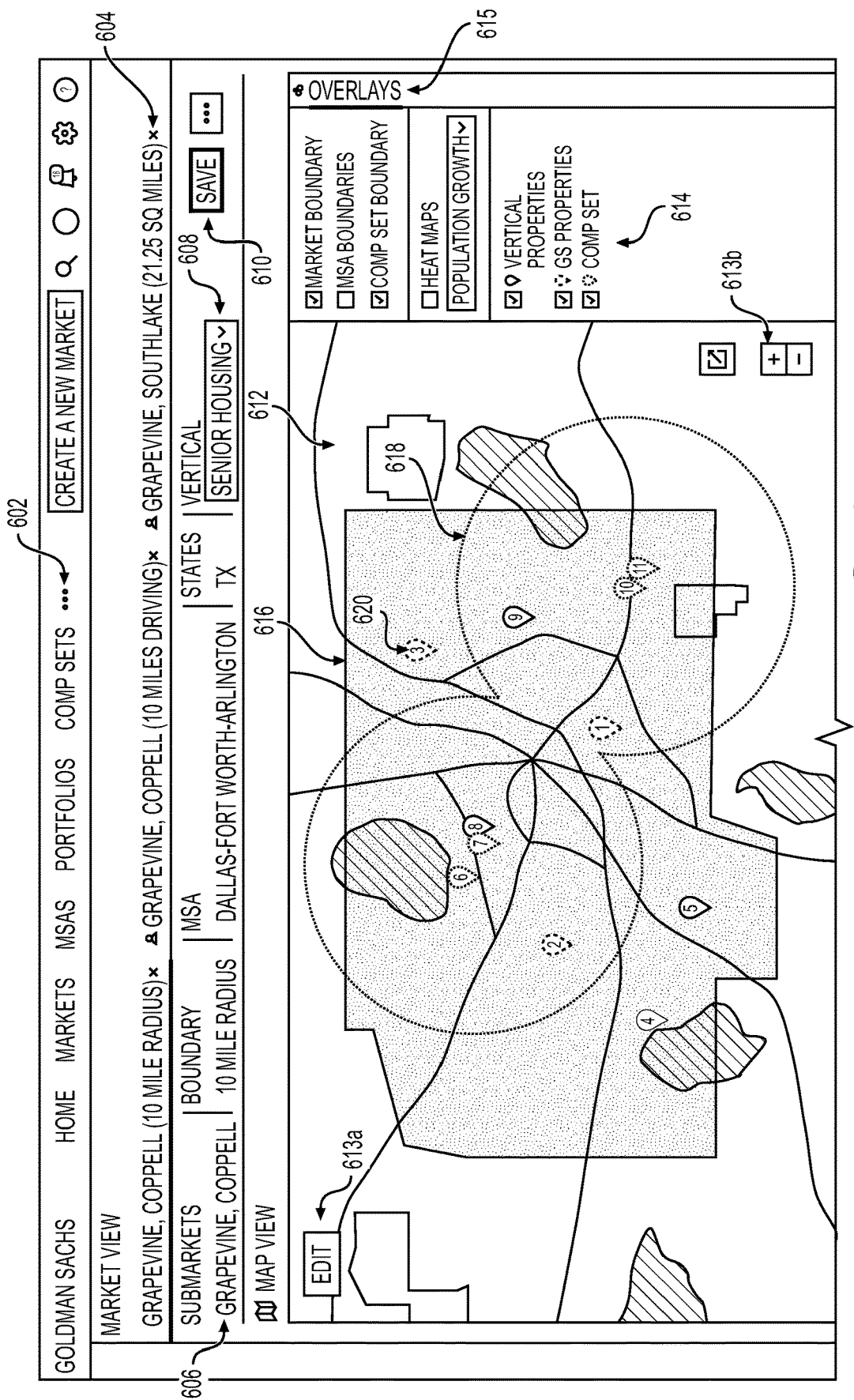
FIGS. 6A through 12 illustrate example user interfaces for presenting analysis results associated with a real estate market or portion thereof according to this disclosure.
Figure 6A:
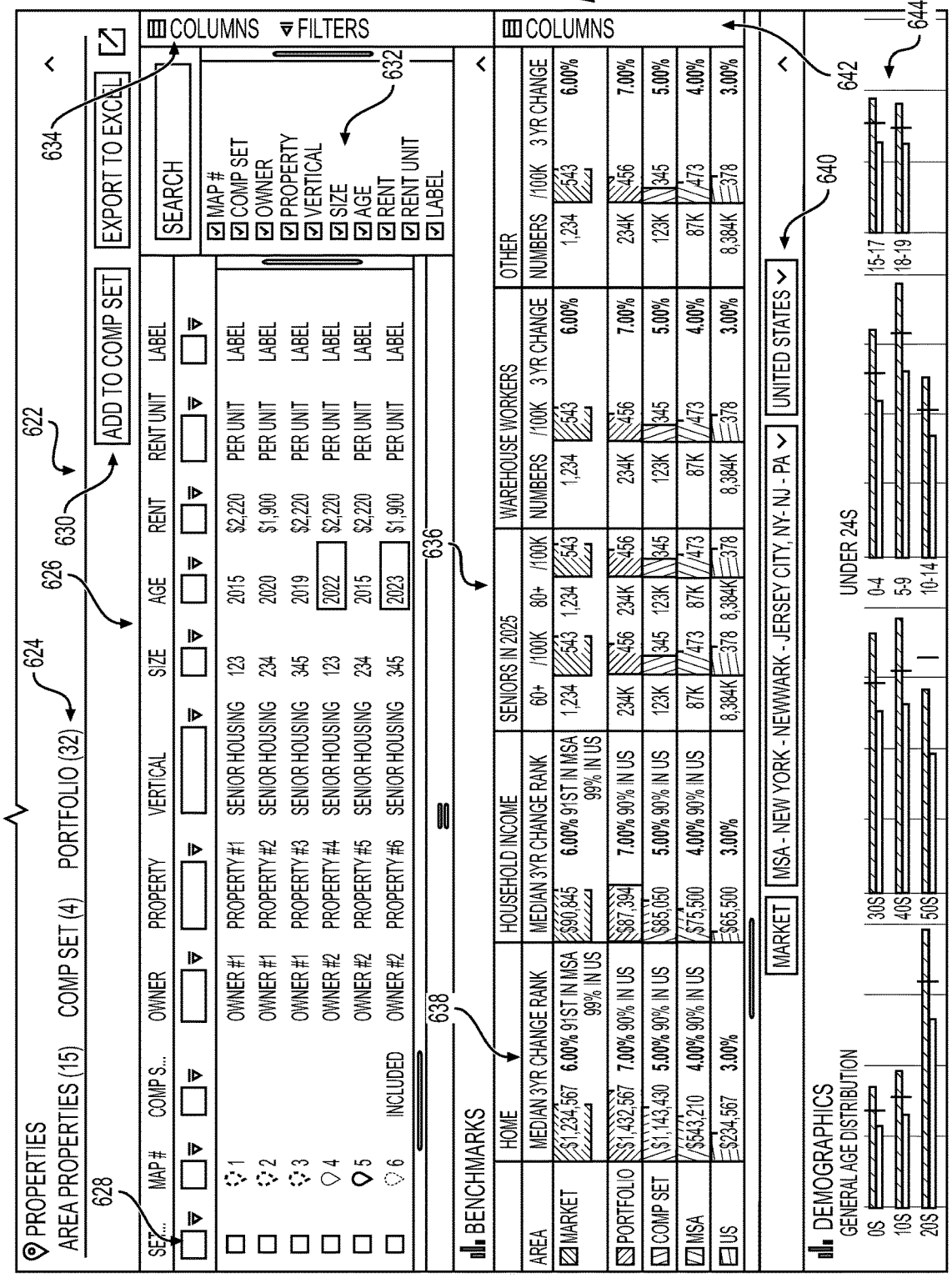
Figure 6B:
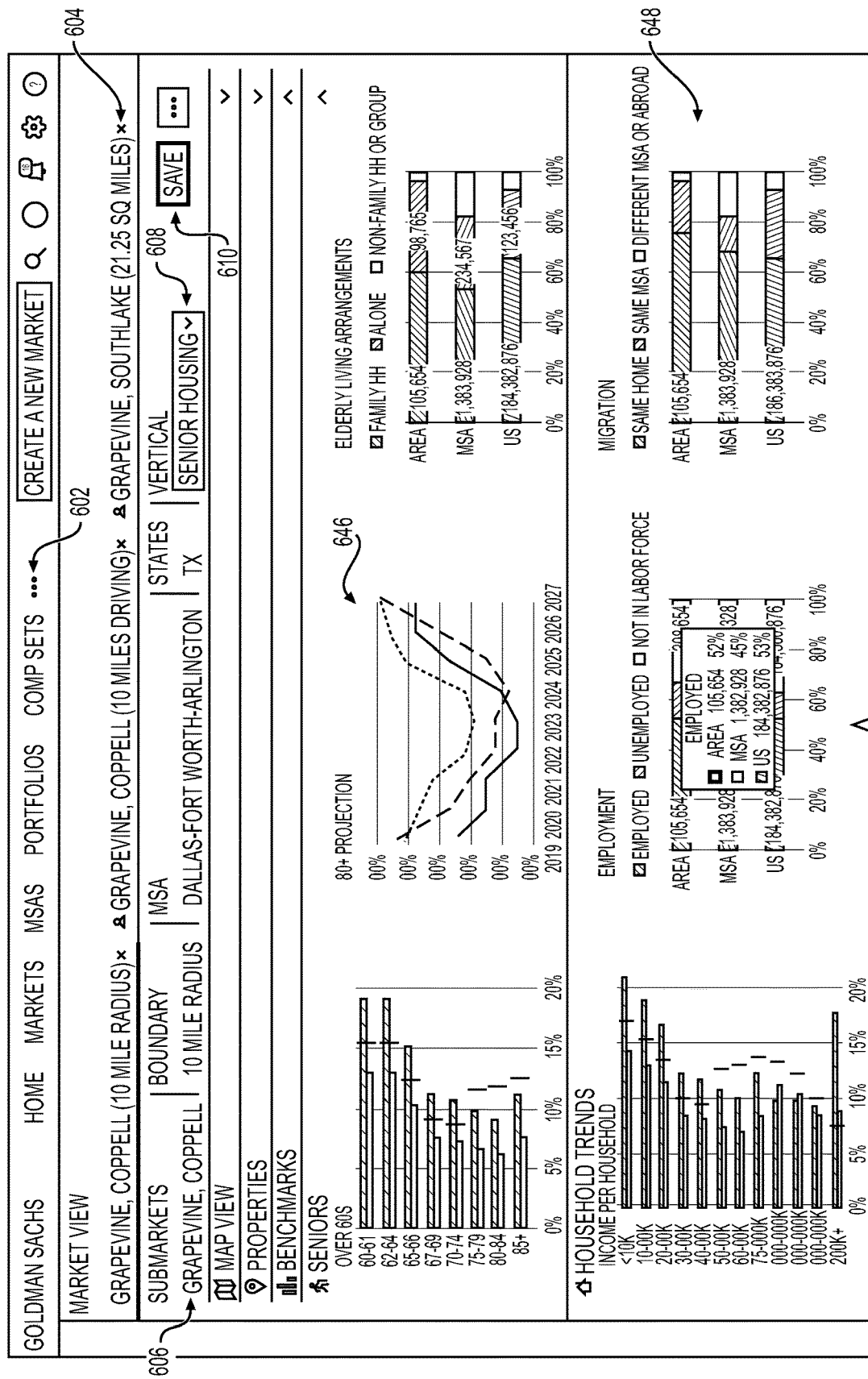
Figure 6B:
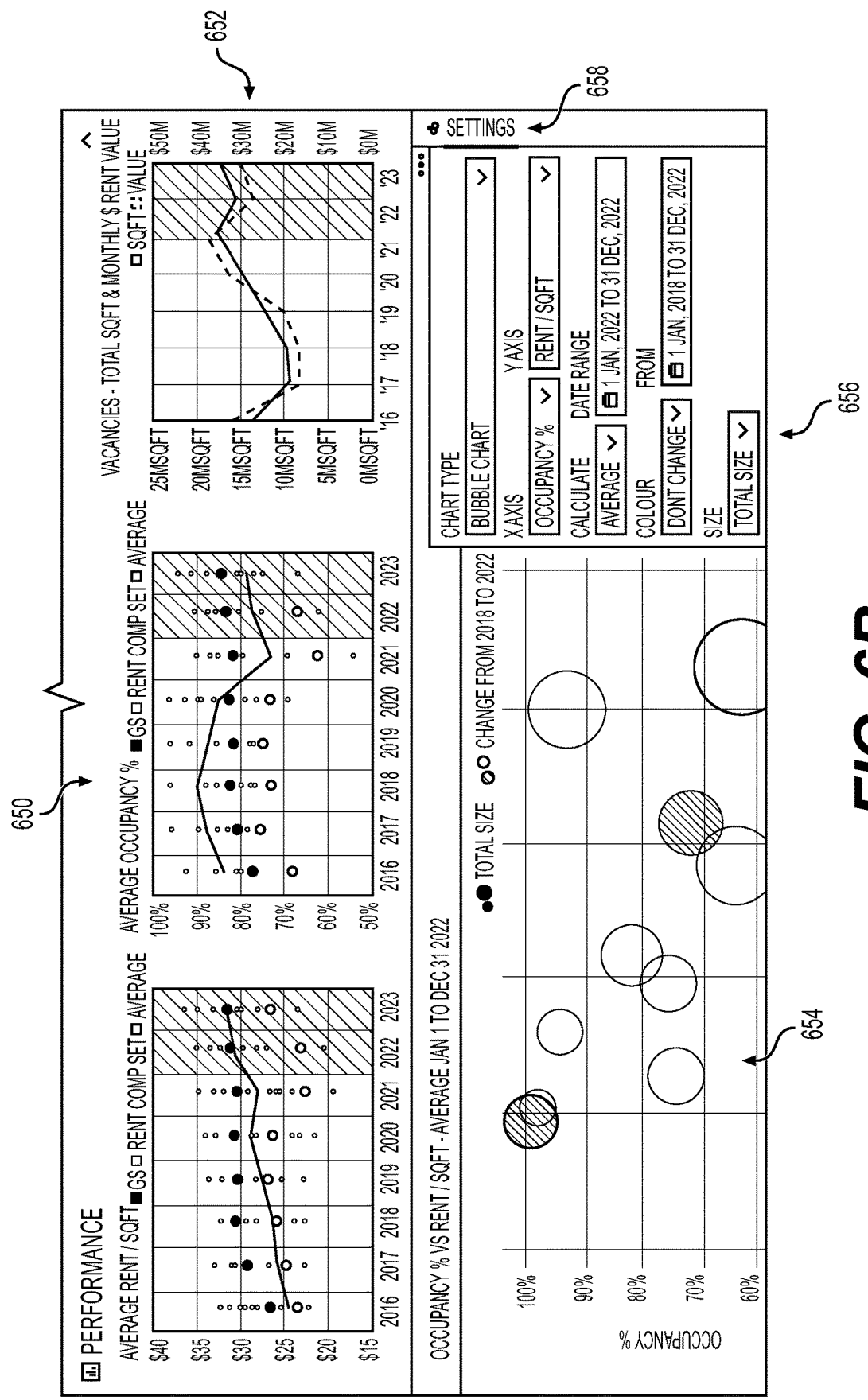

As shown in FIGS. 6A and 6B, a user interface 600 can be used to present analysis results associated with a specified real estate market. In this example, the user interface 600 includes controls 602 that allow a user to specify whether the user wishes to view his or her homepage, see information associated with markets or MSAs, or see information associated with investment portfolios or comparable property sets. As noted above, the user's homepage may be used to present customized or other information to the user, such as market watch lists, news, and research, and may allow the user to quickly dive back into his or her daily workflows. In this case, the markets option has been selected, and analysis results associated with a selected market are being presented.

The user interface 600 here includes a listing 604 of potential geospatial searches that the user may have previously defined and saved and that are associated with a given real estate market. In some cases, the geospatial searches that are associated with the given real estate market can be defined via the user interface 400 as described above. In this example, the geospatial searches include a first geospatial search defined using a radius from a specified location, a second geospatial search defined using a driving distance from a specified location, and a third geospatial search defined using a municipal boundary. Here, the first geospatial search has been selected, and information 606 associated with the selected geospatial search is shown in the user interface 600. The information 606 includes general information about the selected geospatial search, such as one or more submarkets associated with the geospatial search (if any), a boundary associated with the geospatial search, an MSA associated with the geospatial search (if any), and one or more states associated with the geospatial search. A control 608 (such as in the form of a drop-down menu) may allow the user to select at least one specific vertical within the given real estate market, and controls 610 (such as in the form of buttons) may allow the user to save options selected by the user within the user interface 600 or initiate other functions.

An interactive map 612 presents the selected geospatial search or the given real estate market within a geographical area. The interactive map 612 may, for example, be the same as or similar to the interactive map 406 described above. Here, the interactive map 612 can identify the selected geospatial search or the given real estate market within a larger geographical area, although the specific geographical area presented in the interactive map 612 can be controlled by the user. For instance, the interactive map 612 may include controls 613a-613b that allow the user to edit the defined market, zoom in or zoom out within the interactive map 612, or expand the interactive map 612.

Controls 614 may allow the user to indicate what additional content (if any) is displayed within or overlaid over the interactive map 612. In some cases, the controls 614 may be the same as or similar to the controls 414 discussed above, although the controls 614 may include other or additional options for selection by the user. In this example, "market boundary" and "MSA boundary" checkboxes may be used to selectively display or hide a boundary of the market and a boundary of any MSA that respectively falls at least partially within the geographical area currently shown in the interactive map 612. A "comp set boundary" checkbox may be used to selectively display or hide a boundary of any comparable property within the geographical area currently shown in the interactive map 612. The user may identify a property as a comparable property so that other similar properties may be identified and presented to the user, and the boundary of a comparable property may define the area in which other similar properties may be identified. A "heatmap" checkbox may be used to selectively display or hide specified information within the interactive map 612, and the specified information can be selected using a drop-down menu. The drop-down menu may include any suitable types of information that might be displayed within the interactive map 612, such as population density, population growth, or demographic data. One or more "properties" checkboxes may be used to selectively display or hide certain real estate properties within the interactive map 612, such as real estate properties owned by one or more specified entities, real estate properties matching the vertical selected using the control 608, or comparable real estate properties. In this specific example, the "market boundary" checkbox is selected, and a market boundary 616 is presented in the interactive map 612. Also, the "comp set boundary" checkbox is selected, and a boundary 618 is presented in the interactive map 612 for each comparable property (if any) within the interactive map 612. In addition, one or more property markers 620 can be used to identify one or more properties associated with any selected property type checkboxes. In some cases, the controls 614 may be selectively presented and hidden, such as by clicking on an "overlays" control 615 to the right of the controls 614.

A properties section 622 of the user interface 600 identifies real estate properties within or associated with the given market that were identified during the geospatial search. In this example, the properties section 622 includes controls 624 that may allow the user to view a listing of all identified real estate properties within or associated with the given market, real estate properties identified as being comparable properties within or associated with the given market, or real estate properties within a given investment portfolio. The properties section 622 also includes a listing 626 that identifies various real estate properties, which can be based on the selected control 624. Here, each real estate property included in the listing 626 may be identified by its owner and address. Additional information presented in the listing 626 for each real estate property may include its associated vertical, size, age, rent, how the rent is calculated (such as per unit or per square foot), and an optional label. Each real estate property included in the listing 626 may also be associated with a marker (such as a marker having a specified color or shading) and a numerical value, which can be used to identify the type of property and the location of that property within the interactive map 612. Each real estate property included in the listing 626 may be further associated with an indicator of whether that property has been marked as being a comparable property. In addition, each real estate property included in the listing 626 may be associated with a checkbox, which allows the user to select properties and perform certain functions for the selected properties.

Controls 628 may allow the user to select or deselect all real estate properties included in the listing 626, search for or filter real estate properties within the listing 626, or sort the real estate properties in the listing 626 (such as in ascending or descending order). Controls 630 may allow the user to add any selected real estate properties in the listing 626 as comparable properties, to export information associated with selected or all real estate properties in the listing 626, and to expand the size of the properties section 622. Controls 632 may allow the user to define which columns of information are presented in the listing 626, to search for specific types of columns, or to filter the information in the listing 626 based on one or more criteria (such as maximum, minimum, or ranges on the size, age, rent, or label of the properties). The controls 632 may be selectively presented and hidden, such as by clicking on "columns" and "filters" controls 634 to the right of the controls 632.

A benchmark analysis results section 636 compares information about one or more of the real estate properties included in the listing 626 with one or more benchmarks. In this example, the benchmark analysis results section 636 includes various determined values 638 related to home values, household incomes, senior demographics, warehouse worker populations, and other worker populations within different regions. Here, the different regions include the market being analyzed, a broader market or markets associated with real estate properties in an investment portfolio, a broader market or markets associated with comparable properties, a selected MSA, and a selected country. Controls 640 can provide a legend (such as different colors) used to represent at least some of the different regions in the benchmark analysis results section 636 and to control which MSA and which country are used in the benchmark analysis results section 636. The benchmark analysis results section 636 may also identify changes in at least some of the determined values 638 over time, such as three-year changes. In addition, for the first four rows of results, the benchmark analysis results section 636 can identify rankings of the determined values relative to all values within the selected country. A "columns" control 642 may be used to selective show and hide additional controls that allow the user to define which columns are presented in the benchmark analysis results section 636 or to control the types of information presented for at least some of the determined values 638, such as to adjust the time period for the changes over time.

Various types of market information are also presented in the user interface 600 for the selected market. Here, the market information includes demographic information 644, which generally identifies overall demographics associated with the selected market. In this example, the demographic information 644 includes a general age distribution and an age distribution for people under 24 years of age in the selected market. The market information also includes senior demographic information 646, which generally identifies senior demographics associated with the selected market. In this example, the senior demographic information 646 includes age distributions for people in their 60s or older, projections of senior populations aged 80 or older, and senior living arrangements. The age distributions, projections, and senior living arrangements shown here may include information for the selected market, an associated MSA (if any), and a larger region (such as a country), which may facilitate comparisons of the senior demographics for the selected market against senior demographics for one or more larger areas. In the senior living arrangements data, "family HH" refers to seniors living in family households, "alone" refers to seniors living by themselves, and "non-family or group HH" refers to seniors living in households that are not family households or are group households (such as senior living facilities).

The market information further includes household trend information 648, which generally identifies overall household trends associated with the selected market. In this example, the household trend information 648 includes household income, employment status, and migration information. For the migration information, the household trend information 648 can identify populations that remain in their same households, move within their same MSAs, or move out of their current MSAs (such as to different MSAs or locations abroad). Again, these trends can include information for the selected market, an associated MSA (if any), and a larger region (such as a country), which may facilitate comparisons of the household trends for the selected market against household trends for one or more larger areas.

In addition, the user interface 600 includes a performance section 650, which provides information related to the overall economic performances of real estate properties associated with the selected market. In this example, the performance section 650 includes various plots 652 illustrating different aspects of the economic performances of the real estate properties associated with the selected market. Here, the plots 652 include graphs related to rent information (such as average rent per square foot or other measure), occupancy information (such as average occupancy rate over time), and vacancy information (such as vacancies expressed as total square feet or other space measure and total monetary value over time) for the real estate properties associated with the selected market. In one or more of the plots 652, the economic performances of different real estate properties associated with the selected market (such as owned properties and comparable properties) may be identified as points, and average values or other values of the economic performances may be identified as lines.

The performance section 650 also includes an adjustable chart 654 that can be used to present selectable information related to changes in economic performances over time to the user. In this example, the adjustable chart 654 is associated with controls 656 that may allow the user to define the form of the adjustable chart 654, such as by selecting a bubble chart, bar chart, or other type of graphical presentation. The controls 656 may also allow the user to define what information is presented along the x-axis and y-axis of the adjustable chart 654. For instance, the user may be permitted to display occupancy rate, vacancy rate, or other values along one axis and average rents or other values along another axis. The controls 656 may further allow the user to define how data values are calculated for the adjustable chart 654 (such as average or median values) and the date ranges over which the values are calculated. The controls 656 may also allow the user to define the meanings of colors or other indicators in the adjustable chart 654, such as when the colors or other indicators can be used to represent changes to the displayed values over time. In addition, the controls 656 may allow the user to define the meanings of the bubble sizes in the adjustable chart 654, such as when the bubbles are used to represent the total sizes of market performances.

As shown in FIGS. 7A through 7D, a user interface 700 can be used to present analysis results associated with a specified real estate submarket. In this example, the user interface 700 includes controls 702 that allow a user to specify whether the user wishes to view his or her homepage, see information associated with submarkets or MSAs, or see information associated with investment portfolios. In this case, the submarkets option has been selected, and analysis results associated with a selected submarket are being presented.

Figure 7A:
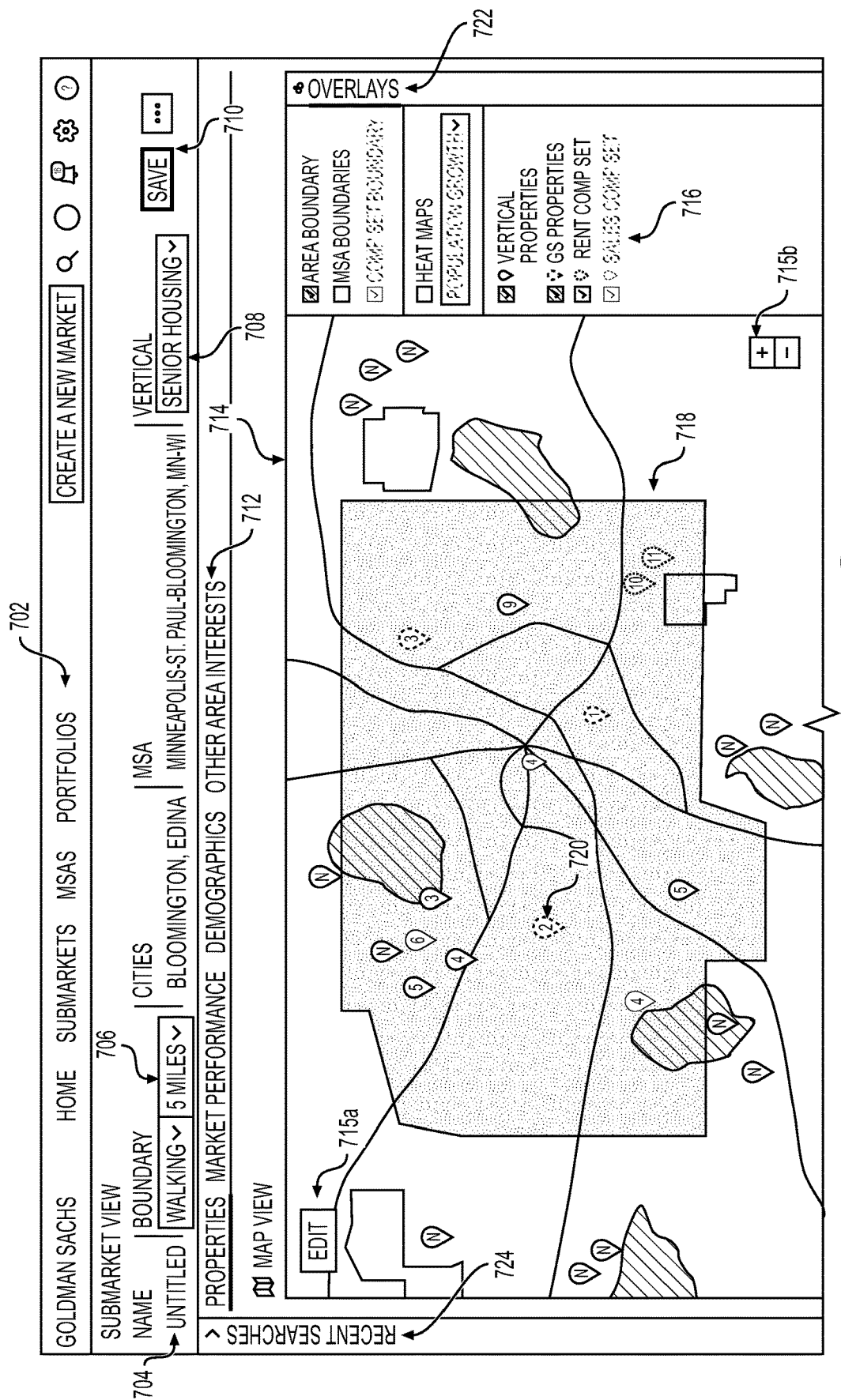
Figure 7A:
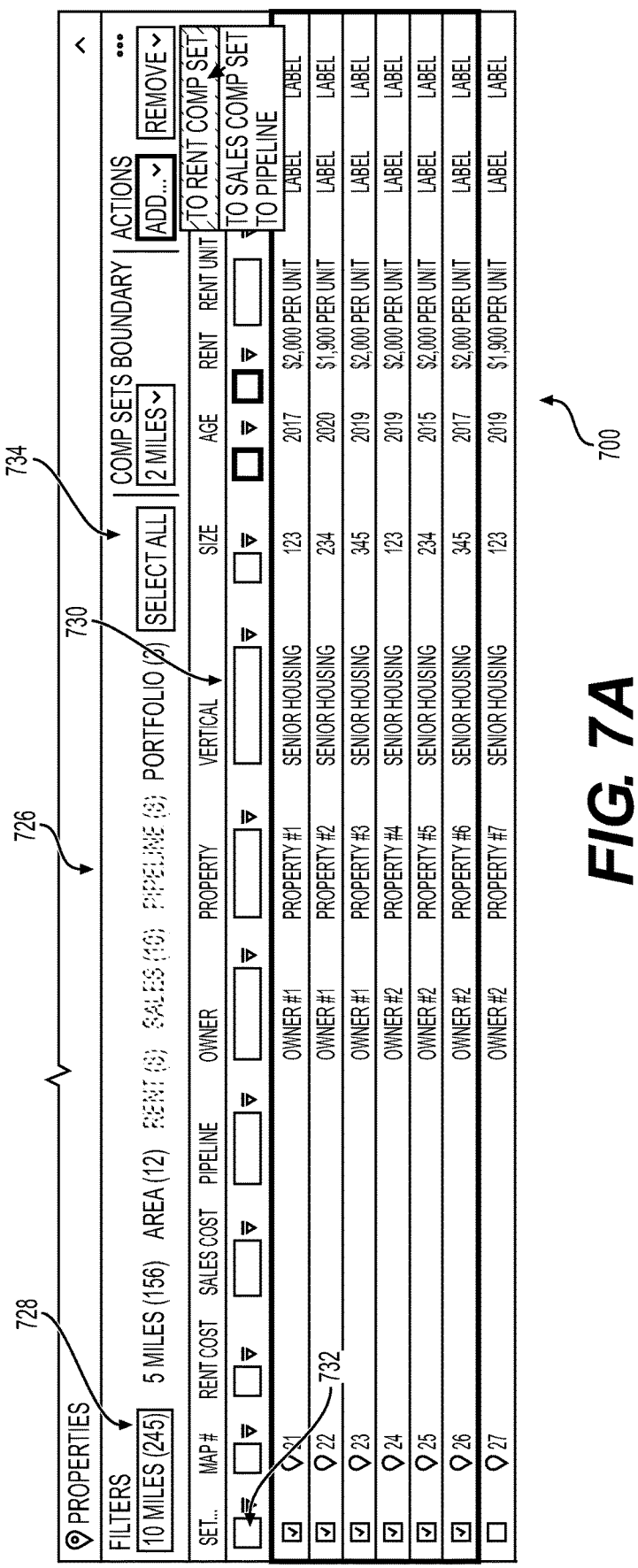

Information 704 associated with the selected submarket is shown in the user interface 700. The information 704 includes general information about the selected submarket, such as its name (if any), its boundary, one or more cities associated with the submarket, and an MSA (if any) associated with the submarket. Controls 706 (such as in the form of drop-down menus) may allow the user to modify the boundary of the submarket, such as by controlling a specified distance and a specified type of distance (such as absolute distance, driving distance, or walking distance) that define the boundary. Similar controls may be used in the user interface 600 although not shown in FIGS. 6A and 6B. A control 708 (such as in the form of a drop-down menu) may allow the user to select a specific vertical in the submarket. Controls 710 (such as in the form of buttons) may allow the user to save options selected by the user within the user interface 700 or initiate other functions. Controls 712 allow the user to generally select what type of information about the selected submarket is presented in the user interface 700. Here, this information may include property-related information, market performance-related information, demographics-related information, and other area interests-related information. In FIG. 7A, the property-related information option has been selected.

The user interface 700 also includes an interactive map 714, which displays the selected submarket within a geographical area. The interactive map 714 may, for example, be the same as or similar to the interactive map 612 described above. Here, the interactive map 714 can identify the selected submarket within a larger geographical area, although the specific geographical area presented in the interactive map 714 can be controlled by the user. For instance, the interactive map 714 may include controls 715a-715b that allow the user to edit the defined submarket or zoom in or zoom out within the interactive map 714 (and possibly to expand the interactive map 714). Note that the submarket shown here is the same as the market shown in the user interface 600, which is done merely for convenience of illustration.

Controls 716 may allow the user to indicate what additional content (if any) is displayed within or overlaid over the interactive map 714. In some cases, the controls 716 may be the same as or similar to the controls 614 discussed above, although the controls 716 may include other or additional options for selection by the user. In this example, "area boundary" and "MSA boundary" checkboxes may be used to selectively display or hide a boundary of the submarket and a boundary of any MSA that respectively falls at least partially within the geographical area currently shown in the interactive map 714. A "comp set boundary" checkbox may be used to selectively display or hide a boundary of any comparable property within the geographical area currently shown in the interactive map 714. A "heatmap" checkbox may be used to selectively display or hide specified information within the interactive map 714, and the specified information can be selected using a drop-down menu. The drop-down menu may include any suitable types of information that might be displayed within the interactive map 714, such as population density, population growth, or demographic data. One or more "properties" checkboxes may be used to selectively display or hide certain real estate properties within the interactive map 714, such as real estate properties owned by one or more specified entities, real estate properties matching the vertical selected using the control 708, or comparable real estate properties. Note that there are two types of comparable real estate properties shown here (rent and sales), which may or may not be used in the user interface 600. In this specific example, the "area boundary" checkbox is selected, and a submarket boundary 718 is presented in the interactive map 714. In addition, one or more property markers 720 can be used to identify one or more properties associated with any selected property type checkboxes. In some cases, the controls 716 may be selectively presented and hidden, such as by clicking on an "overlays" control 722 to the right of the controls 716. Also, in some instances, prior searches made by a user can be saved and then accessed via a control 724.

Because the user has selected the property-related information option in the controls 712, the user interface 700 presents a properties section 726 that identifies real estate properties within or associated with the given submarket. In this example, the properties section 726 includes controls 728 that may allow the user to view a listing of identified real estate properties within one or more specified ranges or within a defined area (such as the submarket itself). The controls 728 may also allow the user to view a listing of identified real estate properties that are identified as being rental properties, sales properties, pipeline properties, or real estate properties within a given investment portfolio and that are within or associated with the given submarket. Rental properties generally represent real estate properties that have been or are available for rent, and sales properties generally represent real estate properties that have been sold or are available for sale. Pipeline properties may generally represent real estate properties that might be considered for purchase depending on analysis results.

The properties section 726 also includes a listing 730 that identifies various real estate properties, which can be based on the selected control 728. Here, each real estate property included in the listing 730 may be identified by its owner and address. Additional information presented in the listing 730 for each real estate property may include its associated vertical, size, age, rent, how the rent is calculated (such as per unit or per square foot), and one or more optional labels. Each real estate property included in the listing 730 may also be associated with a marker (such as a marker having a specified color or shading) and a numerical value, which can be used to identify the type of property and the location of that property within the interactive map 714. Each real estate property included in the listing 730 may be further associated with indicators of whether that property has been marked as being a comparable rental property, a comparable sales property, or a comparable pipeline property (note that the same options may be used in the user interface 600 if desired). In addition, each real estate property included in the listing 730 may be associated with a checkbox, which allows the user to select properties and perform certain functions for the selected properties.

Controls 732 may allow the user to select or deselect all real estate properties included in the listing 730, search for or filter real estate properties within the listing 730, or sort the real estate properties in the listing 730 (such as in ascending or descending order). Controls 734 may allow the user to add any selected real estate properties in the listing 730 as comparable rental/sales/pipeline properties or to remove any selected real estate properties in the listing 730 from comparable rental/sales/pipeline properties. The controls 734 may also allow the user to define the radius around each comparable property in which other similar properties may be identified.

Figure 7B:
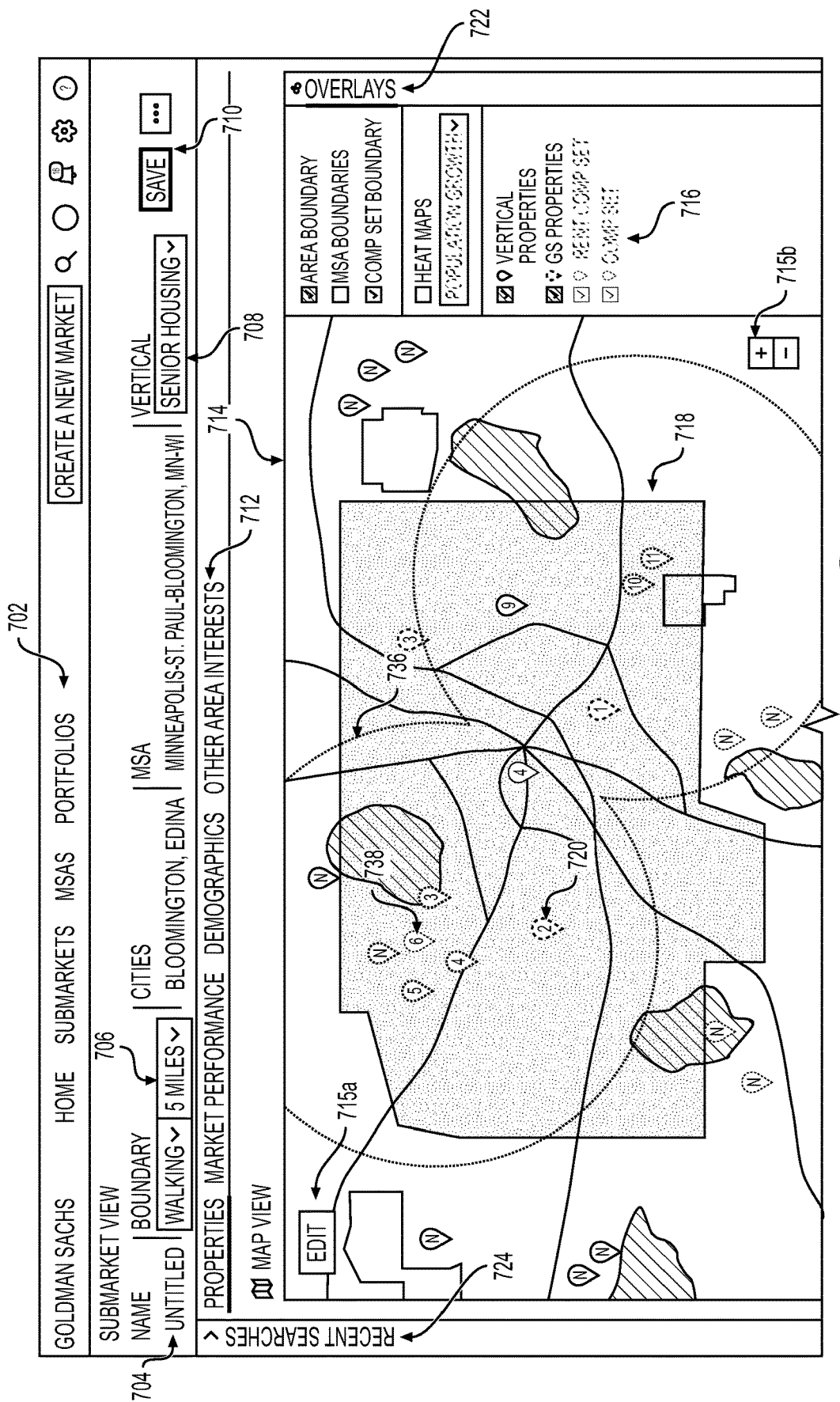
Figure 7B:
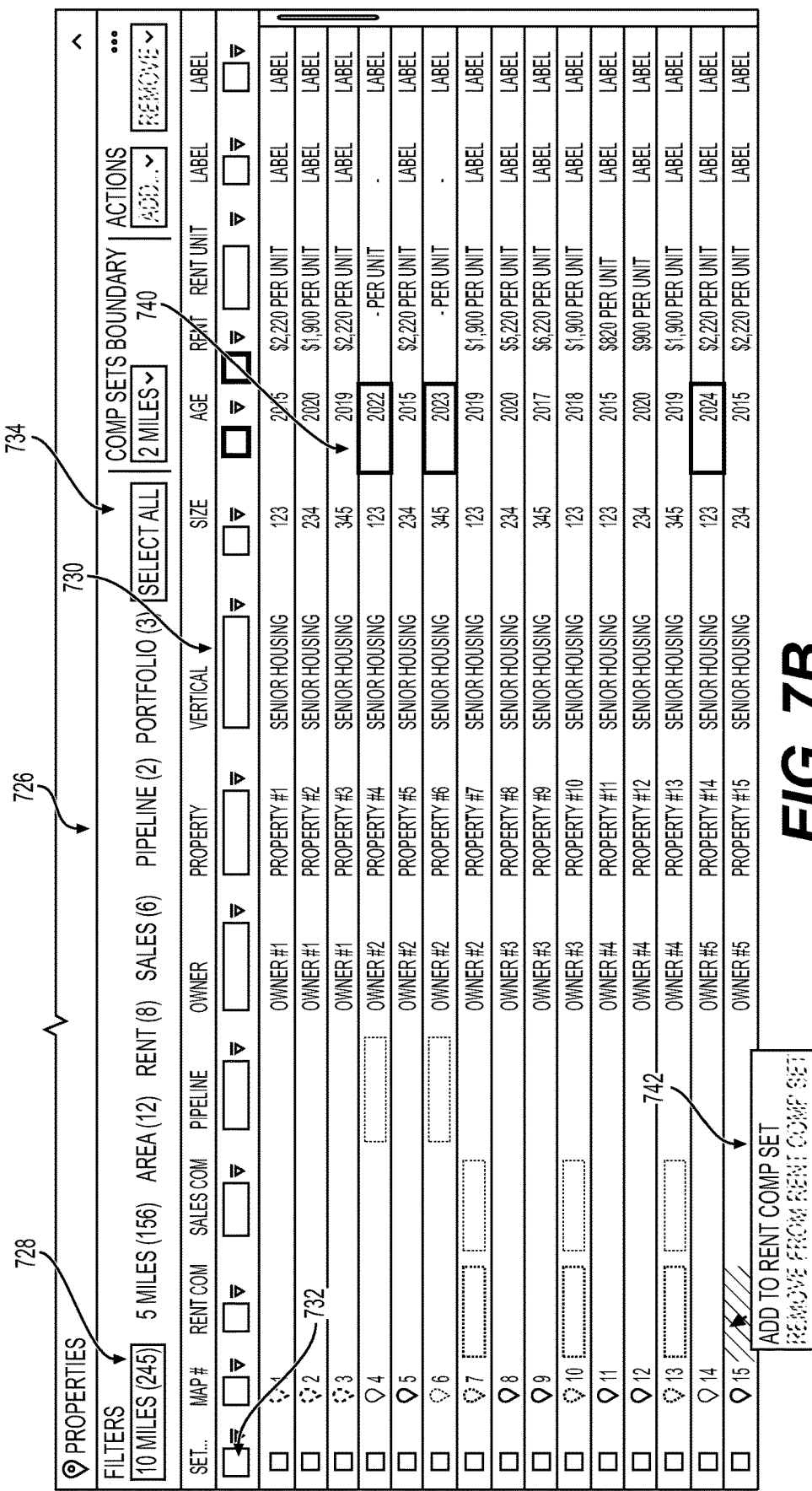

As shown in FIG. 7B, the user has now identified certain real estate properties as being comparable rental, sales, and pipeline properties. This allows the user to then select and view a boundary 736 in the interactive map 714 for each comparable property (if any) within the interactive map 714. A property marker 738 may now also be included in the interactive map 714 for each comparable property (if any) within the interactive map 714. The display of these items can depend on whether the associated controls 716 are selected in the user interface 700. Note that each boundary 736 may be centered at a particular property marker 738 representing a comparable rental, sales, or pipeline property and be positioned at a distance from the property marker 738 as defined using the associated control 734.

The listing 730 here has also been expanded to include additional real estate properties. This is possible since additional real estate properties can be identified as being similar to one or more comparable rental, sales, or pipeline properties selected by the user, such as when additional properties inside or outside of the submarket but similar to the comparable rental, sales, or pipeline properties are identified. It is also possible that one or more of the identified properties in the listing 730 may be under construction or otherwise will be available at some point in the future, and shading or other indicators 740 may be used in the listing 730 to identify ages of those properties as being in the future. Further, it is possible to add and remove properties in the listing 730 as comparable rental, sales, and pipeline properties by selecting the cells in the listing 730 (such as via right clicking) and selecting an add or remove option in a pop-up window 742.

Figure 7C:
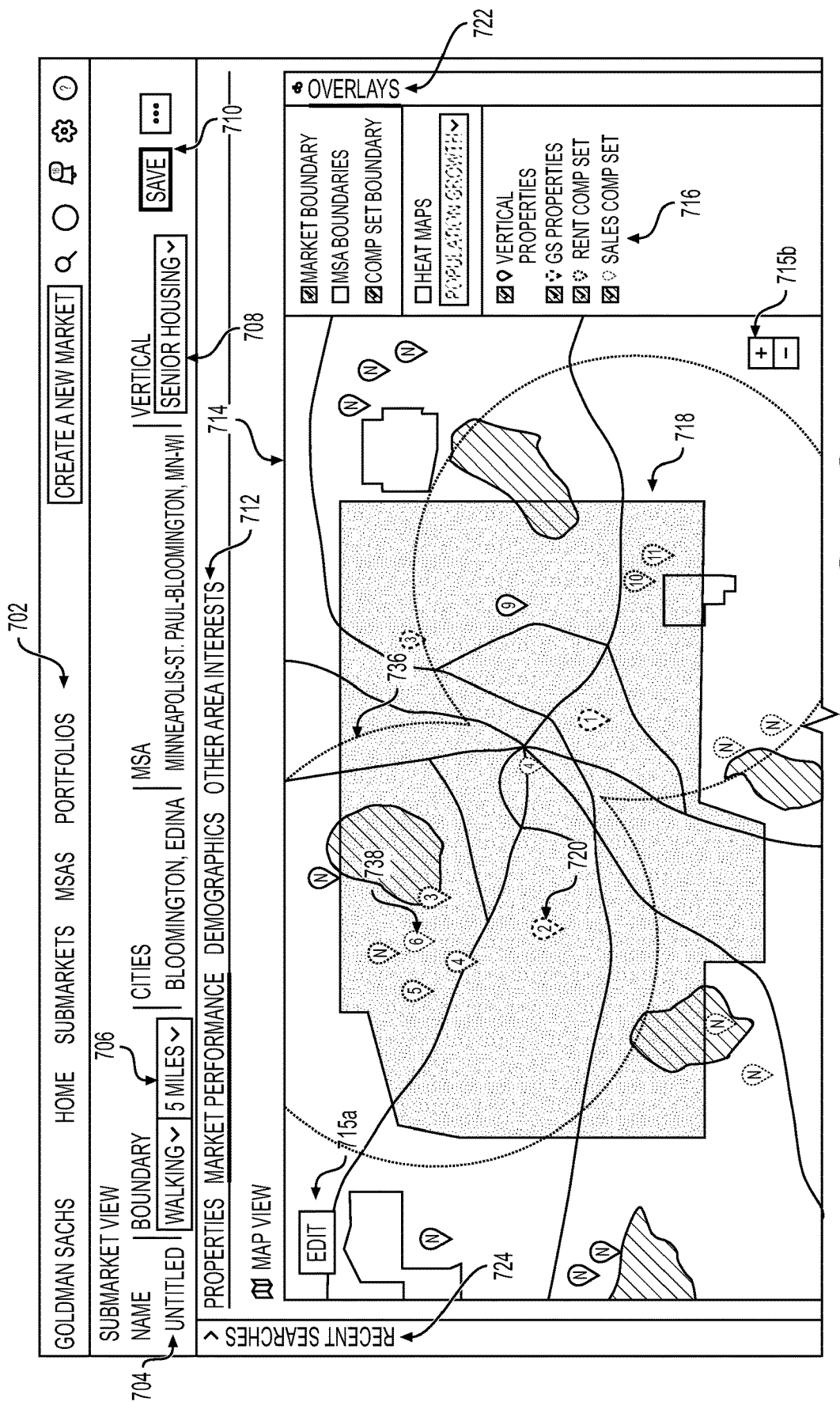
Figure 7C:
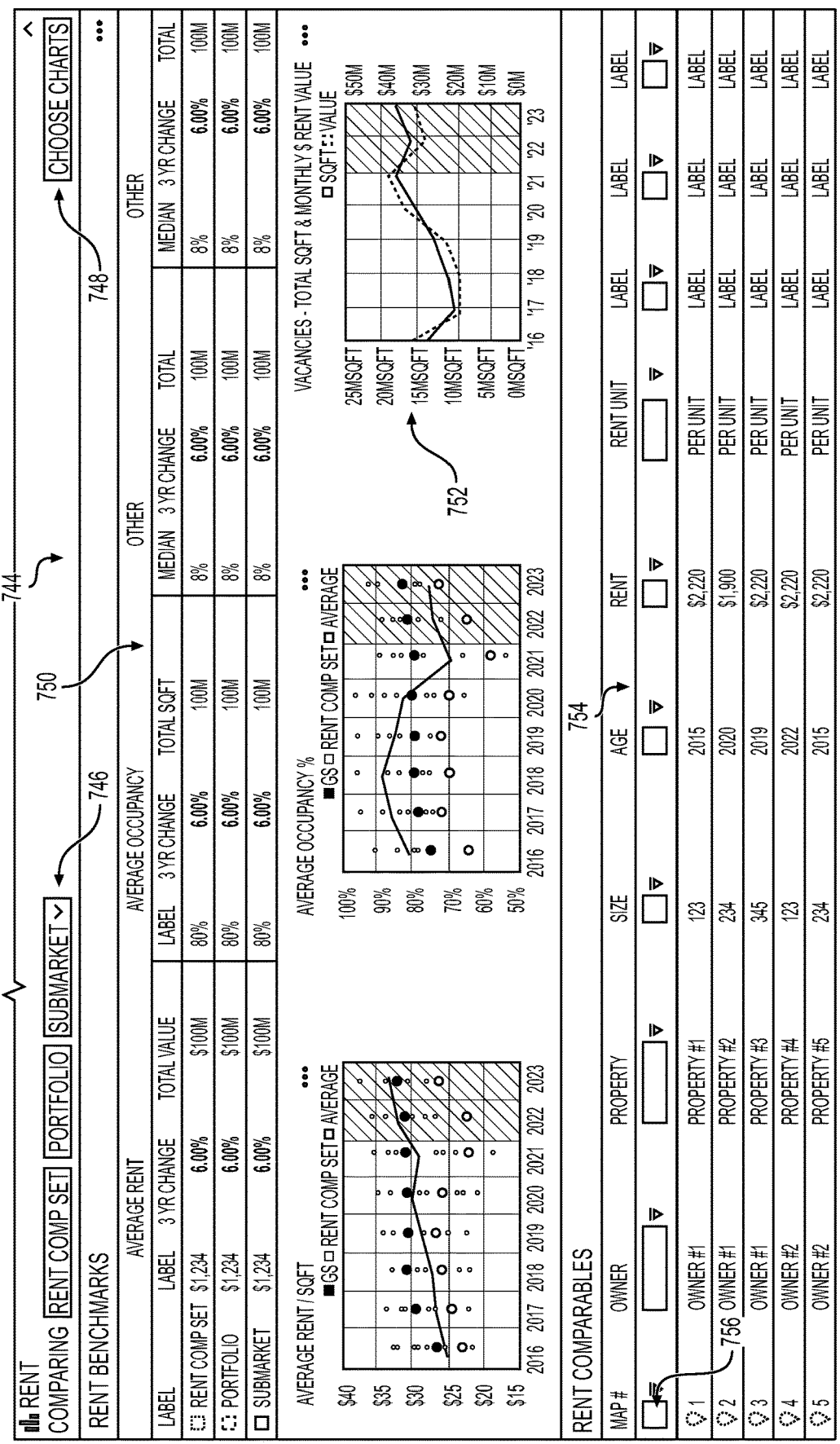
Figure 7D:
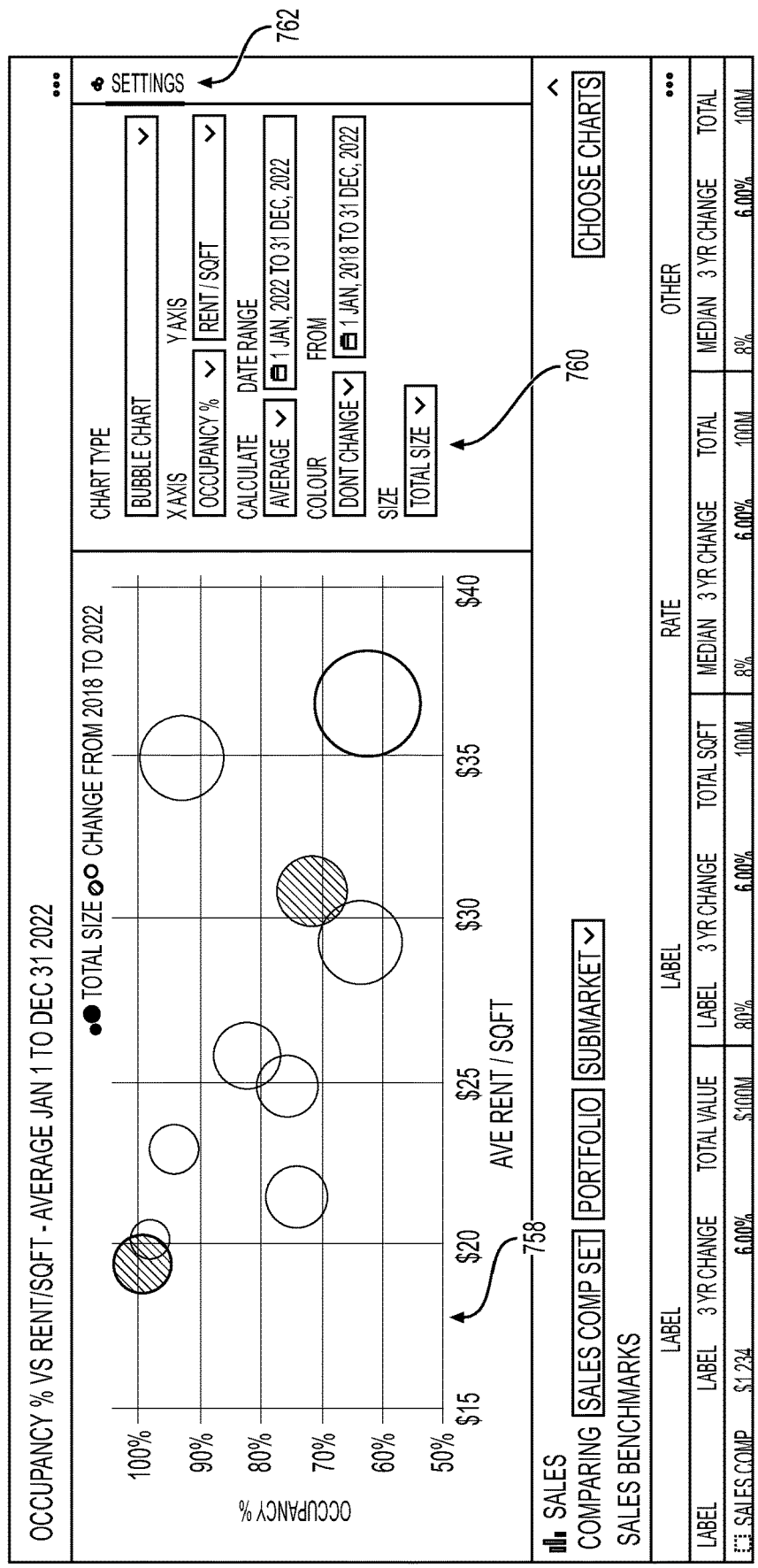

As shown in FIGS. 7C and 7D, the user has selected the market performance-related information option in the controls 712, and the user interface 700 has replaced the properties section 726 with a performance section 744, which provides economic performance information for various properties within or associated with the submarket. In some embodiments, the performance section 744 may be divided into rental, sales, and pipeline performance subsections. For simplicity, only the rental performance subsection is shown and described, and the sales and pipeline performance subsections may have the same or similar arrangements.

The rental subsection of the performance section 744 includes controls 746, which may allow the user to define the categories of properties for which economic performance information can be presented. Here, for example, the user is indicating that the categories of properties to be presented include properties in the submarket, comparable properties, and properties in an investment portfolio. A control 748 may allow the user to define which charts and other results are presented in the rental subsection of the performance section 744. The performance-related information that is presented here includes benchmark information 750 for the selected categories of properties. In this example, the benchmark information 750 includes average rent, average occupancy, and other values for properties in each category. The benchmark information 750 can also include changes in the displayed values over time and total values (such as total monetary values or total occupied spaces).

The performance section 744 also includes various plots 752 illustrating different aspects of the economic performances of the real estate properties associated with the selected categories of properties. Here, the plots 752 include graphs related to rent information (such as average rent per square foot or other measure), occupancy information (such as average occupancy rate over time), and vacancy information (such as vacancies expressed as total square feet or other space measure and total monetary value over time) for the real estate properties associated with the selected categories of properties. In one or more of the plots 752, the economic performances of different real estate properties associated with the selected categories of properties (such as owned properties and comparable properties) may be identified as points, and average values or other values of the economic performances may be identified as lines.

The performance section 744 further includes a comparables listing 754 that identifies other real estate properties in the submarket or near the submarket that are similar to the properties identified by the user as being comparable rental properties. Here, each real estate property included in the listing 754 may be identified by its owner and address. Additional information presented in the listing 754 for each real estate property may include its size, age, rent, how the rent is calculated (such as per unit or per square foot), and one or more optional labels. Each real estate property included in the listing 754 may also be associated with a marker (such as a marker having a specified color or shading) and a numerical value, which can be used to identify the type of property and the location of that property within the interactive map 714. Controls 756 may allow the user to search for or filter real estate properties within the listing 754 or sort the real estate properties in the listing 754 (such as in ascending or descending order). In addition, the performance section 744 includes an adjustable chart 758 and controls 760-762, which can be the same as or similar to the adjustable chart 654 and controls 656-658 discussed above (although the adjustable chart 758 and controls 760-762 can be used to present and control the presentation of information for a submarket rather than a market).

Note that if the user selects the demographics-related information option in the controls 712, the user interface 700 can present demographics information in any suitable manner. For instance, the user interface 700 may present demographics information in the same or similar manner as the user interface 600, except the user interface 700 can present demographics information for a submarket rather than a market. If the user selects the other area interests-related information option in the controls 712, the user interface 700 can present information about nearby attractions or other areas of interest that are located within the geographical area shown in the interactive map 714 or that are otherwise associated with the submarket.

Figure 8A:
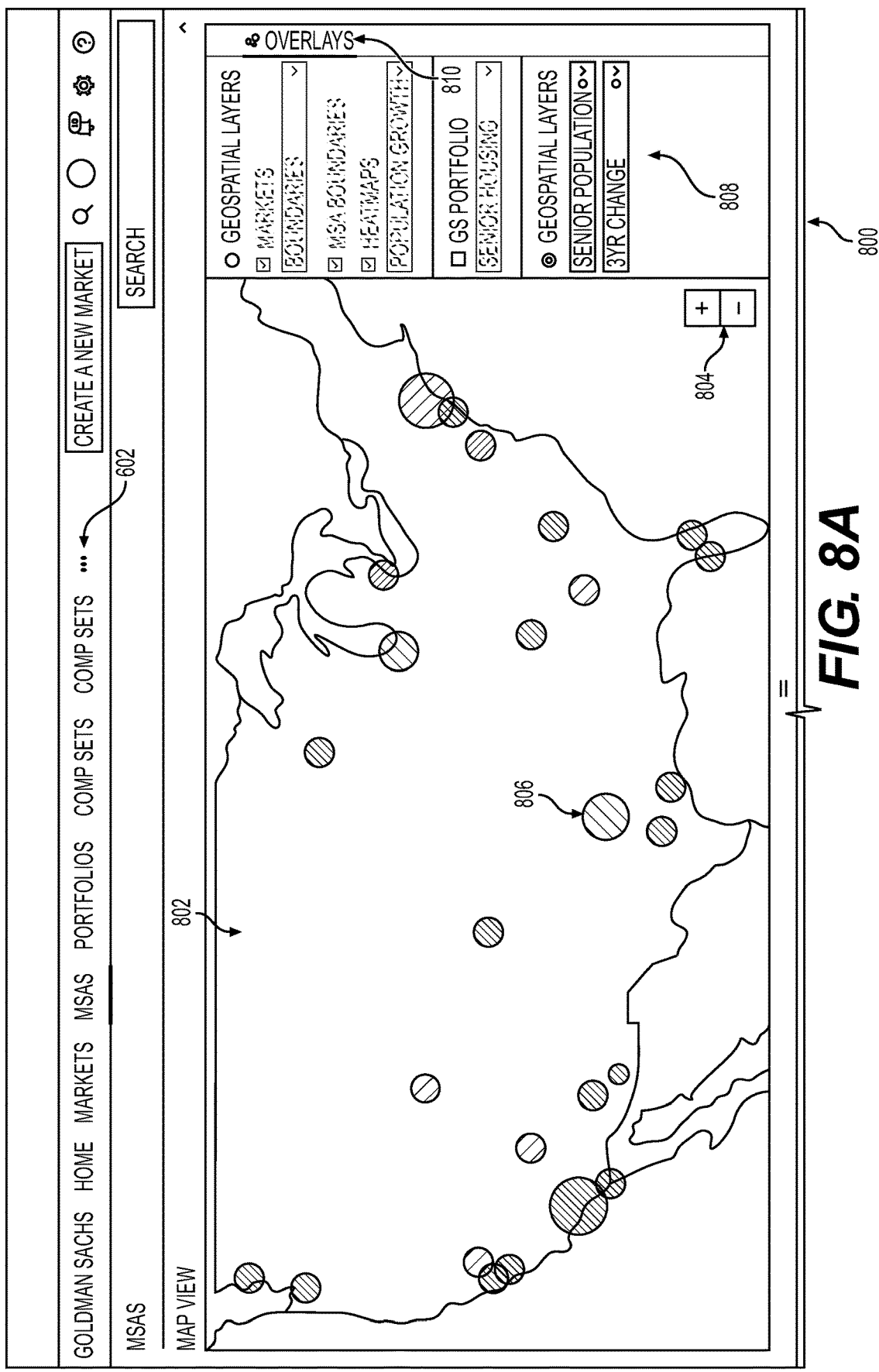
Figure 8B:
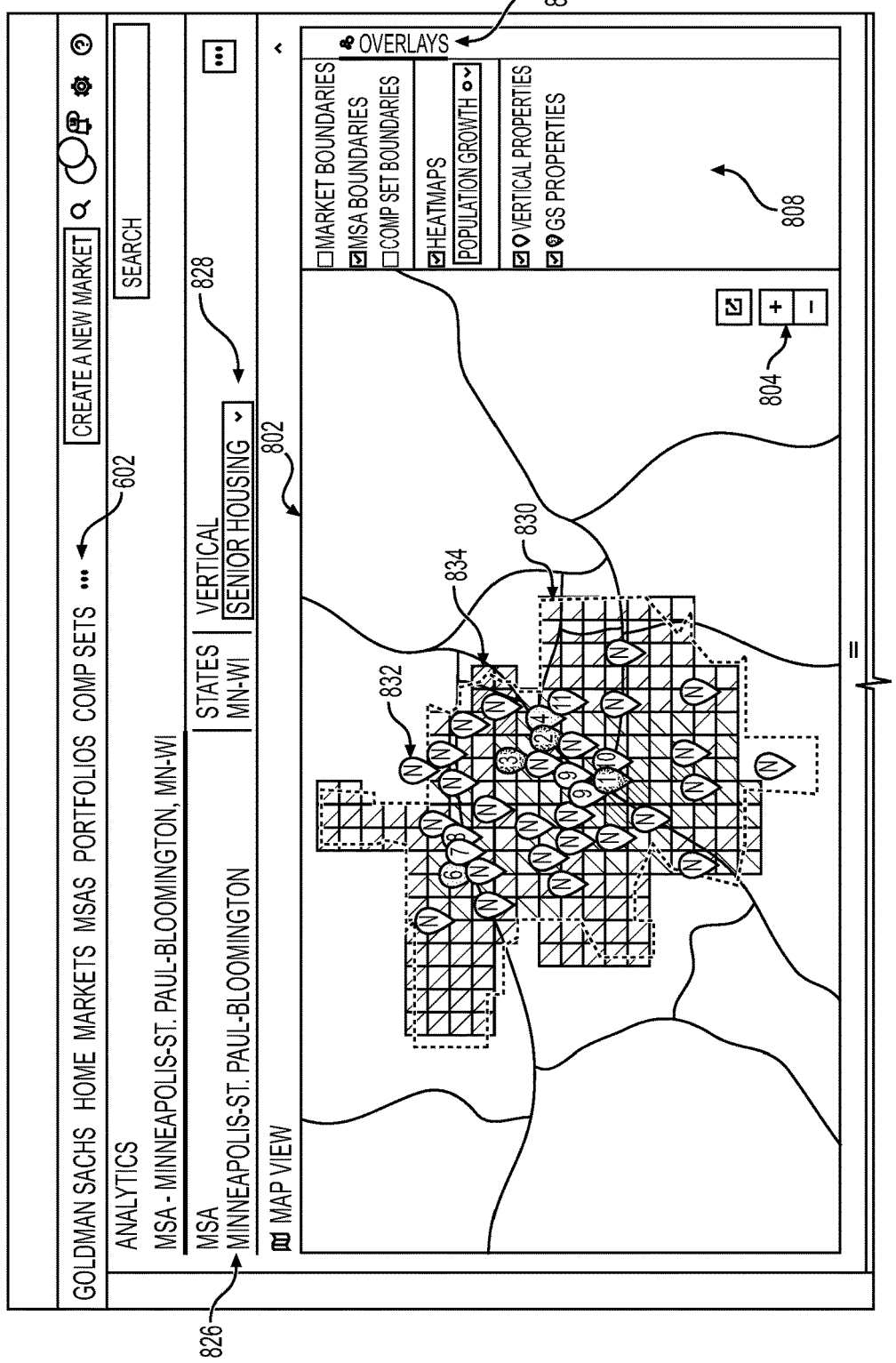
Figure 8B:
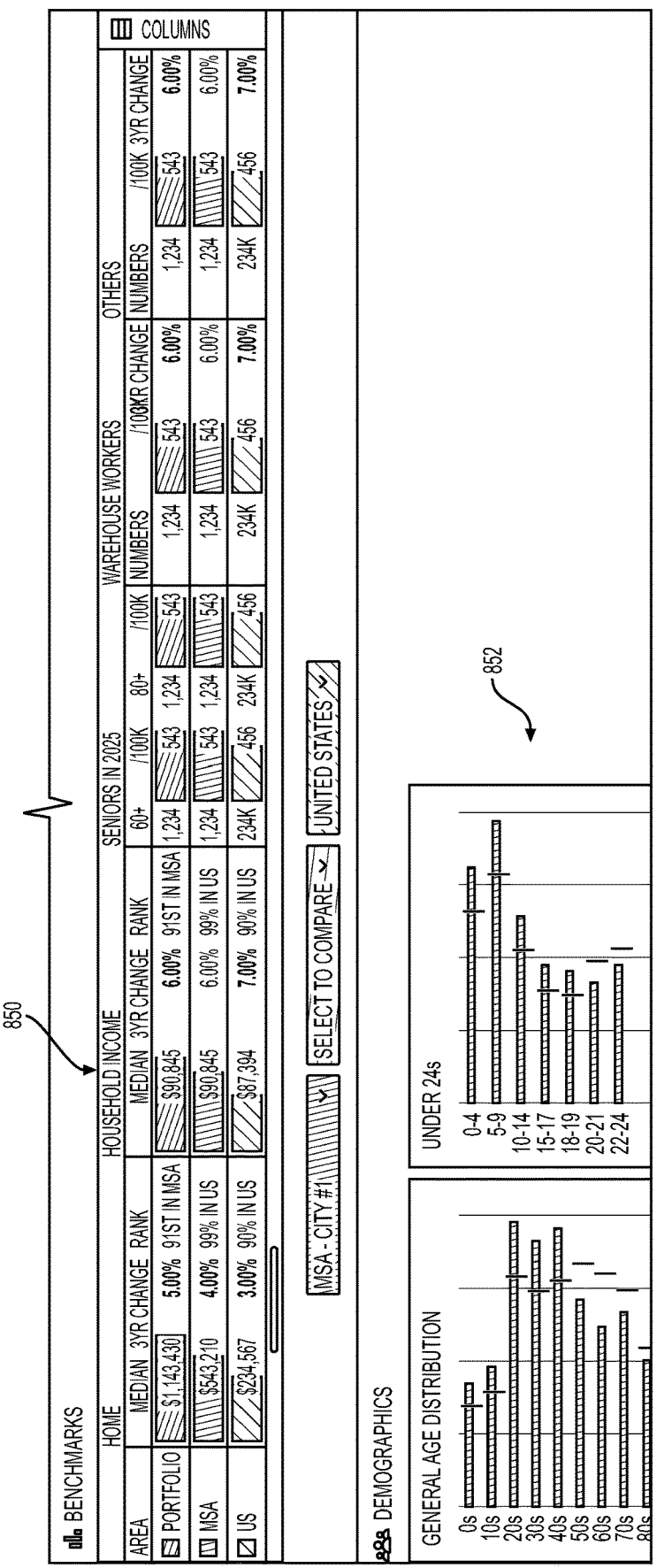

As shown in FIGS. 8A and 8B, when the user selects the "MSAs" option in the controls 602 of the user interface 600, a user interface 800 can be presented to the user. The user interface 800 here can be used to support a top-down approach for researching and analyzing real estate markets and submarkets. In this example, the user interface 800 includes an interactive map 802 that displays a geographical area including MSAs. In some cases, the interactive map 802 may display an entire country or other area by default, and controls 804 can be used by the user to zoom in or zoom out within the interactive map 802. The interactive map 802 here includes various MSA indicators 806, which can identify any MSAs within the geographical area currently shown in the interactive map 802. In some embodiments, each MSA indicator 806 has a size representing the real estate market of the associated MSA and a color representing a change in the condition of the real estate market of the associated MSA over a specified time period.

Controls 808 may allow the user to indicate what additional content (if any) is displayed within or overlaid over the interactive map 802. For example, the controls 808 may allow the user to define whether one or more geospatial layers (such as market boundaries, MSA boundaries, or heatmaps) are presented to the user. The controls 808 may also allow the user to define whether certain real estate properties owned by an organization are identified in the interactive map 802 and, if so, which vertical of properties is shown (if any). The controls 808 may further allow the user to define the type of information and the time period that are used to identify the changes to the conditions of the real estate markets in the interactive map 802, such as by allowing the user to (i) select whether the changing conditions are associated with specific demographic changes or other changes and (ii) select one of different lengths of time or to define a custom time period. In some cases, the controls 808 may be selectively presented and hidden, such as by clicking on an "overlays" control 810 to the right of the controls 808.

An MSA listing 812 can present various information about the real estate markets in the MSAs that are currently shown in the interactive map 802. Here, each MSA identified in the listing 812 may be identified by name, and an identification of the number of investment portfolios held in each MSA (if any) may be identified. Additional information presented in the listing 812 for each MSA may include its overall demographics and senior demographics, as well as changes to and rankings of those demographics (such as national rankings). The additional information presented in the listing 812 for each MSA may also include its "unit absorption rate" over time, where unit absorption rates refer to metrics that provide information on the rates of rental markets or individual properties. In addition, each MSA identified in the listing 812 may be associated with a "watch" indicator that identifies whether the user has added the MSA to the user's watch list.

Controls 814 may allow the user to add or remove all MSAs from his or her watch list, search for or filter MSAs within the listing 812, or sort the MSAs in the listing 812 (such as in ascending or descending order). In this example, the user has selected a particular control 814, and a pop-up window 816 may allow the user to enter filtering criteria to filter the MSAs in the listing 812 (note that similar approaches may be used in the user interfaces 600, 700). Controls 818 may allow the user to define which columns of information are presented in the listing 812, to search for specific types of columns, or to filter the information in the listing 812 based on one or more criteria (such as maximum, minimum, or ranges on values associated with the MSAs). The controls 818 may be selectively presented and hidden, such as by clicking on "columns" and "filters" controls 820 to the right of the controls 818. In the listing 812, bars 822 may be used to graphically illustrate populations of MSAs relative to one another, and colors or shadings 824 may be used to graphically illustrate whether changes in values are positive or negative.

If the user selects a particular MSA (such as within the interactive map 802 or in the listing 812), the user interface 800 can be updated to present information about the selected MSA as shown in FIG. 8B. Here, information 826 is provided about the selected MSA, such as its name and one or more states or provinces in which the MSA is located. A control 828 can be used by the user to select a particular vertical in the selected MSA if desired. The interactive map 802 now displays the geographical area of the selected MSA. Based on the user's selections in the controls 808, the interactive map 802 here may include a boundary 830 of the selected MSA, one or more property markers 832 for one or more selected property types, and an overlay 834 (which in this particular example identifies population growth).

The user interface 800 also replaces the MSA listing 812 with a properties section 836, which identifies real estate properties within or associated with the selected MSA. In this example, the properties section 836 includes controls 838 that may allow the user to view a listing of all identified real estate properties within or associated with the selected MSA or real estate properties within a given investment portfolio in the selected MSA. The properties section 836 also includes a listing 840 that identifies various real estate properties, which can be based on the selected control 838. Here, each real estate property included in the listing 840 may be identified by its owner and address. Additional information presented in the listing 840 for each real estate property may include its associated vertical, size, age, rent, how the rent is calculated (such as per unit or per square foot), and an optional label. Each real estate property included in the listing 840 may also be associated with a marker (such as a marker having a specified color or shading) and a numerical value, which can be used to identify the type of property and the location of that property within the interactive map 802. Each real estate property included in the listing 840 may be further associated with an indicator of whether that property has been marked as being a comparable property. In addition, each real estate property included in the listing 840 may be associated with a checkbox, which allows the user to select properties and perform certain functions for the selected properties.

Controls 842 may allow the user to select or deselect all real estate properties included in the listing 840, search for or filter real estate properties within the listing 840, or sort the real estate properties in the listing 840 (such as in ascending or descending order). Controls 844 may allow the user to add any selected real estate properties in the listing 840 as comparable properties, to export information associated with selected or all real estate properties in the listing 840, and to expand the size of the properties section 836. Controls 846 may allow the user to define which columns of information are presented in the listing 840, to search for specific types of columns, or to filter the information in the listing 840 based on one or more criteria (such as maximum, minimum, or ranges on the size, age, rent, or label of the properties). The controls 846 may be selectively presented and hidden, such as by clicking on "columns" and "filters" controls 848 to the right of the controls 846.

The user interface 800 further presents additional information associated with the selected MSA. This may include benchmark information 850, demographic information 852, or other information. In some embodiments, the user interface 800 may include much or all of the same information as the user interface 600, starting with the properties section 836 of the user interface 600 and moving downward. However, the information in the user interface 800 would be tailored to a specific MSA (rather than a single market). Note that, if desired, the user can further drill down into the selected MSA via the interactive map 802, such as to view a specific market or submarket. This sort of approach may allow users to view MSAs at a high level, rank the MSAs, and drill down into real estate markets of the MSAs at any desired level.

Figure 9A:
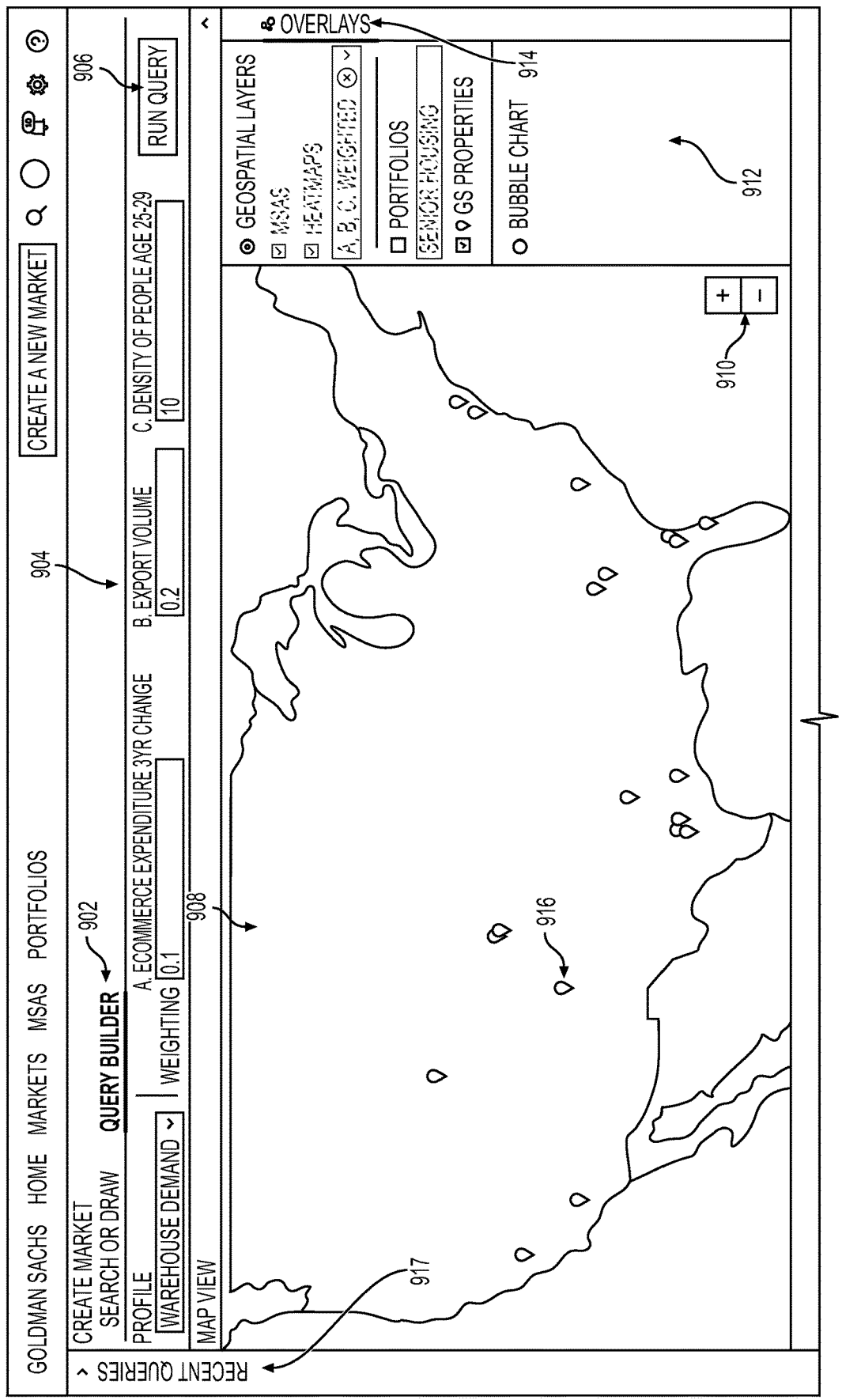
Figure 9A:
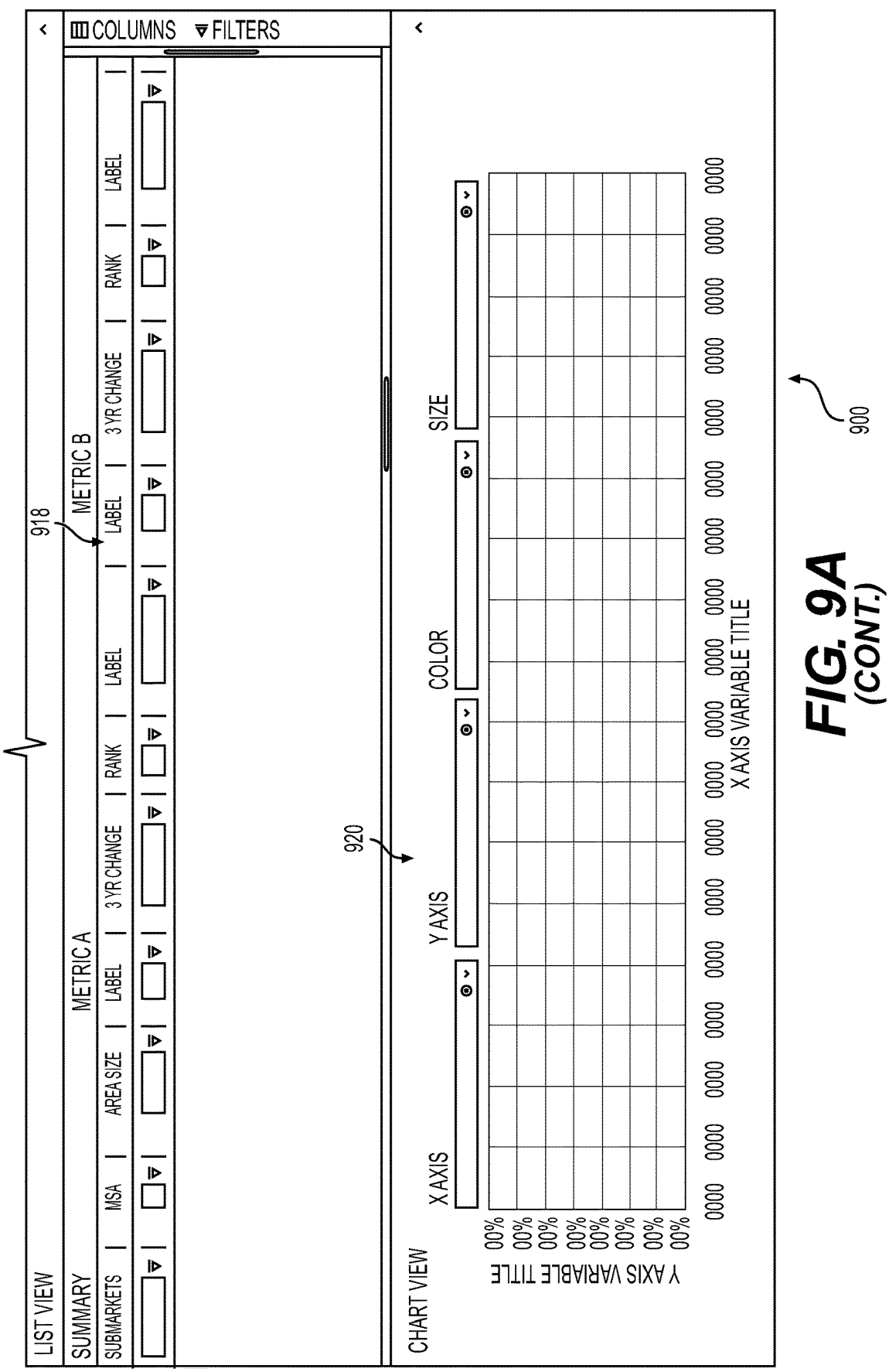
Figure 9B:
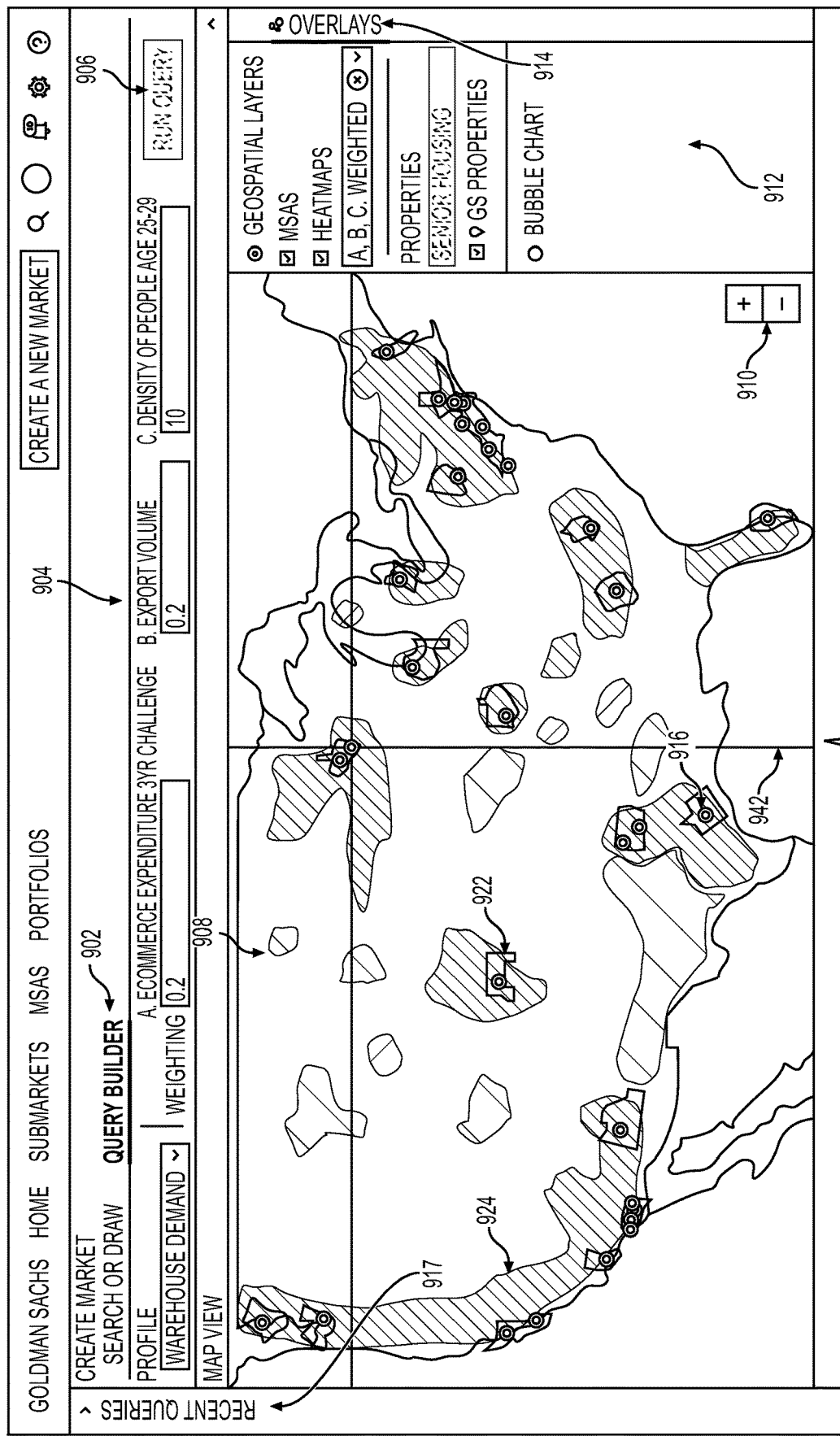
Figure 9B:
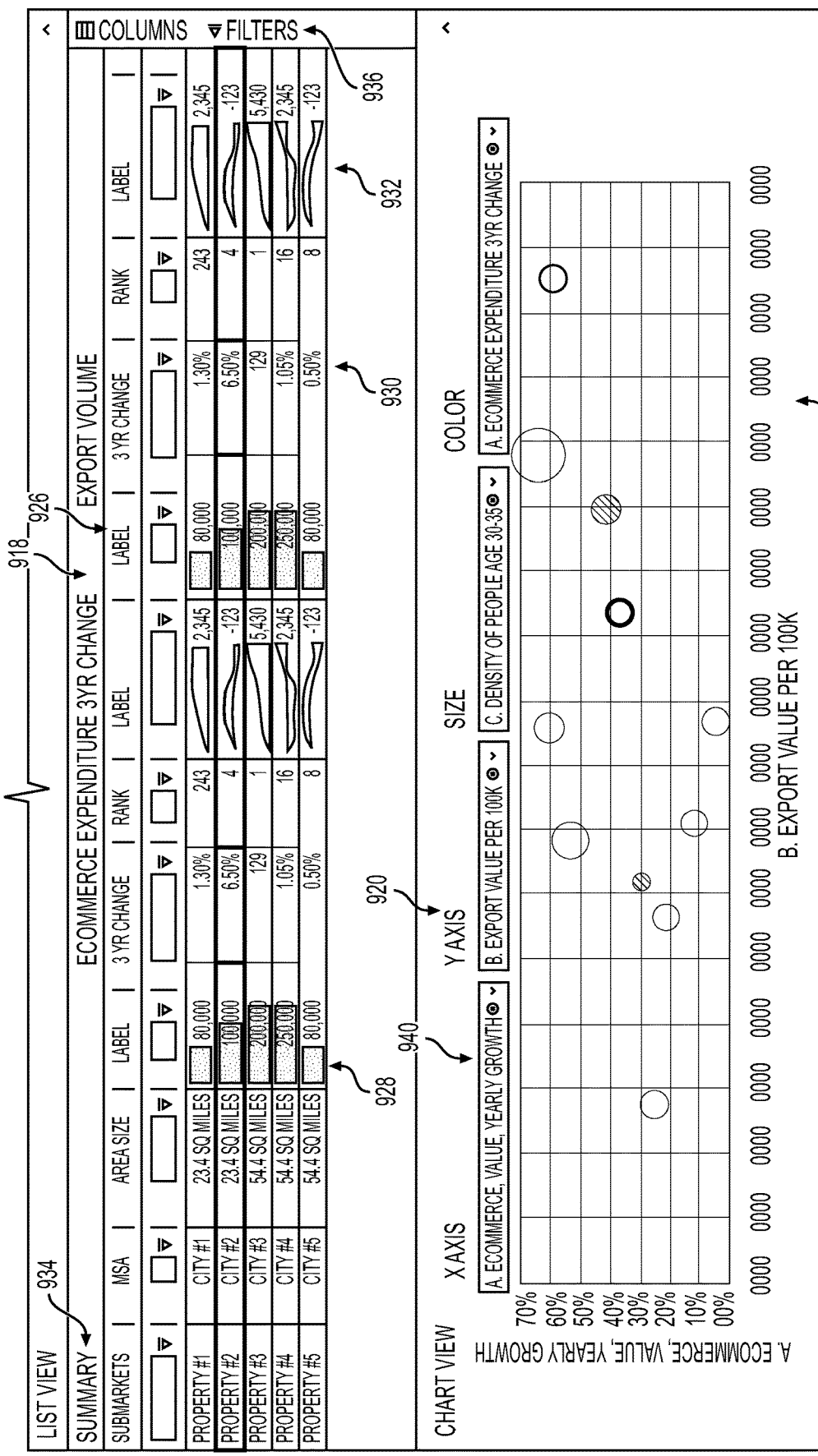
Figure 9C:
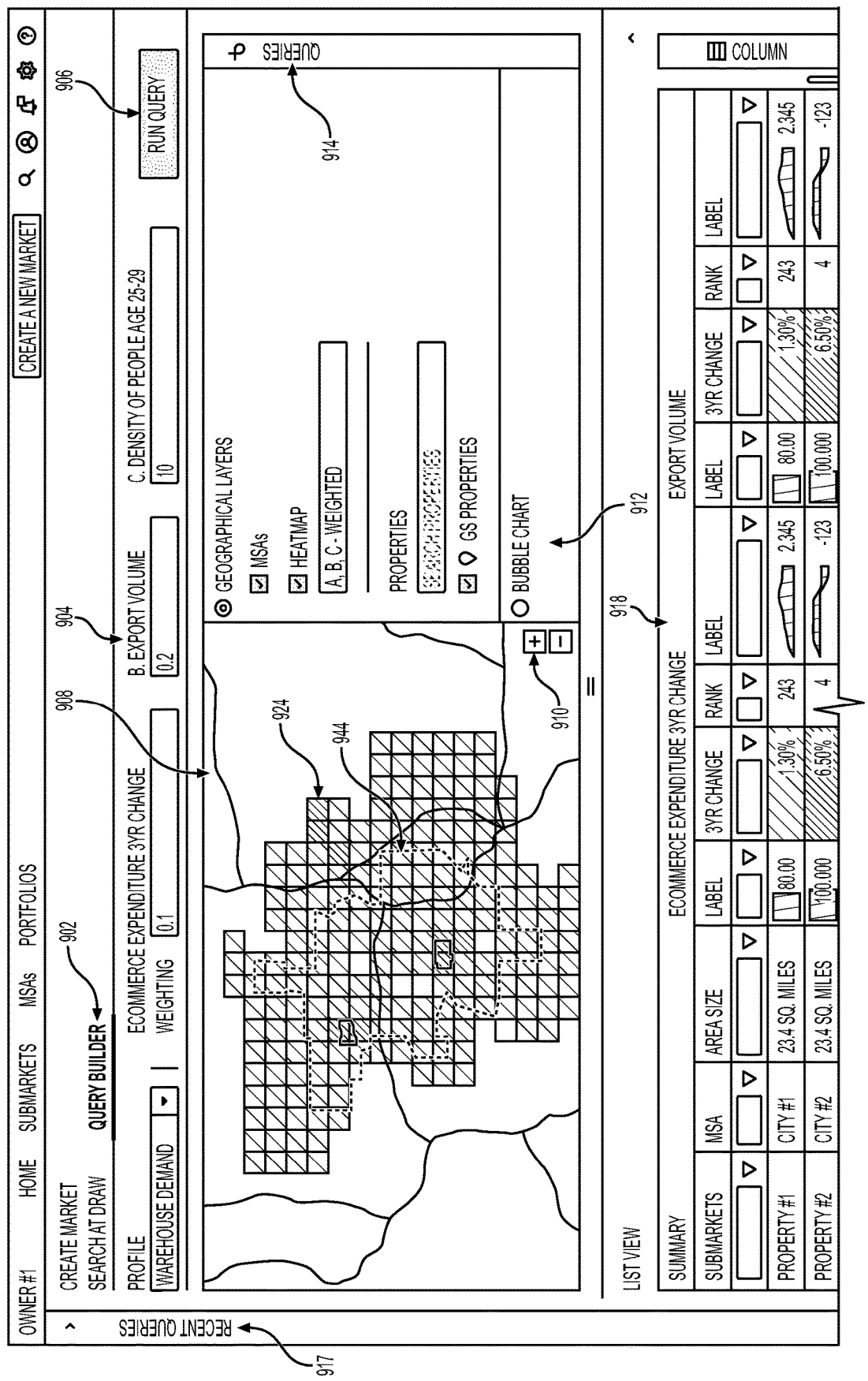
Figure 9C:
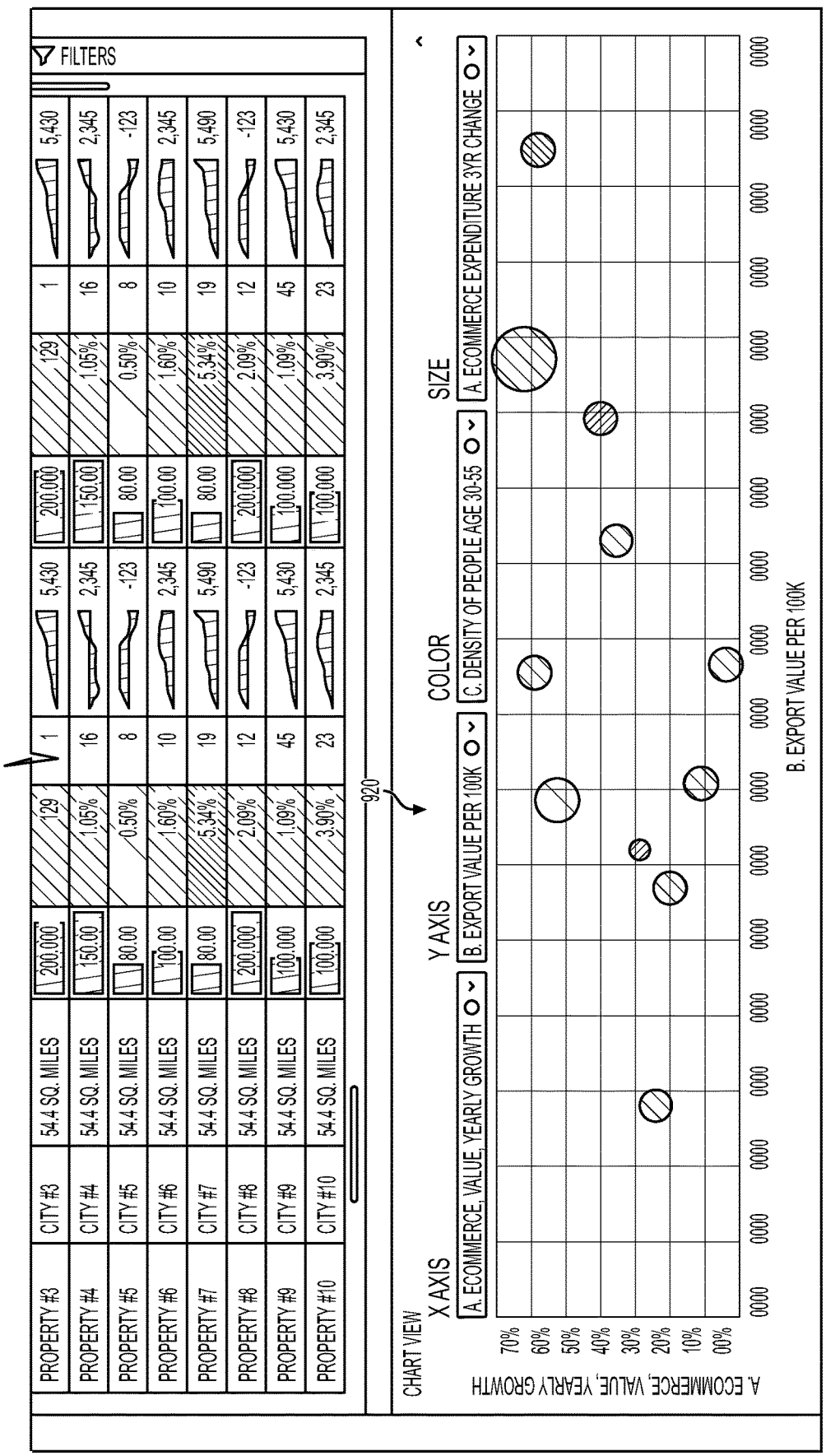

As shown in FIGS. 9A through 9C, a user interface 900 can be used to support a bottom-up approach for analyzing data and algorithmically uncovering high-potential markets and submarkets. In this example, the user interface 900 includes controls 902 that allow the user to define a market or submarket by searching or drawing the market/submarket or by using a query building. In some cases, selecting the "search or draw" option may present the user with the user interface 400, and the user interface 600 or 700 may be presented after the user has defined a market or submarket.

In this case, the user has elected the "query builder" option, and the user interface 900 provides query fields 904 to the user. Each query field 904 allows the user to enter or define a value for a specific field for a query to be run. The query can be performed in order to identify potential geographical regions that might contain desirable real estate markets or submarkets or that otherwise satisfy the user's search criteria. Here, the leftmost query field 904 allows the user to select a particular query profile, which may be used to define a query based on a specific result to be obtained (like an identification of locations where a specific type of real estate might be developed). Each of the remaining query fields 904 may ask the user to weight different parameters of markets or submarkets, where these parameters of the markets or submarkets can be analyzed based on the weightings in order to identify the markets or submarkets that could satisfy the specific result that the user wishes to obtain. In this example, the user has selected a "warehouse demand" query profile, and the user is asked to weight different parameters (namely different e-commerce expenditures, export volumes, and certain demographics) differently. A button 906 can be selected by the user to run the query based on the options entered into the query fields 904. Note that the profiles that may be selected by the user may be defined in any suitable manner, such as by the or user.

The user interface 900 also includes an interactive map 908 that displays a geographical area. In some cases, the interactive map 908 may display an entire country or other area by default, and controls 910 can be used by the user to zoom in or zoom out within the interactive map 908. Controls 912 may allow the user to indicate what additional content (if any) is displayed within or overlaid over the interactive map 908. For example, the controls 912 may allow the user to define whether one or more geospatial layers (such as MSA boundaries or heatmaps) are presented to the user. The controls 912 may also allow the user to define whether certain real estate properties owned by an organization are identified in the interactive map 908 and, if so, which vertical of properties is shown (if any). The controls 912 may further allow the user to define whether a bubble chart or a standard geographical display is used. In some cases, the controls 912 may be selectively presented and hidden, such as by clicking on an "overlays" control 914 to the right of the controls 912. In this example, the bubble chart option is disabled and properties owned by an organization are selected, so the interactive map 908 includes property markers 916 for the properties owned by the organization. In some instances, prior searches made by a user can be saved and then accessed via a control 917.

In this example, the user has not yet run a query, so the interactive map 908 does not display any analysis results, and a list view 918 and a chart view 920 in the user interface 900 are empty. Once the user runs a query (such as by selecting the button 906), the user interface 900 may be updated as shown in FIG. 9B. In this example, based on the user's selections in the controls 912, the interactive map 908 has been updated to include a boundary 922 of any MSA that falls at least partially within the geographical area currently shown in the interactive map 908. Also, based on the user's selections in the controls 912 and the invoked query defined by the user, the interactive map 908 has been updated to include an overlay 924, which in this particular example identifies the weighted combinations of values (as defined by the query fields 904) within the geographical area currently shown in the interactive map 908.

The list view 918 here has been updated to include a listing 926 of markets or submarkets that are determined to match or satisfy the user's query. In this example, the listing 926 identifies submarkets that satisfy the user's query, and each submarket in the listing 926 is identified by name and is shown with its associated MSA (if any) and size. The parameters associated with the query (e-commerce expenditures, export volumes, and certain demographics in this case) that are identified for these submarkets can also be included in the listing 926. In the listing 926, bars 928 may be used to graphically illustrate the parameters for the identified submarkets relative to one another, colors or shadings 930 may be used to graphically illustrate whether changes in values are positive or negative, and graphs 932 may be used to graphically illustrate how the parameters for the identified submarkets have changed over time (or are predicted to change over time). Controls 934 may allow the user to search for or filter submarkets within the listing 926 or sort the submarkets in the listing 926 (such as in ascending or descending order). "Columns" and "filters" controls 936 may be used to selective show and hide additional controls that allow the user to define which columns are presented in the listing 926 or to control the types of information presented for at least some of the submarkets.

The chart view 920 here has also been updated to include an adjustable chart 938 and controls 940. The adjustable chart 938 graphically presents information about the identified markets or submarkets. The controls 940 may allow the user to define what information is presented along the x-axis and y-axis of the adjustable chart 938. For instance, the user may be permitted to display information associated with different parameters of the markets or submarkets along different axes. The controls 940 may also allow the user to define the meanings of colors or other indicators in the adjustable chart 938, such as when the colors or other indicators can be used to represent changes in one or more parameters of the markets or submarkets over time. In addition, the controls 940 may allow the user to define the meanings of the bubble sizes in the adjustable chart 938, such as when the bubbles are used to represent changes to population densities or other characteristics of the markets or submarkets over time.

If the user selects a particular market or submarket in the listing 926, horizontal and vertical lines 942 may be presented in the interactive map 908 to identify the location of the particular market or submarket. If the user confirms selection of the particular market or submarket (such as by selecting a highlighted market or submarket in the listing 926), the user interface 900 may be updated as shown in FIG. 9C. Here, the interactive map 908 has been updated to include the selected market or submarket. A portion of the overlay 924 is also shown here, along with a boundary 944 of an associated MSA (which is consistent with the user's selections in the controls 912).

Figure 10:
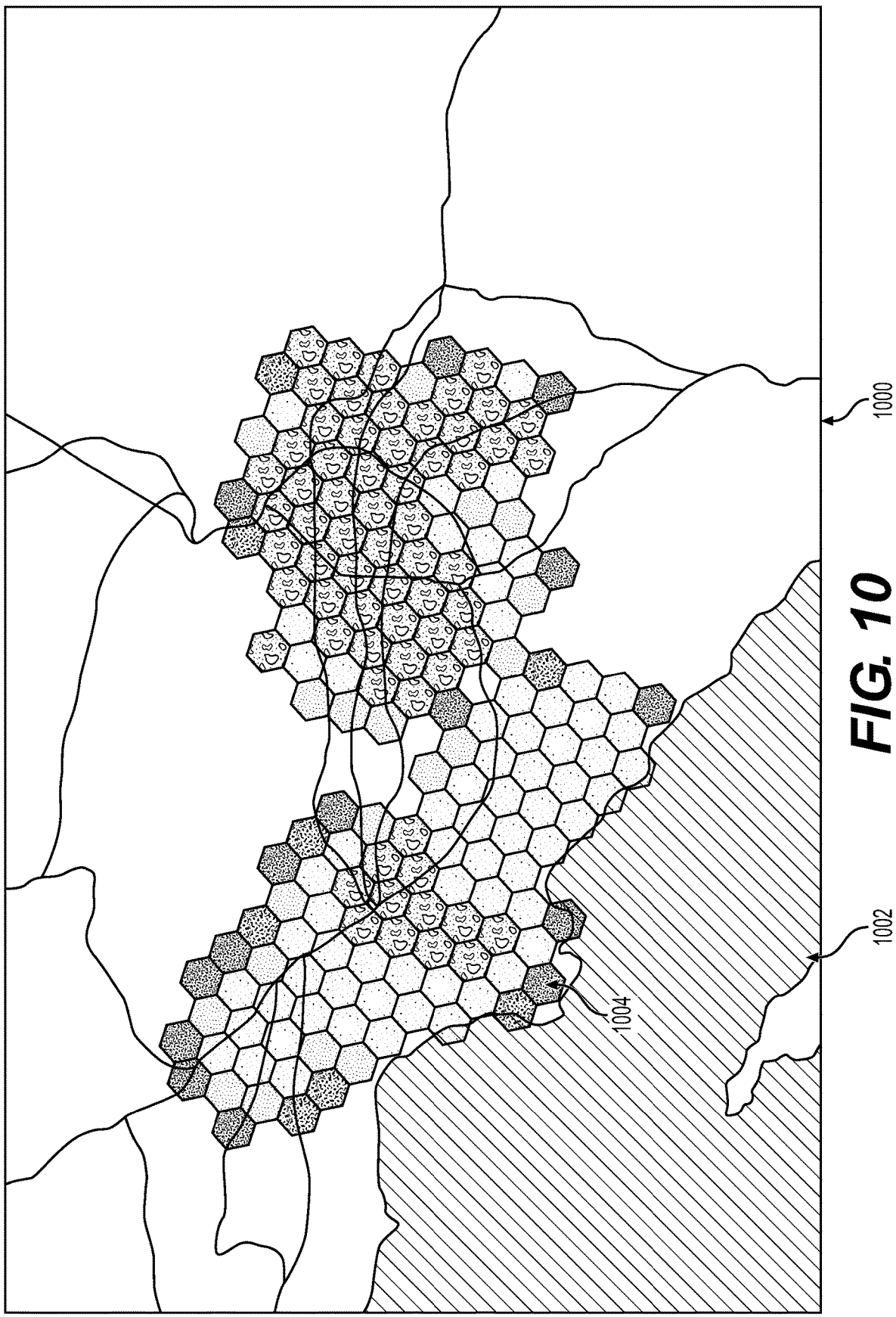

As shown in FIG. 10, a user interface 1000 can be used to present analysis results associated with supply and demand imbalances detected within one or more markets or submarkets. In this example, the user interface 1000 includes a map 1002 (which may be interactive), where the map 1002 displays a geographical area. Various supply/demand indicators 1004 are superimposed over the map 1002. Each supply/demand indicator 1004 is associated with a portion of the geographical area displayed in the map 1002. Each supply/demand indicator 1004 indicates whether there is a real estate supply and demand mismatch detected within the associated portion of the geographical area and (if one exists) the direction and magnitude of the supply and demand mismatch. For instance, if a portion of the geographical area has a supply and demand mismatch where the supply exceeds the demand, an associated supply/demand indicator 1004 may have a first color, shading, or other characteristic, and the first color, shading, or other characteristic may become more intense or less transparent as the supply exceeds the demand by larger and larger amounts or percentages. Similarly, if a portion of the geographical area has a supply and demand mismatch where the demand exceeds the supply, an associated supply/demand indicator 1004 may have a second color, shading, or other characteristic, and the second color, shading, or other characteristic may become more intense or less transparent as the demand exceeds the supply by larger and larger amounts or percentages. This type of user interface 1000 may be useful in helping a user identify regions of geographical areas where investment opportunities may be more promising.

As a particular example of this functionality, one or more predictive analytics and machine learning analyses 310 may use e-commerce spending habits to predict where office spaces or industrial/logistical spaces (such as warehouses) might be needed in the future. The one or more predictive analytics and machine learning analyses 310 can therefore analyze the e-commerce spending habits for the geographical area and possibly other data in order to estimate the size of the market for office spaces or industrial/logistical spaces in the geographical area based at least partially on the e-commerce spending habits. From that estimate, the one or more predictive analytics and machine learning analyses 310 can determine whether there is adequate supply of office spaces or industrial/logistical spaces within the geographical area and, if not, what the estimated gap is between the current supply and the estimate the size of the market. The one or more predictive analytics and machine learning analyses 310 can also consider one or more additional factors when making these determinations. For instance, the one or more predictive analytics and machine learning analyses 310 may consider land costs, zoning laws/regulations, or residential housing prices (often an indicator of community acceptance) when determining if and where additional office spaces, industrial/logistical spaces, or other real estate may be developed.

While not shown here, controls may be provided that allow a user to zoom in, zoom out, or change the geographical area presented in the map 1002. If a user selects a particular supply/demand indicator 1004, information about the associated portion of the geographical area (such as the current supply and the estimated market in that associated portion of the geographical area) may be presented to the user. Any other suitable controls or inputs/outputs may be used with the user interface 1000.

Figure 11:
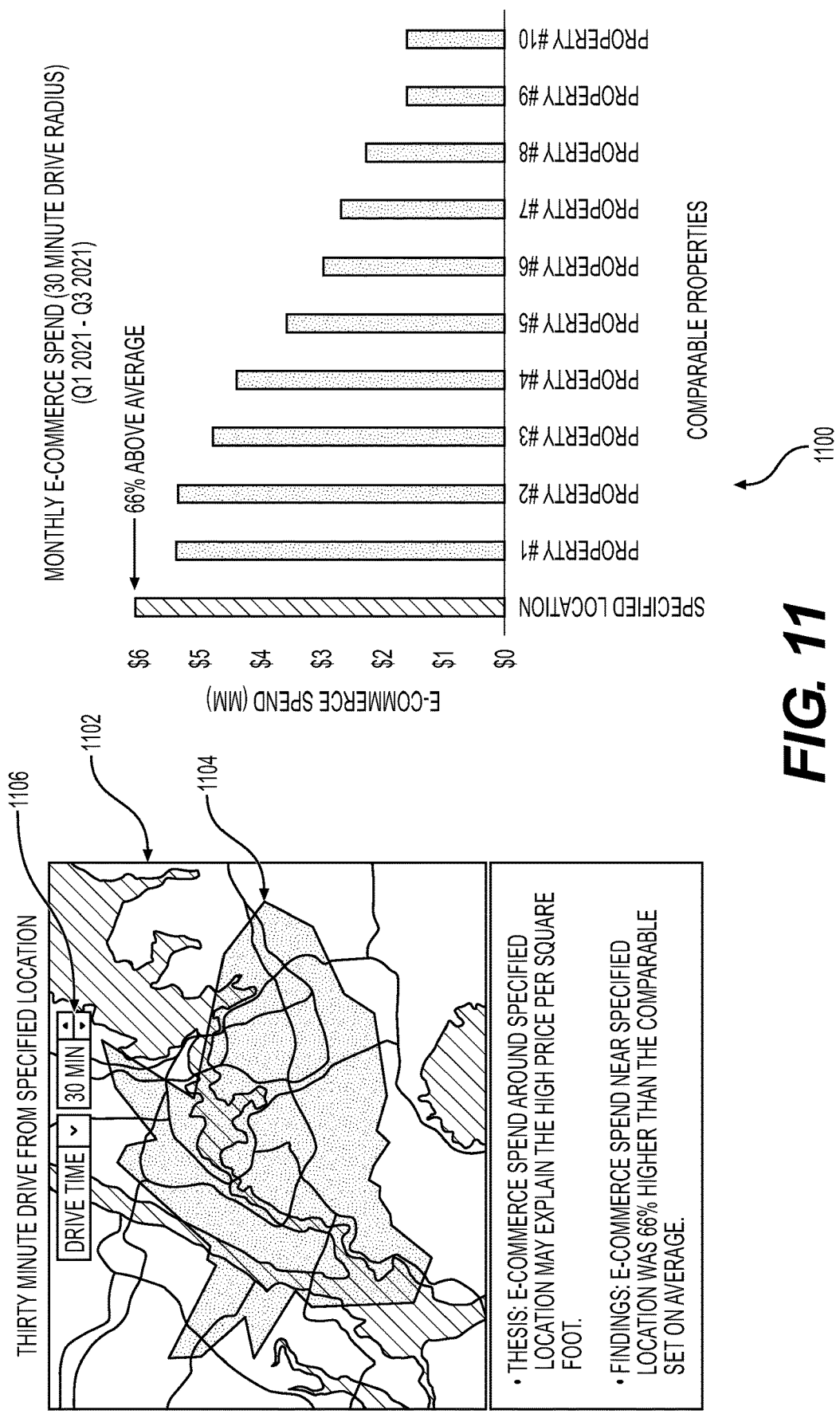

As shown in FIG. 11, a user interface 1100 can be used to present results associated with an analysis that uses alternative or non-traditional data to inform a real estate transaction. In this example, a map 1102 represents a specified geographical area, and a potential market or submarket 1104 is defined within the specified geographical area. Here, the market or submarket 1104 may be defined using controls 1106. For instance, the controls 1106 may allow the user to define the market or submarket 1104 as being related to a specified distance from a defined location, where the specified distance may represent a radius, a driving distance, a walking distance, or other distance. In this example, the market or submarket 1104 is defined as a driving distance from a specified location.

A bar graph 1108 here may identify how the average monthly e-commerce spending within a specified time period can differ between the specified location and other comparable properties. In this example, the average monthly e-commerce spending associated with the specified location is about 66% higher for the specified location than the average of the comparable properties. A machine learning model 316 performing one or more of the predictive analytics and machine learning analyses 310 may learn during training that the average monthly e-commerce spending associated with the specified location is related to a higher price per square foot for properties at or around the specified location. The machine learning model 316 can therefore learn that this non-traditional data source may be used as a feature for estimating prices per square foot, at least in one or more geographical areas.

Figure 12:
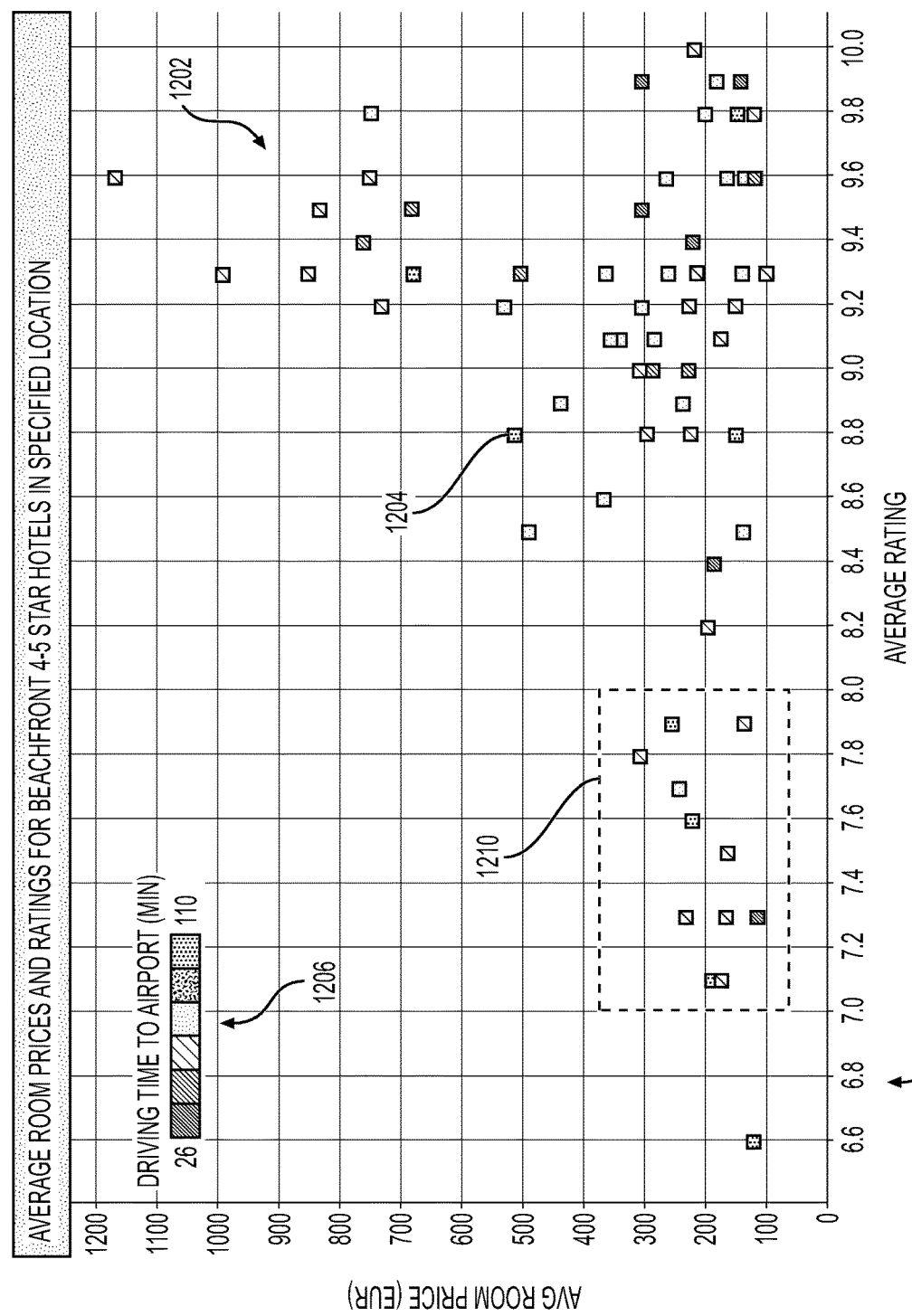

As shown in FIG. 12, a user interface 1200 can be used to present results associated with an analysis involving the identification of non-performing (under-performing) hospitality properties, such as under-performing hotels. In this example, the user interface 1200 includes a graph 1202 plotting average room prices and average room ratings for hotels in a specified area, such as a specified city or resort area. Each point 1204 in the graph 1202 may therefore identify the average room price and the average room rating for a specific hotel. A color or shading of each point 1204 may also be used and defined by a legend 1206, which indicates that different colors or shadings may be used to represent different distances of hospitality properties from their nearest airport(s). Controls 1208 may allow the user to control whether the points 1204 in the graph 1202 relate to overall ratings or to ratings associated with specific aspects of the hospitality properties.

A machine learning model 316 performing one or more of the predictive analytics and machine learning analyses 310 may analyze input data (such as hotel- and room-related information and reviews) in order to identify the points 1204 for the graph 1202, where the input data relates to hotels in a specified market or submarket. The machine learning model 316 may also learn that properties within a certain area 1210 of the graph 1202, such as properties within the certain area 1210 that are closer to an airport, could represent potential targets for purchase and subsequent restoration or redevelopment. This is because these properties may have lower reviews and lower average room prices, which means these properties could be restored or redeveloped. Essentially, this approach allows the machine learning model 316 to combine hotel-level data, room-level data, and review data (among other data) to identify potential hotel takeover possibilities.

As can be seen from the examples above, there are a wide variety of user interfaces that may be used to interact with users and a wide variety of analyses that may be performed for users. One benefit of the architecture 300 is that the architecture 300 can be easily expanded via the incorporation of additional data sources 302, the design of various user interfaces 312 and 314 and machine learning models 316, and the performance of various analyses. As a result, the functionality of the architecture 300 can be easily designed to support desired functionalities based on specified use cases, and additional use cases can be easily incorporated into and supported by the architecture 300 over time as needed or desired.

Although FIGS. 6A through 12 illustrate examples of user interfaces 600-1200 for presenting analysis results associated with a real estate market or portion thereof, various changes may be made to FIGS. 6A through 12. For example, the content, layout, and arrangement of each user interface 600-1200 are for illustration only and can easily vary as needed or desired. Also, the specific input/output mechanisms (such as text boxes, checkboxes, and drop-down menus) are for illustration only and can easily vary as needed or desired. In general, user interfaces and their associated input/output mechanisms can be highly customizable, and the user interfaces 600-1200 may be implemented in a number of other configurations. In addition, the contents or functionalities of various user interfaces 600-1200 may be combined in any suitable manner, meaning one or more features shown in one or some of the user interfaces 600-1200 may be incorporated into any other of the user interfaces 600-1200 (even if the other user interface 600-1200 does not specifically include that feature in the figures).

Figure 13:
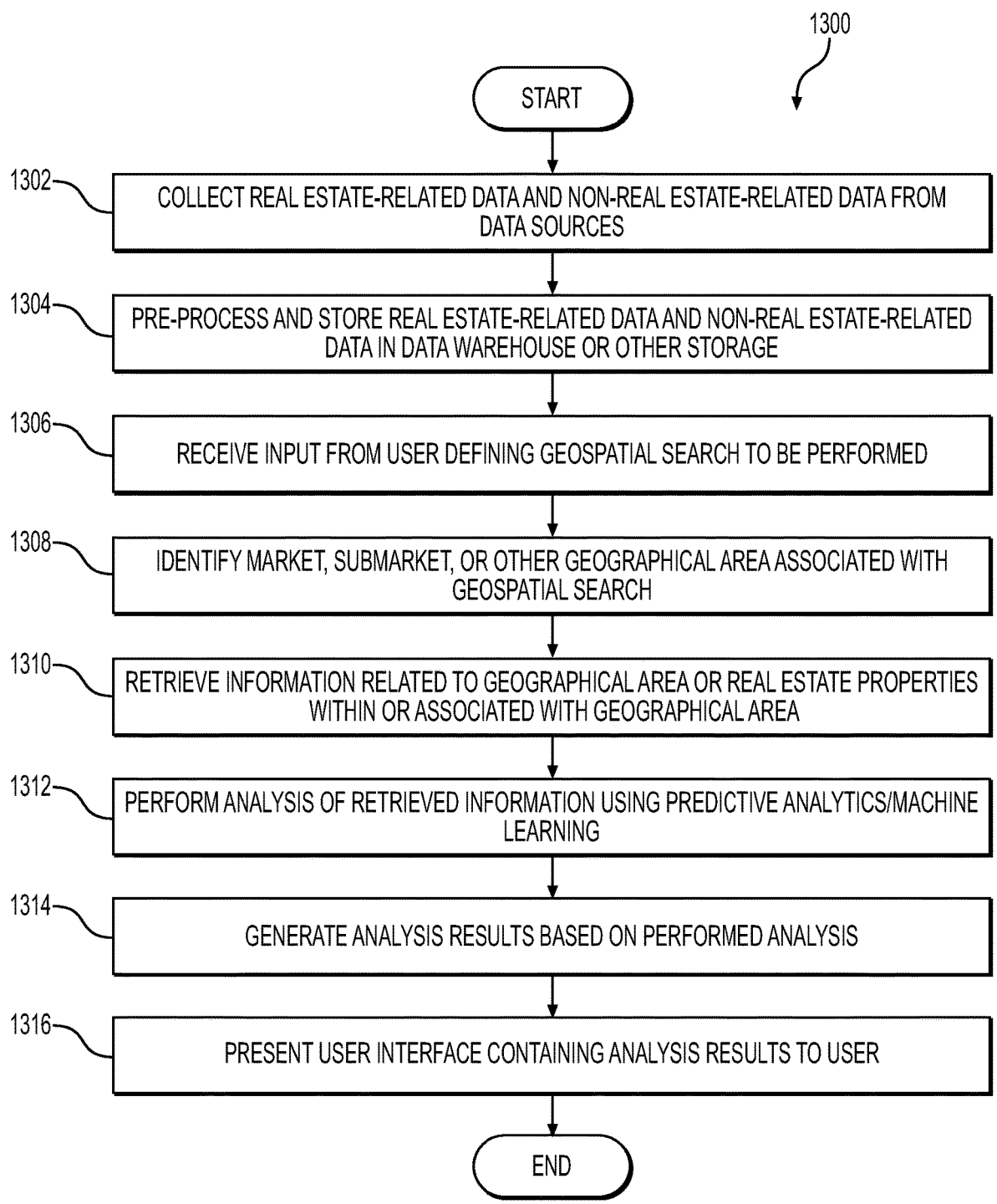
FIG. 13 illustrates an example method for using intelligent geospatial analyses and machine learning predictions for real estate according to this disclosure.

FIG. 13 illustrates an example method 1300 for using intelligent geospatial analyses and machine learning predictions for real estate according to this disclosure. For ease of explanation, the method 1300 of FIG. 13 may be performed by one or more applications 112 executed by the application server 106 of FIG. 1, where the application server 106 may be implemented using one or more devices 200 of FIG. 2. However, the method 1300 may be performed by any other suitable device(s) and in any other suitable system(s).

As shown in FIG. 13, real estate-related data and non-real estate-related data are obtained from suitable data sources at step 1302 and pre-processed and stored in a data warehouse or other storage at step 1304. This may include, for example, the processing device(s) 202 of the application server 106 obtaining data from various traditional and non-traditional data sources 302, 318 and using data pipelines 303 to pre-process, format, and store the obtained data. Input defining a geospatial search to be performed is received at step 1306, and a market, submarket, or other geographical area associated with the geospatial search is identified at step 1308. This may include, for example, the processing device(s) 202 of the application server 106 obtaining user input defining a market, submarket, or other geographical area using an interactive map (such as the interactive map 406). The geographical area can be identified based on a specific search for an address, city, county, MSA, state/province, or zip/postal code, identified based on a user navigating within an interactive map (such as a map displaying MSA information or other information), or identified in any other suitable manner.

Information related to the geographical area and information related to real estate properties within or associated with the geographical area are retrieved at step 1310. This may include, for example, the processing device(s) 202 of the application server 106 retrieving the relevant data from the data warehouse. At least one analysis is performed on the retrieved data using one or more predictive analytics and machine learning analyses at step 1312. This may include, for example, the processing device(s) 202 of the application server 106 applying one or more machine learning models 316 or other logic using the retrieved data to perform one or more predictive analytics and machine learning analyses 310. The specific analysis or analyses performed here can vary widely as noted above based, among other things, on the use case.

Analysis results are generated based on the one or more analyses at step 1314, and a user interface containing the analysis results is presented to the user at step 1316. This may include, for example, the processing device(s) 202 of the application server 106 using the one or more machine learning models 316 to compare or predict economic performances of real estate properties, rank markets or submarkets in different MSAs, identify markets or submarkets satisfying user criteria, identify supply-demand mismatches, or identify under-performing real estate properties. In general, the analysis results will vary based on the specific analysis or analyses performed. This may also include the processing device(s) 202 of the application server 106 presenting at least some of the analysis results via a graphical user interface 314, such as via lists, charts, or other displays.

Although FIG. 13 illustrates one example of a method 1300 for using intelligent geospatial analyses and machine learning predictions for real estate, various changes may be made to FIG. 13. For example, while shown as a series of steps, various steps in FIG. 13 may overlap, occur in parallel, occur in a different order, or occur any number of times. As a particular example, many of the steps shown in FIG. 13 can be performed iteratively. For instance, a user may initiate a geospatial search, view analysis results, and then modify the geospatial search or identify more properties to be analyzed, which can cause the same analysis/analyses or different analysis/analyses to be performed and the results viewed. This flexibility is another technical advantage of the approaches described in this patent document.

The following describes example embodiments of this disclosure that implement or relate to a system and method supporting intelligent geospatial analyses and machine learning predictions. However, other embodiments may be used in accordance with the teachings of this disclosure.

In a first embodiment, a method includes obtaining data from multiple data sources using multiple data pipelines. The data obtained from the data sources includes structured and unstructured data, and the data pipelines are configured to pre-process and format the obtained data for storage in a data warehouse. The method also includes receiving input from a user defining a geospatial search, where at least some of the input is associated with an interactive map configured to allow the user to define a specified geographical area within the interactive map. The method further includes retrieving a portion of the data from the data warehouse. The retrieved portion of the data is related to the specified geographical area and to real estate properties within or associated with the specified geographical area, and part of the retrieved portion of the data represents data unrelated to real estate properties. The method also includes analyzing the retrieved portion of the data using one or more machine learning models, where the one or more machine learning models are configured to generate analysis results associated with at least one of: one or more of the real estate properties and one or more transactions involving one or more of the real estate properties. In addition, the method includes generating a user interface that graphically provides at least a portion of the analysis results to the user. The user interface is configured to allow the user to update the geospatial search by revising the specified geographical area and associating one or more specific real estate properties with the specified geographical area. The user interface is also configured to provide updated analysis results to the user, where the updated analysis results are based on the updated geospatial search.

In a second embodiment, an apparatus includes at least one processor supporting a machine learning-based architecture. The at least one processor is configured to obtain data from multiple data sources using multiple data pipelines. The data from the data sources includes structured and unstructured data, and the data pipelines are configured to pre-process and format the obtained data for storage in a data warehouse. The at least one processor is also configured to receive input from a user defining a geospatial search, where at least some of the input is associated with an interactive map configured to allow the user to define a specified geographical area within the interactive map. The at least one processor is further configured to retrieve a portion of the data from the data warehouse. The retrieved portion of the data is related to the specified geographical area and to real estate properties within or associated with the specified geographical area, and part of the retrieved portion of the data represents data unrelated to real estate properties. The at least one processor is also configured to analyze the retrieved portion of the data using one or more machine learning models, where the one or more machine learning models are configured to generate analysis results associated with at least one of: one or more of the real estate properties and one or more transactions involving one or more of the real estate properties. In addition, the at least one processor is configured to generate a user interface that graphically provides at least a portion of the analysis results to the user. The user interface is configured to allow the user to update the geospatial search by revising the specified geographical area and associating one or more specific real estate properties with the specified geographical area. The user interface is also configured to provide updated analysis results to the user, where the updated analysis results are based on the updated geospatial search.

In a third embodiment, a non-transitory computer readable medium contains instructions that support a machine learning-based architecture and that when executed cause at least one processor to obtain data from multiple data sources using multiple data pipelines. The data from the data sources includes structured and unstructured data, and the data pipelines are configured to pre-process and format the obtained data for storage in a data warehouse. The medium also contains instructions that when executed cause the at least one processor to receive input from a user defining a geospatial search, where at least some of the input is associated with an interactive map configured to allow the user to define a specified geographical area within the interactive map. The medium further contains instructions that when executed cause the at least one processor to retrieve a portion of the data from the data warehouse. The retrieved portion of the data is related to the specified geographical area and to real estate properties within or associated with the specified geographical area, and part of the retrieved portion of the data represents data unrelated to real estate properties. The medium also contains instructions that when executed cause the at least one processor to analyze the retrieved portion of the data using one or more machine learning models, where the one or more machine learning models are configured to generate analysis results associated with at least one of: one or more of the real estate properties and one or more transactions involving one or more of the real estate properties. In addition, the medium contains instructions that when executed cause the at least one processor to generate a user interface that graphically provides at least a portion of the analysis results to the user. The user interface is configured to allow the user to update the geospatial search by revising the specified geographical area and associating one or more specific real estate properties with the specified geographical area. The user interface is also configured to provide updated analysis results to the user, where the updated analysis results are based on the updated geospatial search.

Any single one or any suitable combination of the following features may be used with the first, second, or third embodiment. The interactive map may initially display a larger geographical area and information about different areas within the larger geographical area, and the interactive map may be configured to allow the user to enlarge the different areas as part of the geospatial search in order to view specific information about each of the different areas. The input from the user may include one of: a manual definition of the specified geographical area within the interactive map, and a user query for any geographical areas that satisfy one or more search criteria and that are presented within the interactive map. The data sources from which the data is obtained may be expandable by adding one or more additional data pipelines, and analyses performed using the data from the data sources may be expandable by adding one or more additional machine learning models. The data sources may include one or more real estate property performance and sales data sources, one or more real estate construction data sources, one or more demographics data sources, one or more e-commerce spending pattern data sources, one or more migration data sources, one or more job listings data sources, one or more travel and bookings data sources, and one or more Internet search trends data sources. Different machine learning models may be trained to weight data from different types of data sources differently. The user interface may be configured to allow the user to select the one or more specific real estate properties from among the real estate properties within or associated with the specified geographical area and mark the one or more specific real estate properties as one or more comparable properties, and analyzing the retrieved portion of the data may include identifying additional real estate properties similar to the one or more comparable properties. The user interface may be configured to allow the user to search for the real estate properties within or associated with the specified geographical area based on at least one selected vertical. The analysis results produced using the one or more machine learning models may include market performances of at least some of the real estate properties within or associated with the specified geographical area, comparisons of at least some of the real estate properties within or associated with the specified geographical area to each other or to one or more benchmarks, demographic or household information associated with the specified geographical area, comparisons of different geographical areas, and supply-demand imbalances within the specified geographical area.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112 (f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112 (f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:

obtaining data from multiple data sources using multiple data pipelines, the data obtained from the data sources comprising structured and unstructured data, the data pipelines configured to pre-process and format the obtained data for storage in a data storage;

receiving input from a user defining a geospatial search, at least some of the input associated with a first interactive map in a user interface, the first interactive map configured to allow the user to define a specified geographical area within the first interactive map, wherein the input from the user comprises one of a manual definition of the specified geographical area within the first interactive map and a user query for any geographical areas that satisfy one or more search criteria and that are presented within the first interactive map, the user interface simultaneously including within the first interactive map multiple property count indicators each identifying a number of properties within or associated with the specified geographical area, different ones of the property count indicators related to different ones of the properties within or associated with the specified geographical area and positioned at different locations within the specified geographical area based on locations of the related properties;

retrieving a portion of the data from the data storage, the retrieved portion of the data related to the specified geographical area and to the properties within or associated with the specified geographical area, part of the retrieved portion of the data representing data unrelated to properties;

analyzing the retrieved portion of the data using multiple machine learning models, the machine learning models configured to generate analysis results associated with one or more of the properties, wherein different machine learning models are trained to weight data from different types of data sources differently;

updating the user interface to graphically provide at least a portion of the analysis results to the user, wherein the user interface is configured to allow the user to update the geospatial search by revising the specified geographical area and to associate one or more specific properties selected by the user with the specified geographical area, and wherein the user interface is configured to provide updated analysis results to the user, the updated analysis results based on the updated geospatial search; and updating the user interface to provide information associated with a specified real estate market, the information associated with the specified real estate market comprising: a listing of geospatial searches previously defined using the user interface, information defining a selected geospatial search from among the listing of geospatial searches, a second interactive map containing multiple property markers identifying different individual properties associated with the selected geospatial search, information about each of the different properties and about the specified real estate market, and at least one heat map within or overlaid with the second interactive map, the at least one heat map based on a population within the second interactive map;

wherein the data sources from which the data is obtained are expandable by adding one or more additional data pipelines;

wherein analyses performed using the data from the data sources are expandable by adding one or more additional machine learning models; and wherein the user interface is configured to allow the user to select the one or more specific properties from among the properties within or associated with the specified geographical area and mark the one or more specific properties as one or more comparable properties, and wherein analyzing the retrieved portion of the data comprises identifying additional properties similar to the one or more comparable properties.

2. The method of claim 1, wherein the user interface is configured to allow the user to search for the properties within or associated with the specified geographical area based on at least one selected vertical.

3. An apparatus comprising:
at least one processor supporting a machine learning-based architecture, the at least one processor configured to:
obtain data from multiple data sources using multiple data pipelines, the data from the data sources comprising structured and unstructured data, the data pipelines configured to pre-process and format the obtained data for storage in a data storage;
receive input from a user defining a geospatial search, at least some of the input associated with a first interactive map in a user interface, the first interactive map configured to allow the user to define a specified geographical area within the first interactive map, the user interface simultaneously including within the first interactive map multiple property count indicators each identifying a number of properties within or associated with the specified geographical area, different ones of the property count indicators related to different ones of the properties within or associated with the specified geographical area and positioned at different locations within the specified geographical area based on locations of the related properties;
retrieve a portion of the data from the data storage, the retrieved portion of the data related to the specified geographical area and to the properties within or associated with the specified geographical area, part of the retrieved portion of the data representing data unrelated to properties;
analyze the retrieved portion of the data using one or more machine learning models, the one or more machine learning models configured to generate analysis results associated with one or more of the properties;
update the user interface to graphically provide at least a portion of the analysis results to the user, wherein the user interface is configured to allow the user to update the geospatial search by revising the specified geographical area and to associate one or more specific properties selected by the user with the specified geographical area, and wherein the user interface is configured to provide updated analysis results to the user, the updated analysis results based on the updated geospatial search; and
update the user interface to provide information associated with a specified real estate market, the information associated with the specified real estate market comprising: a listing of geospatial searches previously defined using the user interface, information defining a selected geospatial search from among the listing of geospatial searches, a second interactive map containing multiple property markers identifying different individual properties associated with the selected geospatial search, information about each of the different properties and about the specified real estate market, and at least one heat map within or overlaid with the second interactive map, the at least one heat map based on a population within the second interactive map;

wherein the user interface is configured to allow the user to select the one or more specific properties from among the properties within or associated with the specified geographical area and mark the one or more specific properties as one or more comparable properties; and wherein, to analyze the retrieved portion of the data, the at least one processor is configured to identify additional properties similar to the one or more comparable properties.

4. The apparatus of claim 3, wherein the input from the user comprises one of:
a manual definition of the specified geographical area within the first interactive map; and
a user query for any geographical areas that satisfy one or more search criteria and that are presented within the first interactive map.

5. The apparatus of claim 3, wherein the machine learning-based architecture is expandable to allow:
one or more additional data pipelines to be added in order to obtain data from one or more additional data sources; and
one or more additional machine learning models to be added in order to support one or more additional analyses based on the data from the data sources.

6. The apparatus of claim 3, wherein different machine learning models are trained to weight data from different types of data sources differently.

7. The apparatus of claim 3, wherein the user interface is configured to allow the user to search for the properties within or associated with the specified geographical area based on at least one selected vertical.

8. A non-transitory computer readable medium containing instructions that support a machine learning-based architecture and that when executed cause at least one processor to:
obtain data from multiple data sources using multiple data pipelines, the data from the data sources comprising structured and unstructured data, the data pipelines configured to pre-process and format the obtained data for storage in a data storage;

receive input from a user defining a geospatial search, at least some of the input associated with a first interactive map in a user interface, the first interactive map configured to allow the user to define a specified geographical area within the first interactive map, the user interface simultaneously including within the first interactive map multiple property count indicators each identifying a number of properties within or associated with the specified geographical area, different ones of the property count indicators related to different ones of the properties within or associated with the specified geographical area and positioned at different locations within the specified geographical area based on locations of the related properties;

retrieve a portion of the data from the data storage, the retrieved portion of the data related to the specified geographical area and to the properties within or associated with the specified geographical area, part of the retrieved portion of the data representing data unrelated to properties;

analyze the retrieved portion of the data using one or more machine learning models, the one or more machine learning models configured to generate analysis results associated with one or more of the properties;

update the user interface to graphically provide at least a portion of the analysis results to the user, wherein the user interface is configured to allow the user to update the geospatial search by revising the specified geographical area and to associate one or more specific properties selected by the user with the specified geographical area, and wherein the user interface is configured to provide updated analysis results to the user, the updated analysis results based on the updated geospatial search; and update the user interface to provide information associated with a specified real estate market, the information associated with the specified real estate market comprising: a listing of geospatial searches previously defined using the user interface, information defining a selected geospatial search from among the listing of geospatial searches, a second interactive map containing multiple property markers identifying different individual properties associated with the selected geospatial search, information about each of the different properties and about the specified real estate market, and at least one heat map within or overlaid with the second interactive map, the at least one heat map based on a population within the second interactive map;

wherein the user interface is configured to allow the user to select the one or more specific properties from among the properties within or associated with the specified geographical area and mark the one or more specific properties as one or more comparable properties; and wherein the instructions that when executed cause the at least one processor to analyze the retrieved portion of the data comprise instructions that when executed cause the at least one processor to identify additional properties similar to the one or more comparable properties.

9. The non-transitory computer readable medium of claim 8, wherein the machine learning-based architecture is expandable to allow:

one or more additional data pipelines to be added in order to obtain data from one or more additional data sources; and one or more additional machine learning models to be added in order to support one or more additional analyses based on the data from the data sources.

10. The method of claim 1, wherein:

the first interactive map initially displays a larger geographical area and information about different areas within the larger geographical area; and the first interactive map is configured to allow the user to enlarge the different areas as part of the geospatial search in order to view specific information about each of the different areas.

11. The method of claim 1, wherein the data sources comprise: one or more real estate property performance and sales data sources, one or more real estate construction data sources, one or more demographics data sources, one or more e-commerce spending pattern data sources, one or more migration data sources, one or more job listings data sources, one or more travel and bookings data sources, and one or more Internet search trends data sources.

12. The method of claim 1, wherein:

the user interface is configured to identify the one or more comparable properties using a first type of indicator in the first interactive map; and the user interface is configured to identify other properties within or associated with the specified geographical area using at least one second type of indicator different than the first type of indicator in the first interactive map.

13. The method of claim 1, wherein the analysis results produced using the one or more machine learning models comprise market performances of at least some of the properties within or associated with the specified geographical area, comparisons of at least some of the properties within or associated with the specified geographical area to each other or to one or more benchmarks, demographic or household information associated with the specified geographical area, comparisons of different geographical areas, and supply-demand imbalances within the specified geographical area.

14. The apparatus of claim 3, wherein:

the first interactive map is configured to initially display a larger geographical area and information about different areas within the larger geographical area; and the first interactive map is configured to allow the user to enlarge the different areas as part of the geospatial search in order to view specific information about each of the different areas.

15. The apparatus of claim 3, wherein the data sources comprise: one or more real estate property performance and sales data sources, one or more real estate construction data sources, one or more demographics data sources, one or more e-commerce spending pattern data sources, one or more migration data sources, one or more job listings data sources, one or more travel and bookings data sources, and one or more Internet search trends data sources.

16. The apparatus of claim 3, wherein:

the user interface is configured to identify the one or more comparable properties using a first type of indicator in the first interactive map; and the user interface is configured to identify other properties within or associated with the specified geographical area using at least one second type of indicator different than the first type of indicator in the first interactive map.

17. The apparatus of claim 3, wherein the analysis results produced using the one or more machine learning models comprise market performances of at least some of the properties within or associated with the specified geographical area, comparisons of at least some of the properties within or associated with the specified geographical area to each other or to one or more benchmarks, demographic or household information associated with the specified geographical area, comparisons of different geographical areas, and supply-demand imbalances within the specified geographical area.

18. The non-transitory computer readable medium of claim 8, wherein:
   the first interactive map is configured to initially display a larger geographical area and information about different areas within the larger geographical area; and
   the first interactive map is configured to allow the user to enlarge the different areas as part of the geospatial search in order to view specific information about each of the different areas.

19. The non-transitory computer readable medium of claim 8, wherein the data sources comprise: one or more real estate property performance and sales data sources, one or more real estate construction data sources, one or more demographics data sources, one or more e-commerce spending pattern data sources, one or more migration data sources, one or more job listings data sources, one or more travel and bookings data sources, and one or more Internet search trends data sources.

20. The non-transitory computer readable medium of claim 8, wherein:
   the user interface is configured to identify the one or more comparable properties using a first type of indicator in the first interactive map; and
   the user interface is configured to identify other properties within or associated with the specified geographical area using at least one second type of indicator different than the first type of indicator in the first interactive map.

* * * * *